United States Patent
Seo et al.

(10) Patent No.: US 7,197,021 B2
(45) Date of Patent: Mar. 27, 2007

(54) APPARATUS AND METHOD FOR TRANSMITTING/RECEIVING UPLINK TRANSMISSION POWER OFFSET AND HS-DSCH POWER LEVEL IN A COMMUNICATION SYSTEM EMPLOYING HSDPA

(75) Inventors: Myeong-Sook Seo, Suwon-shi (KR);
Hyeon-Woo Lee, Suwon-shi (KR);
Sung-Ho Choi, Songnam-shi (KR);
Ju-Ho Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 1115 days.

(21) Appl. No.: 10/222,175

(22) Filed: Aug. 16, 2002

(65) Prior Publication Data
US 2003/0039217 A1    Feb. 27, 2003

(30) Foreign Application Priority Data
Aug. 25, 2001   (KR) ................ 10-2001-0051604

(51) Int. Cl.
*H04B 7/216*    (2006.01)
(52) U.S. Cl. ..................................... 370/335
(58) Field of Classification Search ................ None
See application file for complete search history.

(56) References Cited

U.S. PATENT DOCUMENTS

| | | | |
|---|---|---|---|
| 5,987,326 A | 11/1999 | Tiedemann, Jr. et al. | |
| 6,173,162 B1 * | 1/2001 | Dahlman et al. | 455/69 |
| 6,529,482 B1 * | 3/2003 | Lundby | 370/252 |

FOREIGN PATENT DOCUMENTS

CN    1267410 A    9/2000

OTHER PUBLICATIONS

Kurniawan, Closed Loop Power Control in CDMA Systems Based on New SIR Estimation, TEKNIK ELEKTRO, vol. 6, No. 2, pp. 1-8, 2000.*
Samsung: "UL Power Control for HSDPA", 3GPP TSG-RAN WG1 #22, Nov. 19-23, 2001.

* cited by examiner

*Primary Examiner*—Frank Duong
(74) *Attorney, Agent, or Firm*—The Farrell Law Firm

(57) ABSTRACT

A high-speed packet data communication system, wherein a channel condition determiner measures a signal-to-interference ratio (SIR) of a first uplink dedicated channel signal received from a UE, and calculates a difference between the measured SIR and a preset target SIR; a transmission power determiner compares the difference with preset thresholds, and determines an uplink power offset to be applied to a second uplink dedicated channel transmitting control information for packet data received at the UE according to a result of the comparison; and a transmitter transmits over a downlink the determined uplink power offset to the UE.

37 Claims, 36 Drawing Sheets

(a) QPSK (a) 16-QAM
channel gain=a (a) 16-QAM
channel gain=b(>a)

| UL power offset[dB] | Transmission bit |
|---|---|
| 0 | DTX |
| 2 | 00 |
| 4 | 01 |
| 6 | 10 |
| 8 | 11 |

FIG.20

APPARATUS AND METHOD FOR TRANSMITTING/RECEIVING UPLINK TRANSMISSION POWER OFFSET AND HS-DSCH POWER LEVEL IN A COMMUNICATION SYSTEM EMPLOYING HSDPA

PRIORITY

This application claims priority to an application entitled "Apparatus and Method for Transmitting/Receiving Uplink Transmission Power Offset and HS-DSCH Power Level in a Communication System Employing HSDPA" filed in the Korean Industrial Property Office on Aug. 25, 2001 and assigned Ser. No. 2001-51604, the contents of which are hereby incorporated by reference.

BACKGROUND OF THE INVENTION

1. Field of the Invention

The present invention relates generally to a communication system employing HSDPA (High Speed Downlink Packet Access), and in particular to an apparatus and a method for transmitting/receiving an uplink transmission power offset value and a DSCH (Downlink Shared Channel) power level.

2. Description of the Related Art

In general, HSDPA (High Speed Downlink Packet Access) refers to a technique for transmitting data including HS-DSCH (High Speed-Downlink Shared Channel), a downlink data channel, for supporting high-speed packet data transmission, and a control channel related to the HS-DSCH in an UMTS (Universal Mobile Telecommunications System) communication system. In order to support the HSDPA, AMC (Adaptive Modulation and Coding), HARQ (Hybrid Automatic Retransmission Request), and FCS (Fast Cell Select) have been proposed.

First, the AMC will be described. The AMC is a data transmission technique for adaptively determining a modulation technique and a coding technique of different data channels according to a channel condition between a Node B and a UE, thereby to increase the overall utilization efficiency of the Node B. Therefore, the AMC has a plurality of modulation techniques and a plurality of coding techniques, and modulates and codes data channel signals by combining the modulation techniques and the coding techniques. Generally, each of combinations of the modulation techniques and the coding techniques is called "MCS (Modulation and Coding Scheme)", and MCSs with level #1 to level #n can be defined according to the number of MCSs. In other words, the AMC adaptively determines a level of the MCS according to a channel condition between the Node B and the UE currently wirelessly connected to the Node B, thereby increasing the overall efficiency of the Node B.

Second, the HARQ, especially n-channel SAW HARQ (Stop And Wait Hybrid Automatic Retransmission Request) will be described. The HARQ has introduced the following two plans to increase transmission efficiency of ARQ (Automatic Retransmission Request). A first plan is to exchange a retransmission request and a response between a UE and a Node B. A second plan is to temporarily store defective data and combine it with corresponding retransmitted data before transmission. Further, the HSDPA has introduced the n-channel SAW HARQ in order to make up for the shortcomings of the conventional SAW ARQ (Stop And Wait ARQ). In the SAW ARQ, a Node B does not transmit the next packet data until ACK (Acknowledgement) for the previously transmitted packet data is received. Therefore, in some cases, the Node B must await ACK, though it can presently transmit packet data. The n-channel SAW HARQ increases channel utilization efficiency by continuously transmitting a plurality of data packets before receiving the ACK for the previous packet data. If n logical channels are established between a UE and a Node B and identified by time or channel numbers, the UE, upon receipt of packet data at a certain time point, can determine the logical channel that transmitted the packet data. Thus the UE can rearrange packet data in the right reception order or soft-combine the packet data.

Finally, the FCS will be described. The FCS is a technique for rapidly selecting a cell having a good channel condition among a plurality of cells, when a UE supporting the HSDPA enters a cell-overlapping region, or a soft handover region. To be specific, if the UE supporting the HSDPA enters a cell-overlapping region between an old Node B and a new Node B, then the UE establishes radio links to a plurality of the cells, i.e., a plurality of Node Bs. A set of the cells, to which the radio links are established by the UE, is called an "active set." The UE receives HSDPA packet data from only the cell maintaining the best channel condition among the cells included in the active set to reduce the overall interference. Herein, a cell transmitting the HSDPA packet data for its best channel condition among the cells in the active set is called a "best cell." The UE periodically checks the channel conditions with the cells belonging to the active set. Upon detecting a cell having a channel condition better than that of the current best cell, the UE transmits a best cell indicator to all of the cells in the active set in order to replace the current best cell with a new best cell. The best cell indicator includes an identifier of the selected new best cell. Upon receiving the best cell indicator, the cells belonging to the active set analyze the cell identifier included in the received best cell indicator to determine whether the received best cell indicator is destined for them. The selected best cell transmits packet data to the UE using HS-DSCH.

As described above, in the HSDPA, it is necessary to exchange the following new control signals between a UE and a Node B in order to support the newly introduced AMC, HARQ, and FCS. First, in order to support the AMC, a UE must provide information on a channel condition between the UE and a Node B to the Node B, and the Node B must inform the UE of an MCS level determined according to the channel condition using the channel information received from the UE. Second, in order to support the n-channel SAW HARQ, a UE must transmit an ACK or NACK (Negative Acknowledgement) signal to a Node B. Third, in order to support the FCS, the UE must transmit to the Node B a best cell indicator indicating a best cell, i.e., a Node B providing a channel with the best channel condition. In addition, if the best cell is changed according to the channel condition, the UE must inform the Node B of its packet data reception state at that point, and the Node B should provide necessary information so that the UE can correctly select the best cell.

FIG. 1 schematically illustrates a downlink channel structure of a general communication system employing HSDPA. Referring to FIG. 1, a downlink DPCH (Dedicated Physical Channel) includes a field defined in an existing CDMA (Code Division Multiple Access) communication system, e.g., Release-99, and an HS-DSCH indicator (HI) indicating presence/absence of HSDPA packet data to be received at a UE. The HS-DSCH indicator transmitted over the downlink DPCH informs a corresponding UE of the presence/absence of HSDPA packet data to be received. Further, in the presence of the HSDPA packet data, the HS-DSCH indicator informs the UE of a channelization code for SHCCH (Shared Control Channel) that it must receive control information for HS-DSCH over which the HSDPA packet data is actually transmitted. In addition, if necessary, a part of the HS-DSCH control information, e.g., an MCS level, can be transmitted through the HS-DSCH indicator.

For example, in the case where the HSDPA packet data is transmitted for a period of N ($=N_1+N_2$) slots (i.e., HSDPA TTI (Transmission Time Interval)=N slots), if a slot structure remains unchanged for the TTI, the HS-DSCH indicator is separately transmitted for $N_1$ slots and a section for transmitting the HS-DSCH indicator for the remaining $N_2$ slots is subject to discontinuous transmission (DTX). It is assumed in FIG. 1 that the HS-DSCH indicator is transmitted for one slot, i.e., $N_1=1$.

A Node B then transmits information for controlling HS-DSCH (hereinafter, referred to as HS-DSCH control information), such as an MCS level, HS-DSCH channelization code, HARQ processor number and HARQ packet number, to the UE over a SHCCH (SHared Control CHannel). A description of the HS-DSCH control information will be described herein below.

(1) MCS level: this indicates a modulation technique and a channel coding technique to be used by HS-DSCH.

(2) HS-DSCH channelization code: this is a channelization code used for a specific UE by HS-DSCH.

(3) HARQ processor number: when the n-channel SAW HARQ is used, this indicates a channel to which a specific packet belongs among logical channels for HARQ.

(4) HARQ packet number: when a best cell is changed in the FCS, this informs a UE of a unique number of a downlink packet data so that the UE can inform a selected new best cell of a transmission state of the HSDPA data.

The SHCCH can be allocated either a single channelization code, or two or more channelization codes. The HS-DSCH is a channel over which HSDPA packet data is transmitted from the Node B to the UE. In FIG. 1, a start point of the downlink DPCH precedes start points of the SHCCH and the HS-DSCH, because the UE cannot recognize whether the remaining two channels are data corresponding to the UE itself, before reading the HS-DSCH indicator to detect corresponding information. Therefore, the UE must temporarily store the data in a buffer, so it receives the remaining two channels allowing a sufficient time to read the HS-DSCH indicator, thereby to lighten a load of the UE buffer. As a result, the UE determines whether there exists HSDPA packet data to receive by reading the HS-DSCH indicator on the downlink DPCH. If there exists HSDPA packet data to receive, the UE reads HS-DSCH control information on the SHCCH and then receives the HSDPA packet data over HS-DSCH according to the control information.

FIG. 2 illustrates a downlink DPCH structure of a general communication system employing HSDPA. Referring to FIG. 2, a downlink DPCH has a structure of a downlink DPCH defined in an existing CDMA communication system not employing the HSDPA, e.g., defined in Release-99, and the structure has the following fields. A Data1 field and a Data2 field transmit data for supporting an operation of an upper layer, or data for supporting a voice-only service. A TPC (Transmission Power Control) field transmits a downlink TPC command for controlling uplink transmission power, and a TFCI (Transmission Format Combination Indicator) field transmits TFCI information of the Data1 and Data2 fields. A Pilot field is a field for transmitting a pilot symbol stream previously defined by the system, and is used by a UE to estimate a downlink channel condition. HS-DSCH indicator for the HSDPA service, as illustrated in FIG. 2, is transmitted to the UE through a newly defined field in an existing Release-99 downlink DPCH channel structure.

FIG. 2 shows a case where the HS-DSCH indicator is transmitted through a newly defined field in the existing downlink DPCH. However, FIG. 3 shows a case where the HS-DSCH indicator is transmitted over a new downlink DPCH instead of a specific field in the existing downlink DPCH.

FIG. 3 illustrates another downlink DPCH structure of a general communication system employing HSDPA. Referring to FIG. 3, the HS-DSCH indicator is transmitted over a new downlink DPCH that has been allocated a separate channelization code, instead of a specific field in the existing downlink DPCH. Two downlink DPCHs, i.e., a primary DPCH (P-DPCH) and a secondary DPCH (S-DPCH), are allocated. Since the S-DPCH for transmitting the HS-DSCH indicator is different from the P-DPCH in an amount of transmission data, the P-DPCH is allocated a spreading factor (SF) N and the S-DPCH is allocated an SF M. If the HS-DSCH indicator to be transmitted has a small data amount, the SF value M of the S-DPCH is set to a relatively large value, e.g., M=512, thus to increase utilization efficiency of a downlink channelization code.

FIG. 4 illustrates an uplink DPCH structure of a general communication system employing HSDPA. Referring to FIG. 4, DPDCH (Dedicated Physical Data Channel) and DPCCH (Dedicated Physical Control Channel) for supporting the existing CDMA communication system, e.g., Release-99, and HS-DPCCH (High Speed Dedicated Physical Control Channel) for supporting the HSDPA are allocated separate channelization codes, and then transmitted independently. In the case of an uplink, since all UEs are allocated unique OVSF (Orthogonal Variable Length Spreading Factor) codes, channelization code resources are sufficient. If modified, the existing uplink control channel may not be compatible with the existing system and an increase in complexity of its structure would be required. Therefore, it is preferable to define a new uplink control channel using a new separate channelization code instead of modifying the channel structure.

Upper layer data from a UE and a Node B is transmitted over slots constituting one uplink DPDCH frame, and slots constituting one uplink DPCCH frame each include Pilot symbol, TFCI symbol, feedback information (FBI) symbol, and TPC symbol. The Pilot symbol is used as a channel estimation signal when demodulating data transmitted from the UE to the Node B. The TFCI symbol indicates a transmission format combination (TFC) used for data transmission by the channels transmitted for a current frame. The FBI symbol transmits feedback information when a transmission diversity technique is used. The TPC symbol is a symbol for controlling transmission power of a downlink channel. The uplink DPCCH is transmitted after being spread using an OVSF code, and an SF (Spreading Factor) used at this point is fixed to 256.

In the HSDPA, a UE performs error checking on data received from a Node B, and transmits ACK or NACK for the received data according to the error checking result. The ACK and NACK are transmitted over HS-DPCCH for supporting the HSDPA. If the UE is not required to transmit ACK/NACK to the Node B since there is no received data, the UE transmits channel quality information (CQI) to the Node B over the HS-DPCCH in order to support the AMC, or transmits other information such as a best cell indicator indicating a Node B that provides the UE with the best channel, over the HS-DPCCH in order to support the FCS. As illustrated in FIG. 4, when the HS-DPCCH for the HSDPA service is allocated a separate channelization code, it undergoes the same transmission power control as the existing DPCCH. That is, the DPCCH and the HS-DPCCH have a specific power ratio, so if transmission power of the DPCCH is increased or decreased, transmission power of the HS-DPCCH is also increased or decreased.

Next, the AMC technique for HS-DSCH will be described with reference to FIGS. 5A to 5C.

FIGS. 5A to 5C illustrate an AMC technique for HS-DSCH in a general communication system employing HSDPA. Specifically, FIG. 5A illustrates a signal constellation for QPSK (Quadrature Phase Shift Keying) modulation. The QPSK modulation, as illustrated in FIG. 5A, is a technique for making two transmission bits into one complex signal. For example, this technique modulates bits "00" into a complex signal "1+j." Here, since 4 complex signals are located on a circle centered on its origin, they have the same transmission power level. A receiver performs demodulation on a QPSK-modulated signal depending on a quadrant to which the QPSK-modulated signal belongs, among 4 quadrants formed by X-axis and Y-axis on the signal constellation. For example, if a received QPSK-modulated signal exists in a first quadrant, a transmission signal is demodulated into bits "00." That is, in the QPSK modulation, decision lines of a transmission signal are X-axis and Y-axis.

FIGS. 5B and 5C illustrate a signal constellation of 16QAM (16-ary Quadrature Amplitude Modulation) for modulating/demodulating 4 transmission bits into one complex signal, wherein FIG. 5C is larger than FIG. 5B in a channel gain of HS-DSCH. Since FIG. 5C is larger than FIG. 5B in the channel gain of the HS-DSCH, distances of complex signals from an origin on the signal constellation of FIG. 5C become longer than distances of complex signals from an origin on the signal constellation of FIG. 5B. The 16QAM modulates 4 bits into one complex signal on the signal constellation, and a 16QAM-modulated signal is demodulated according to a decision boundary formed by dotted lines, or decision lines in FIGS. 5B and 5C. As illustrated in FIGS. 5A to 5C, since a 16QAM-modulated signal has different decision lines during demodulation according to its channel gain, a receiver must recognize a channel gain of the transmitter in order to demodulate the 16QAM-modulated signal. Of course, in the QPSK, since the decision line is fixed regardless of transmission power, the receiver can perform demodulation even though it does not recognize a channel gain of the transmitter. Therefore, N-ary QAM requires a process of transmitting control information indicating a channel gain from a transmitter or Node B to a receiver or a UE. That is, the control information related to the channel gain transmitted from the Node B to the UE is called an "HS-DSCH power level," and the HS-DSCH power level is defined as a ratio of HS-DSCH power for one code to CPICH (Common Pilot Channel) power (or defined as a power difference in a dB unit). The HS-DSCH power for one code is power that can be allocated to a specific UE identified by a specific channelization code, among the whole transmission power allocated for the HSDPA service.

FIG. 6 illustrates a method of determining an HS-DSCH power level in a general communication system employing HSDPA. Referring to FIG. 6, in order to express the HS-DSCH power level with P bits, available transmission power of HS-DSCH for one code is divided into $2^P$ areas defined from transmission power 0 to CPICH power. In FIG. 6, in order to express the HS-DSCH power level with 2 bits, the HS-DSCH power level is divided into four areas (1) to (4). For example, if HS-DSCH transmission power for one channelization code belongs to an area (2), a Node B sets an HS-DSCH power level to A, and transmits bits "10" indicating the HS-DSCH power level A over a downlink. In general, since CPICH must be transmitted to every cell, CPICH power is much greater than HS-DSCH power for one channelization code. Therefore, if a difference between HS-DSCH power for one channelization code and CPICH power is large, a plurality of transmission bits are required in order to correctly express an HS-DSCH power level. Accordingly, there is a need for a method of determining an HS-DSCH power level by the Node B in order to demodulate a QAM-modulated signal from the UE. In addition, there is a demand for a method of transmitting information on the HS-DSCH power level to the UE.

If the DPCCH and the HS-DPCCH are transmitted (or controlled) in a specific power ratio as described in conjunction with FIG. 4, a transmission power problem may occur. This will be described with reference to FIG. 7.

FIG. 7 schematically illustrates a channel allocation scheme for a UE located in a soft handover region in a general communication system employing HSDPA. In the channel allocation scheme of FIG. 7, one UE is located in a soft handover region where it receives a service from K Node Bs. Even though the UE travels to the soft handover region while receiving an HSDPA service from a Node B#1, it does not necessarily receive the HSDPA service from all Node Bs including new Node Bs. That is, if a channel condition is not good while continuously receiving packet data from the Node B#1, the UE informs another Node B with a best channel condition, i.e., a best cell of the packet data transmission by the UE itself, and thereafter performs a hard handover in which it receives an HSDPA service from a new Node B with the best channel condition after disconnecting the connection with the Node B#1. As a result, the UE receives packet data for the HSDPA service from only one Node B. However, a voice service undergoes an existing soft handover in which a UE maintains connections with several Node Bs, so the UE, as illustrated in FIG. 7, receives channels for the HSDPA service from the Node B#1, and receives channels for the voice service, i.e., existing Release-99 DPCHs, from all Node Bs (Node B#2 to Node B#K) in the soft handover region. In addition, the UE transmits DPDCH and DPCCH to all Node Bs over an uplink, but transmits HS-DPCCH containing HSDPA service-related information such as ACK/NACK only to the Node B#1 from which it receives the HSDPA service.

Transmission power control over a Node B employing the existing Release-99 by a UE is performed as follows. A Node B measures SIR (Signal-to-Interference Ratio) through a pilot symbol on an uplink DPCCH, and compares the measured SIR with a target SIR. As a result of the comparison, if the measured SIR is less than the target SIR, the Node B transmits a power-up command for uplink transmission power to the UE over a TPC field on an uplink DPCH. In contrast, if the measured SIR is greater than the target SIR, the Node B transmits a power-down command for uplink transmission power to the UE over the TPC field on the uplink DPCH. Here, a measured SIR less than the target SIR means that the channel condition is bad, so the Node B transmits a power-up command for uplink transmission power. In contrast, that the measured SIR greater than the target SIR means that the channel condition is relatively good, so the Node B transmits a power-down command for uplink transmission power.

In FIG. 7, the UE also controls the uplink channel transmission power as in the Release-99. To be specific, if there is any power-down command for uplink transmission power among uplink transmission power control commands transmitted over TPC fields on downlink DPCHs from all Node Bs, the UE decreases uplink transmission power. For example, in the case where an uplink channel environment for a Node B#1 is bad, although the Node B#1 gives a power-up command for uplink transmission power to the UE, if any one of other Node Bs except the Node B#1 transmits a power-down command for uplink transmission power to the UE, the UE will decrease uplink transmission power. Therefore, though the Node B#1 providing the HSDPA service continuously issues a power-up command for uplink transmission power as illustrated in FIG. 7, transmission power of an uplink DPCCH may be decreased due to other Node Bs, and transmission power of HS-DPCCH that undergoes power control while maintaining a specific power ratio to the uplink DPCCH may also be reduced.

If the UE is located in a soft handover region, uplink DPDCH and DPCCH for the Release-99 are transmitted to all Node Bs and combined in an upper layer, obtaining a soft handover effect. In this case, event though transmission power is decreased to some extent, no problem occurs. However, since the HS-DPCCH of FIG. 4 transmitting ACK/NACK necessary for the HSDPA service or other control information for the HSDPA service is transmitted only to a single Node B, i.e., the Node B#1, a decrease in its uplink transmission power leads to a decrease in reliability.

SUMMARY OF THE INVENTION

It is, therefore, an object of the present invention to provide an apparatus and method for controlling transmission power of an uplink HS-DPCCH (High Speed-Dedicated Physical Control Channel) in a communication system employing HSDPA (High Speed Downlink Packet Access).

It is another object of the present invention to provide an apparatus and method for determining a transmission power offset to control transmission power of an uplink HS-DPCCH in a communication system employing HSDPA.

It is further another object of the present invention to provide an apparatus and method for transmitting a transmission power offset determined to control transmission power of an uplink HS-DPCCH in a communication system employing HSDPA.

It is yet another object of the present invention to provide an apparatus and method for determining a power level of HS-DSCH (High Speed-Downlink Shared Channel) in a communication system employing HSDPA.

It is still another object of the present invention to provide an apparatus and method for transmitting a power level of HS-DSCH in a communication system employing HSDPA.

According to one aspect of the present invention, there is provided an apparatus for controlling uplink transmission power in a high-speed packet data communication system. The apparatus comprises a channel condition determiner for measuring a signal-to-interference ratio (SIR) of a first uplink dedicated channel signal received from a UE, and calculating a difference between the measured SIR and a preset target SIR; a transmission power determiner for comparing the difference with preset thresholds, and determining an uplink power offset to be applied to a second uplink dedicated channel transmitting control information for packet data received at the UE according to a result of the comparison; and a transmitter for transmitting the determined uplink power offset to the UE over a downlink.

According to another aspect of the present invention, there is provided an apparatus for transmitting a downlink data channel power level in a high-speed packet data communication system. The apparatus comprises a modulation technique determiner for determining a modulation technique to be applied to a downlink data channel for transmitting the packet data according to a channel condition with a UE; a downlink data channel power level determiner for determining a downlink data channel power level which is channel gain-related control information of the downlink data channel, when the determined modulation technique is a high-order modulation technique; and a transmitter for transmitting the determined downlink data channel power level to the UE over a downlink so that the UE demodulates the packet data using the downlink data channel power level.

According to further another aspect of the present invention, there is provided a method for controlling uplink transmission power in a high-speed packet data communication system. The method comprises measuring a signal-to-interference ratio (SIR) of a first uplink dedicated channel signal received from a UE; calculating a difference between the measured SIR and a preset target SIR, comparing the difference with preset thresholds, and determining an uplink power offset to be applied to a second uplink dedicated channel transmitting control information for packet data received at the UE according to a result of the comparison; and transmitting the determined uplink power offset to the UE over a downlink.

According to yet another aspect of the present invention, there is provided a method for transmitting a downlink data channel power level in a high-speed packet data communication system. The method comprises estimating a channel condition with a UE, and determining a modulation technique to be applied to a downlink data channel for transmitting the packet data according to the estimated channel condition; determining a downlink data channel power level which is channel gain-related control information of the downlink data channel, when the determined modulation technique is a high-order modulation technique; and transmitting the determined downlink data channel power level to the UE over a downlink so that the UE demodulates the packet data using the downlink data channel power level.

BRIEF DESCRIPTION OF THE DRAWINGS

The above and other objects, features and advantages of the present invention will become more apparent from the following detailed description when taken in conjunction with the accompanying drawings in which:

FIG. 20 illustrates a table representing bit values for transmitting an uplink power offset according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 6:
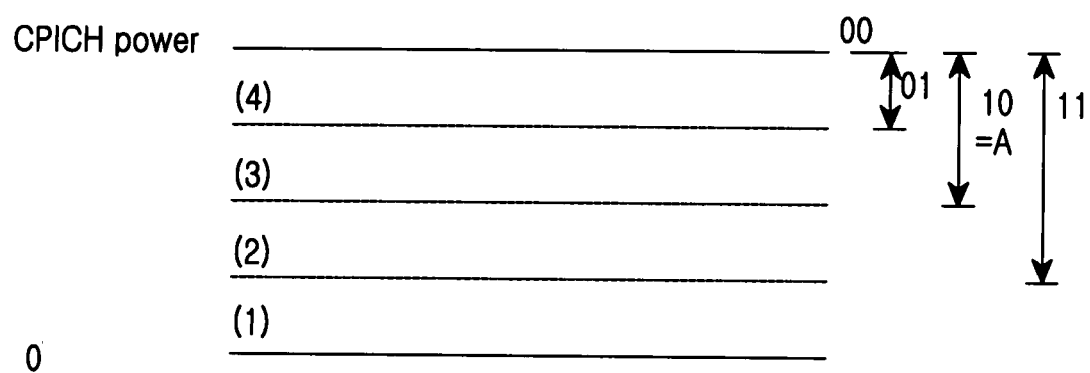
FIG. 6 illustrates a method of determining an HS-DSCH power level in a general communication system employing HSDPA.
Figure 8:
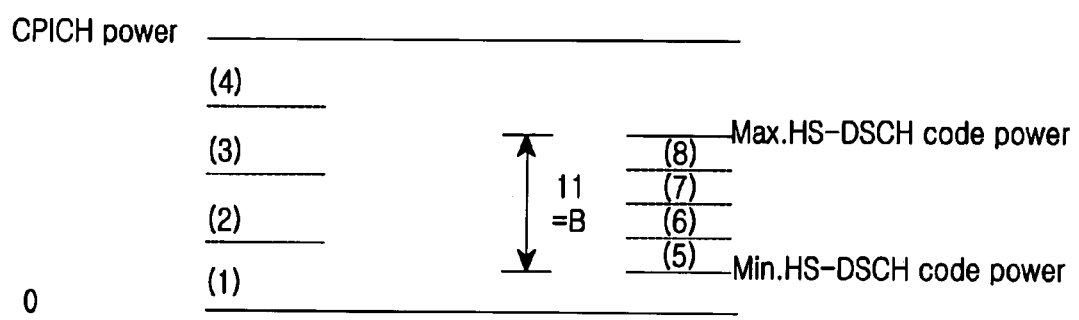
FIG. 8 illustrates a method of determining an HS-DSCH power level in a communication system employing HSDPA according to an embodiment of the present invention.

FIG. 8 illustrates a method of determining an HS-DSCH power level in a communication system employing HSDPA according to an embodiment of the present invention. In a communication system employing HSDPA (High Speed Downlink Packet Access), a power level of HS-DSCH (High Speed-Downlink Shared Channel), as described in the prior art, is defined as a ratio of HS-DSCH power for one channelization code to CPICH (Common Pilot Channel) power (or defined as a power difference in a dB unit). As described in conjunction with FIG. 6, if a difference between HS-DSCH power for one channelization code and CPICH power is great, a plurality of transmission bits are required in order to correctly express an HS-DSCH power level. However, since the CPICH is a channel transmitted to the entire cell, the HS-DSCH power level for one channelization code is actually scarcely increased up to the CPICH power level. Therefore, an embodiment of the present invention provides a method for determining the HS-DSCH power level based on a maximum level of the HS-DSCH power for one channelization code, instead of the CPICH power level. Of course, a minimum level of the HS-DSCH power for one channelization code does not become 0 in an actual radio channel environment. Therefore, the embodiment of the present invention determines an HS-DSCH power level depending on a minimum level and a maximum level of the HS-DSCH power for one channelization code.

Referring to FIG. 8, available transmission power of HS-DSCH power for one channelization code is divided into $2^P$ areas between a minimum HS-DSCH power level and a maximum HS-DSCH power level in order to transmit the HS-DSCH power level with P bits. In FIG. 8, the HS-DSCH power level is transmitted with 2 bits by way of example. Therefore, in order to transmit the HS-DSCH power level with 2 bits, the HS-DSCH power level is divided into four areas (5) to (8) between the minimum level and the maximum level of the HS-DSCH power for one channelization code. For example, if the HS-DSCH power level for one channelization code belongs to an area (5), a Node B sets an HS-DSCH power level to B, and transmits bits "11" corresponding to the HS-DSCH power level B over a downlink. As a result, it is possible to transmit a precise HS-DSCH power level using the same number of bits as used in the prior art. Accordingly, the HS-DSCH power level needed by a UE (User Equipment) to demodulate a QAM (Quadrature Amplitude Modulation)-modulated signal is correctly determined, thereby increasing reliability of the QAM demodulation.

Meanwhile, the UE receives the bits indicating the HS-DSCH power level transmitted by the Node B, and detects an HS-DSCH power level for one channelization code. Here, the UE should previously make an agreement with the Node B on a minimum level and a maximum level of the HS-DSCH power, and the minimum level and the maximum level of the HS-DSCH power are transmitted to the UE as upper layer control information. In addition, the Node B presets transmission power for the HSDPA among the entire transmission power that can be transmitted over the cell and the maximum number of allocable channelization codes. Therefore, if a Node B also transmits the above information to a UE as upper layer control information, the UE can distinguish a maximum level of the HS-DSCH power for one channelization code. This will be described in more detail herein below.

It will be assumed that the Node B has transmission power S for HSDPA among the entire transmission power, and the maximum number N of channelization codes. If a Node B allocates the same power for all channelization codes, power for one channelization code will become S/N. However, in an actual situation, power is allocated to a corresponding channelization code according to a channel condition or an MCS (Modulation and Coding Scheme) level, so the same transmission power is not allocated to all the channelization codes. For example, a Node B allocates low transmission power to QPSK (Quadrature Phase Shift Keying)-modulated HS-DSCH, and high transmission power to QAM-modulated HS-DSCH. Therefore, the Node B variably allocates transmission power for one channelization code by S(K/N). Here, the K is a variable value for variably allocating transmission power between HS-DSCHs. Since it is not possible to allocate the entire transmission power for the HSDPA only to a certain channel, a possible value of the K is restricted to limit a maximum power level for one channelization code. Likewise, the UE can also recognize a maximum level of the HS-DSCH for one channelization code by calculating the S(K/N) depending on received upper layer control information including the entire transmission power for HSDPA from the Node B, the number of allocable channelization codes, and a value of the K.

Figure 9:
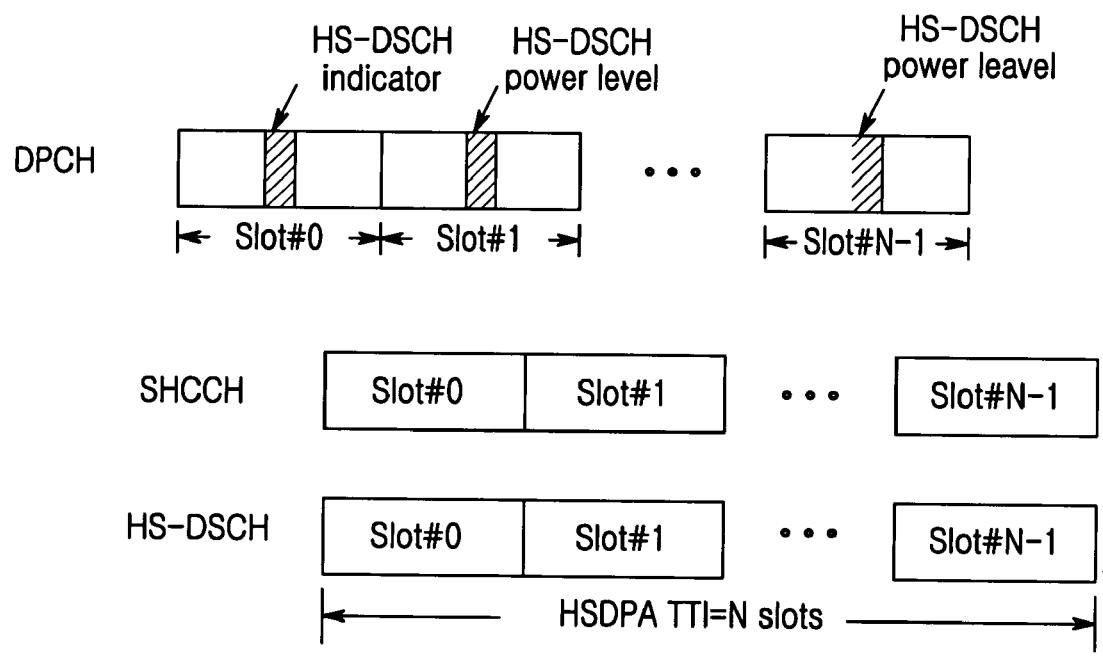
FIG. 9 illustrates a downlink channel stricture for a communication system employing HSDPA according to an embodiment of the present invention.

FIG. 9 illustrates a downlink channel structure for a communication system employing HSDPA according to an embodiment of the present invention. Referring to FIG. 9, channels that can transmit transmission power include a downlink DPCH (Dedicated Physical Channel) and an SHCCH (Shared Control Channel) for controlling an HS-DSCH (High Speed-Downlink Shared Channel), as described in conjunction with FIG. 1. However, since the SHCCH already transmits such control information as MCS level for the HSDPA service, HARQ (Hybrid Automatic Retransmission Request) processor number and HARQ packet number, it has no room to transmit other control information.

Figure 1:
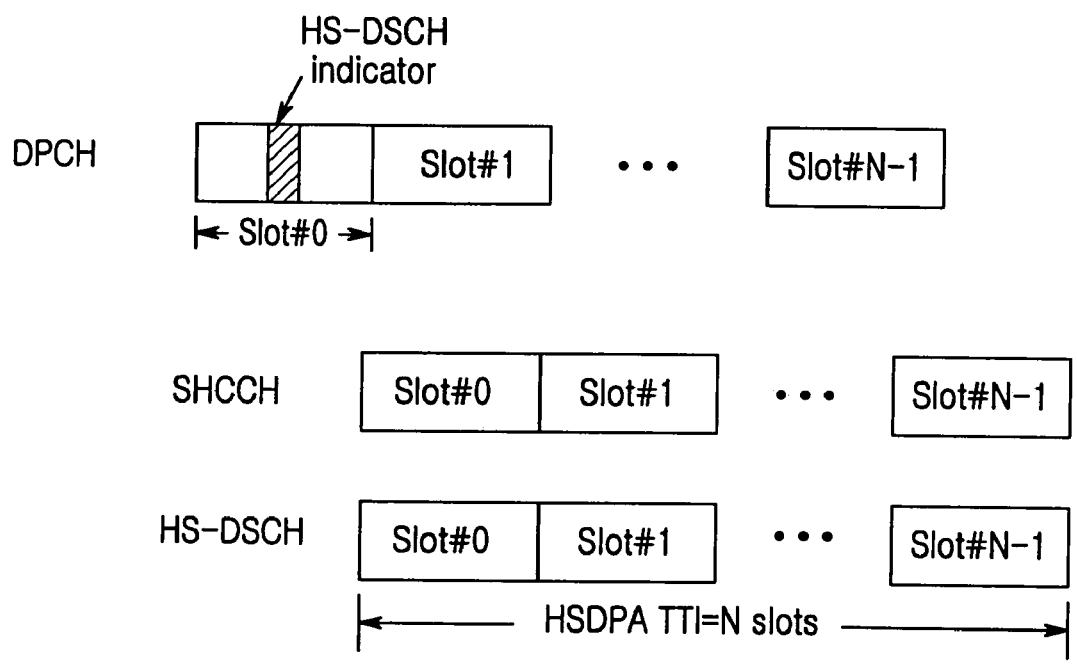
FIG. 1 schematically illustrates a downlink channel structure of a general communication system employing HSDPA.
Figure 2:
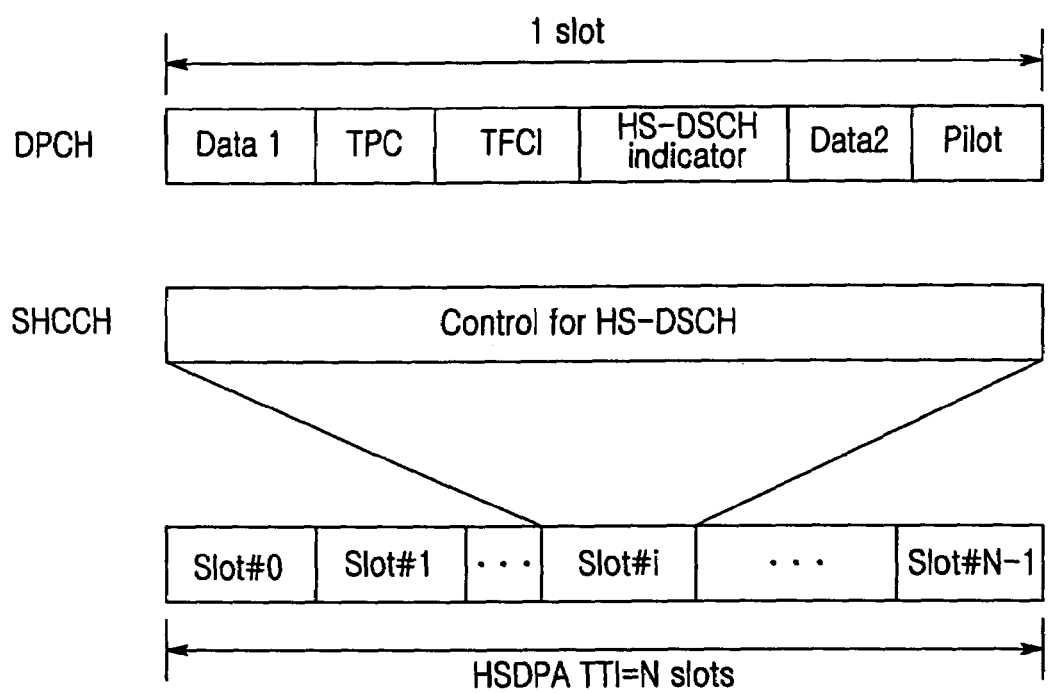
FIG. 2 illustrates a downlink DPCH structure of a general communication system employing HSDPA.
Figure 3:
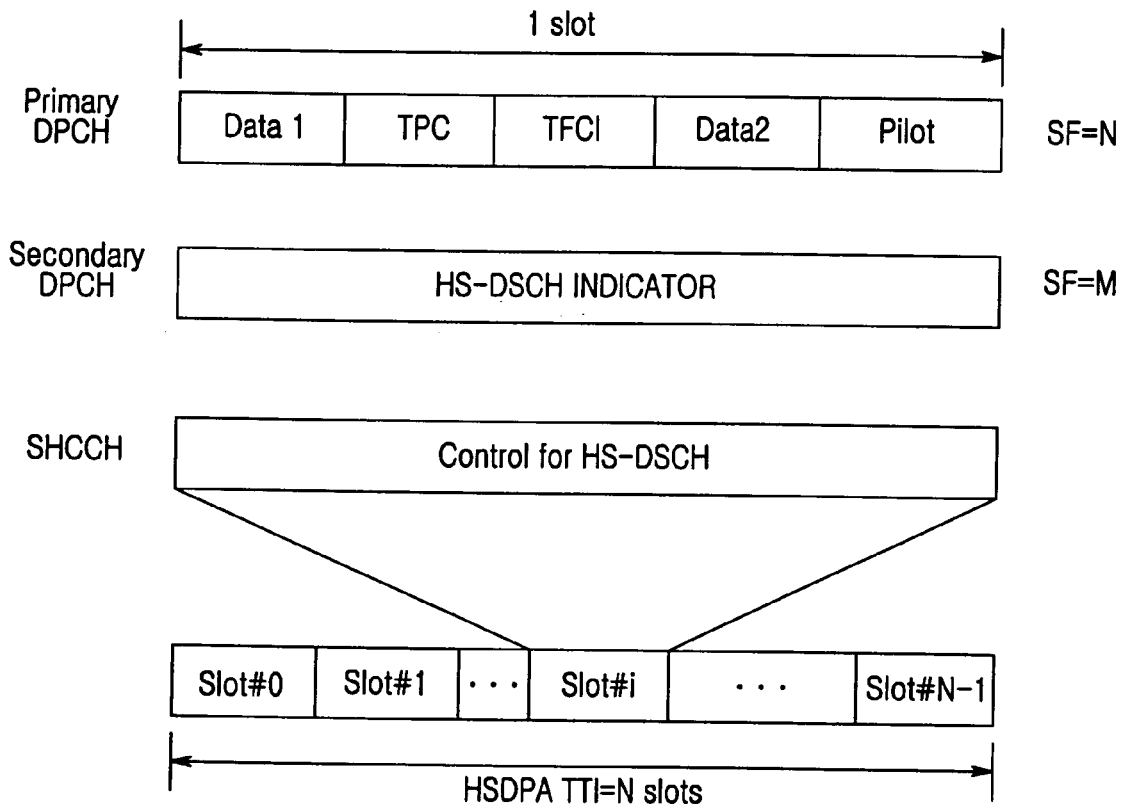
FIG. 3 illustrates another downlink DPCH structure of a general communication system employing HSDPA.
Figure 4:
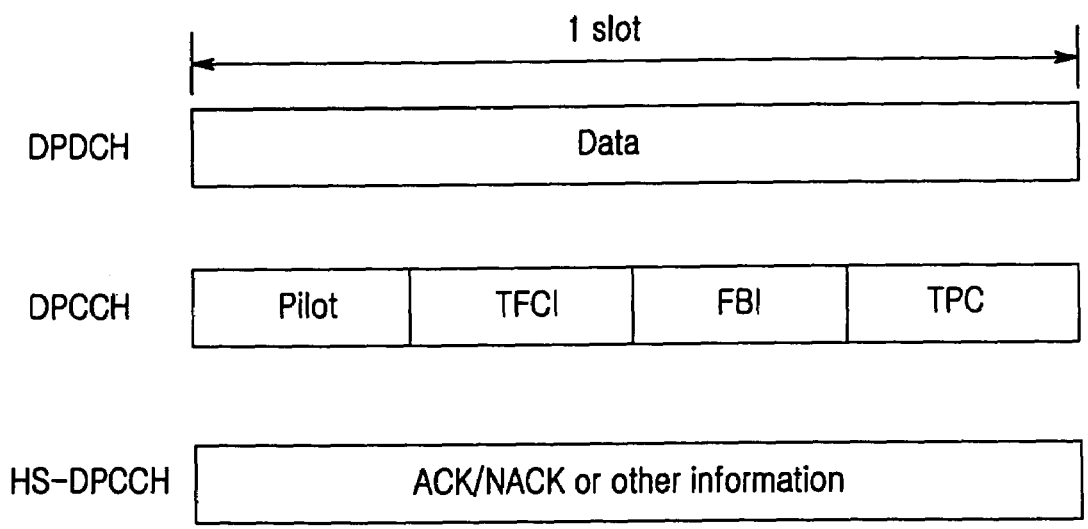
FIG. 4 illustrates an uplink DPCH structure of a general communication system employing HSDPA.

However, if one TTI (Transmission Time Interval) has N (=$N_1$+$N_2$) slots as also illustrated in FIG. 1, an HS-DSCH indicator (HI) is separately transmitted for $N_1$ slots and a section transmitting the HS-DSCH indicator for the remaining $N_2$ slots is subject to discontinuous transmission (DTX). Therefore, the HS-DSCH power level can be separately transmitted over an HS-DSCH indicator part on a slot in the DPCH, the slot not transmitting the HS-DSCH indicator. Since a position of the slot transmitting the HS-DSCH indicator is variable, a position of a slot transmitting the HS-DSCH transmission power level is also variable. In addition, the HS-DSCH power level can be transmitted from a Node B to a UE for a period of TTI. Alternatively, the HS-DSCH power level can be transmitted for a period of slots or a frame, if there are many bits indicating the HS-DSCH power level to be transmitted. In FIG. 9, an HS-DSCH indictor is transmitted only for a first slot Slot#0 in TTI, and an HS-DSCH power level is transmitted over HS-DSCH indicator parts in a second slot Slot#1 and an $N^{th}$ slot Slot#(N−1) among the remaining (N−1) slots. The other downlink channels, i.e., the SHCCH and the HS-DSCH have the same structure as that described in conjunction with FIG. 1. Meanwhile, the HS-DSCH power level, as it is a value for informing transmission power of HS-DSCH for HSDPA, is transmitted only when there exists HSDPA service data, i.e., when there exists an HS-DSCH indicator and the HSDPA data is modulated by the QAM, in the case where a UE receives the HSDPA service. If the number of bits indicating the HS-DSCH power level determined by FIG. 8 is K and the number of bits that can be transmitted over (N−1) sots is n as illustrated in FIG. 9, the HS-DSCH power level can be transmitted using an error correction code such as an (n,k) block code.

Figure 10:
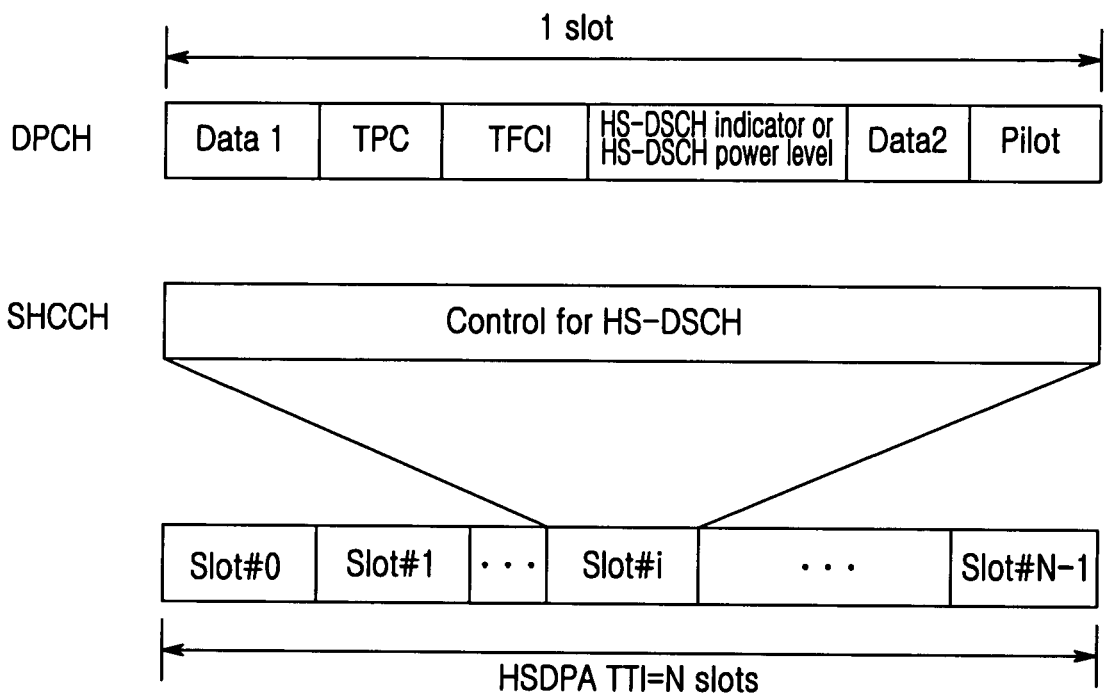
FIG. 10 illustrates a downlink DPCH structure for a communication system employing HSDPA according to another embodiment of the present invention.

FIG. 10 illustrates a downlink DPCH structure for a communication system employing HSDPA according to another embodiment of the present invention. Referring to FIG. 10, DPCH includes a downlink DPCH structure defined in an existing CDMA (Code Division Multiple Access) communication system not supporting the HSDPA service, e.g., defined in the Release-99, and the structure has the following fields. A Data1 field and a Data2 field transmit data for supporting an operation of an upper layer, or data for supporting a voice-only service. A TPC (Transmission Power Control) field transmits a downlink TPC command for controlling uplink transmission power, and a TFCI (Transmission Format Combination Indicator) field transmits TFC (Transmission Format Combination) information of the Data1 and Data2 fields. A Pilot field is a field for transmitting a pilot symbol stream previously defined by the system, and is used by a UE to estimate a downlink channel condition. The HS-DSCH indicator for the HSDPA service and the HS-DSCH power level, as illustrated in FIG. 9, are transmitted to the UE through a newly defined field in an existing Release-99 downlink DPCH. FIG. 10 shows a case where the HS-DSCH indicator and the HS-DSCH power level are transmitted over a newly defined field in the existing downlink DPCH.

Meanwhile, with reference to FIG. 11, a description will be made of a case where the HS-DSCH indicator and the HS-DSCH power level are transmitted over a new downlink DPCH instead of a specific field in the existing downlink DPCH.

Figure 11:
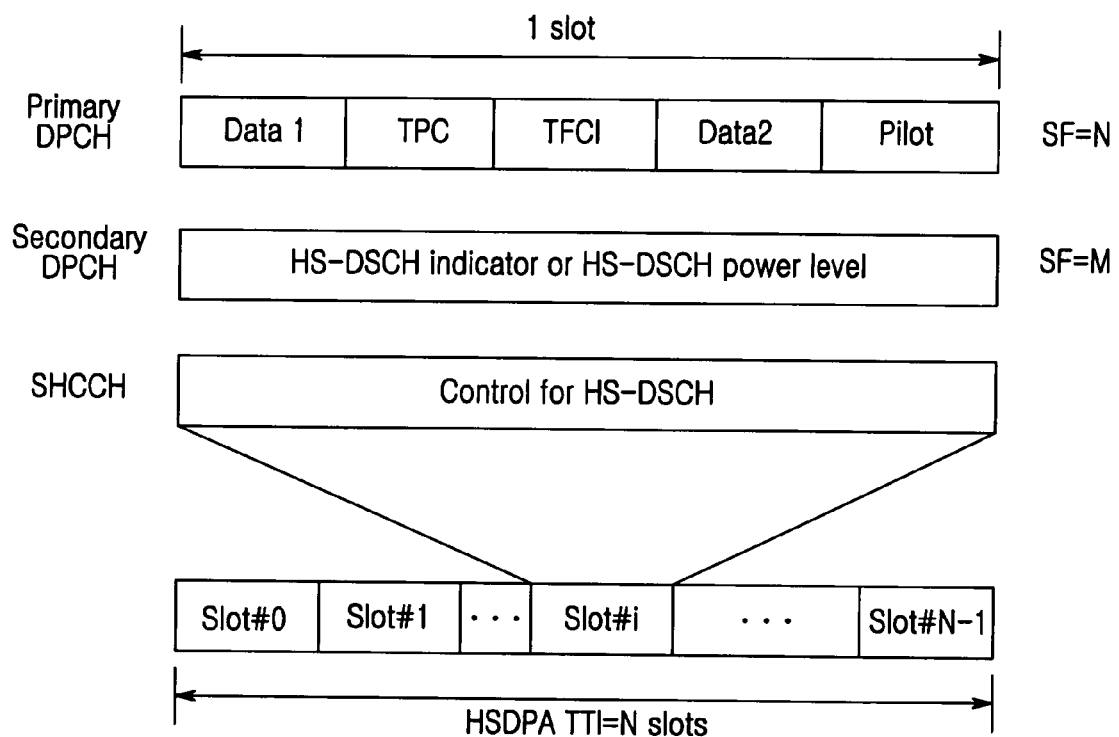
FIG. 11 illustrates a downlink DPCH structure for a communication system employing HSDPA according to another embodiment of the present invention.

FIG. 11 illustrates a downlink DPCH structure for a communication system employing HSDPA according to another embodiment of the present invention. Referring to FIG. 11, the HS-DSCH indicator or the HS-DSCH power level is transmitted over a new downlink DPCH allocated a separate channelization code, instead of a specific field in the existing downlink DPCH. Two downlink DPCHs, i.e., a primary DPCH (P-DPCH) and a secondary DPCH (S-DPCH), are allocated. Since the S-DPCH for transmitting the HS-DSCH indicator or the HS-DSCH power level is different from the P-DPCH in an amount of transmission data, the P-DPCH is allocated a spreading factor (SF) N and the S-DPCH is allocated an SF M. If the HS-DSCH indicator or the HS-DSCH power level to be transmitted have a small data amount, the SF value M of the S-DPCH is set to a relatively large value, e.g., M=512, thus to increase utilization efficiency of a downlink channelization code.

Hitherto, the channel structure in which the HS-DSCH power level is transmitted over the downlink DPCH has been described with reference to FIGS. 10 and 11. Next, a channel structure in which the HS-DSCH power level is transmitted using SHCCH will be described with reference to FIG. 12.

Figure 12:
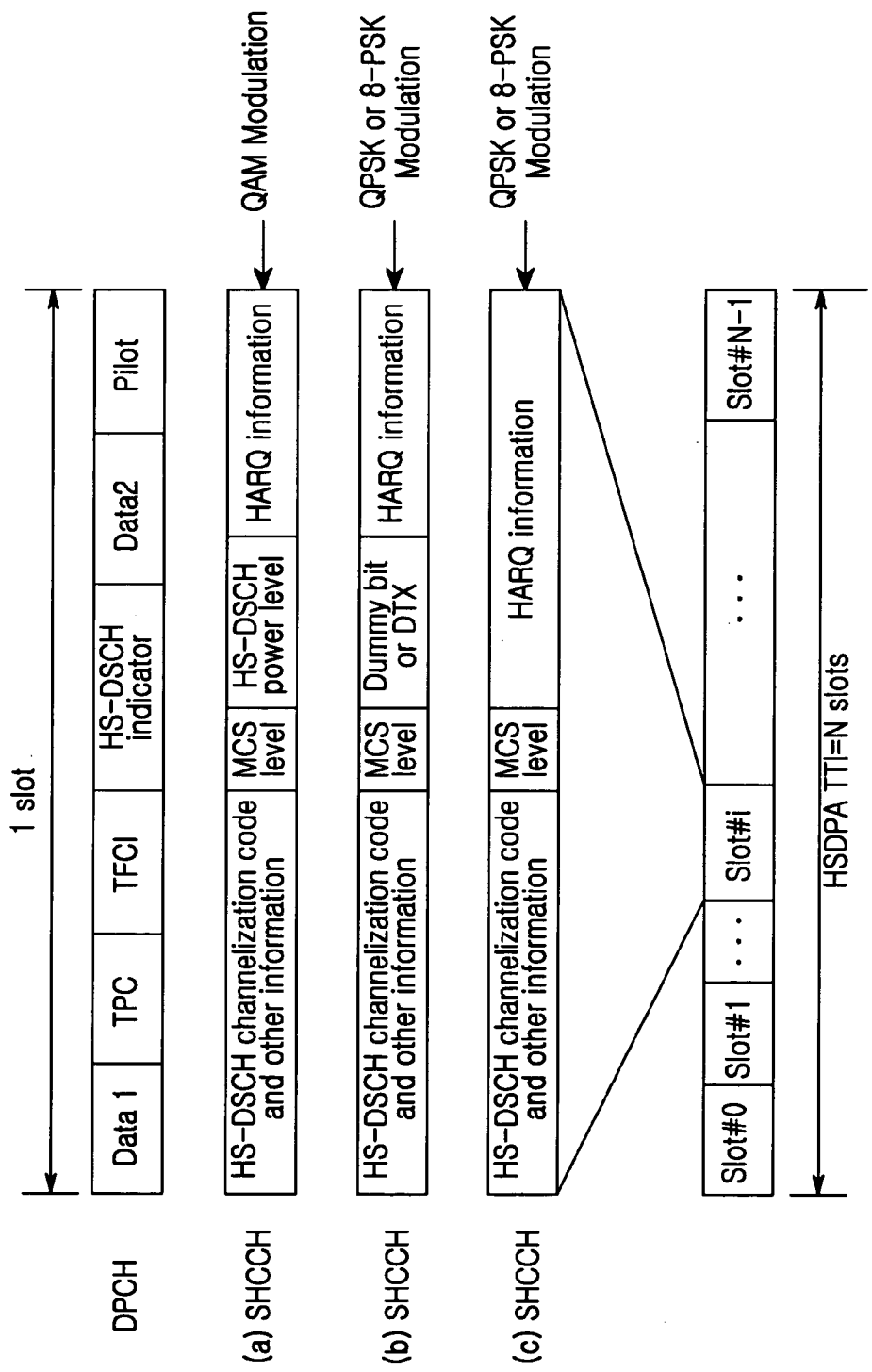
FIG. 12 illustrates an SHCCH stricture for a communication system employing HSDPA according to another embodiment of the present invention.

FIG. 12 illustrates an SHCCH structure for a communication system employing HSDPA according to another embodiment of the present invention. Referring to FIG. 12, the SHCCH for controlling HS-DSCH, as described in conjunction with FIG. 1, transmits HS-DSCH channelization code, MCS level indicating a modulation technique and a channel coding technique to be used in the HS-DSCH, and HARQ information, i.e., HARQ processor number and an HARQ packet number. Among the fields transmitting such control information, a certain field is defined as a field for transmitting the HS-DSCH power level. If the MCS level of the control information indicates that the HS-DSCH is modulated by QAM, the HS-DSCH power level is transmitted over the SHCCH. If the HS-DSCH is not modulated by the QAM, a field for transmitting the HS-DSCH power level is subject to DTX, or dummy bits are inserted in the field. In general, if the HS-DSCH is not modulated by the QAM, it means that a channel condition is bad. Therefore, HARQ information required to have high reliability can be transmitted over the field where the HS-DSCH power level is transmitted.

In FIG. 12, (a) illustrates an SHCCH structure for transmitting HS-DSCH channelization code and other information, MCS level, HS-DSCH power level, and HARQ information, when the HS-DSCH is modulated by QAM modulation. Next, (b) illustrates an SHCCH structure in which a field for transmitting the HS-DSCH power level undergoes DTX or dummy bits are inserted in the field, when the MCS level indicates QPSK or 8PSK (8-ary Phase Shift Keying) modulation where the HS-DSCH power level is not required to be transmitted. Finally, (c) illustrates an SHCCH structure for transmitting HARQ-related control information by extending an original HARQ control information field up to a field for transmitting the HS-DSCH power level, when the QAM modulation is not used, which means that the channel condition is bad. Although the HS-DSCH indicator field exists in the downlink DPCH in the channel structure of FIG. 12, a channel structure in which the HS-DSCH indicator is transmitted over a separate channel allocated a channelization code different from that of the DPCH is also available.

Figure 13:
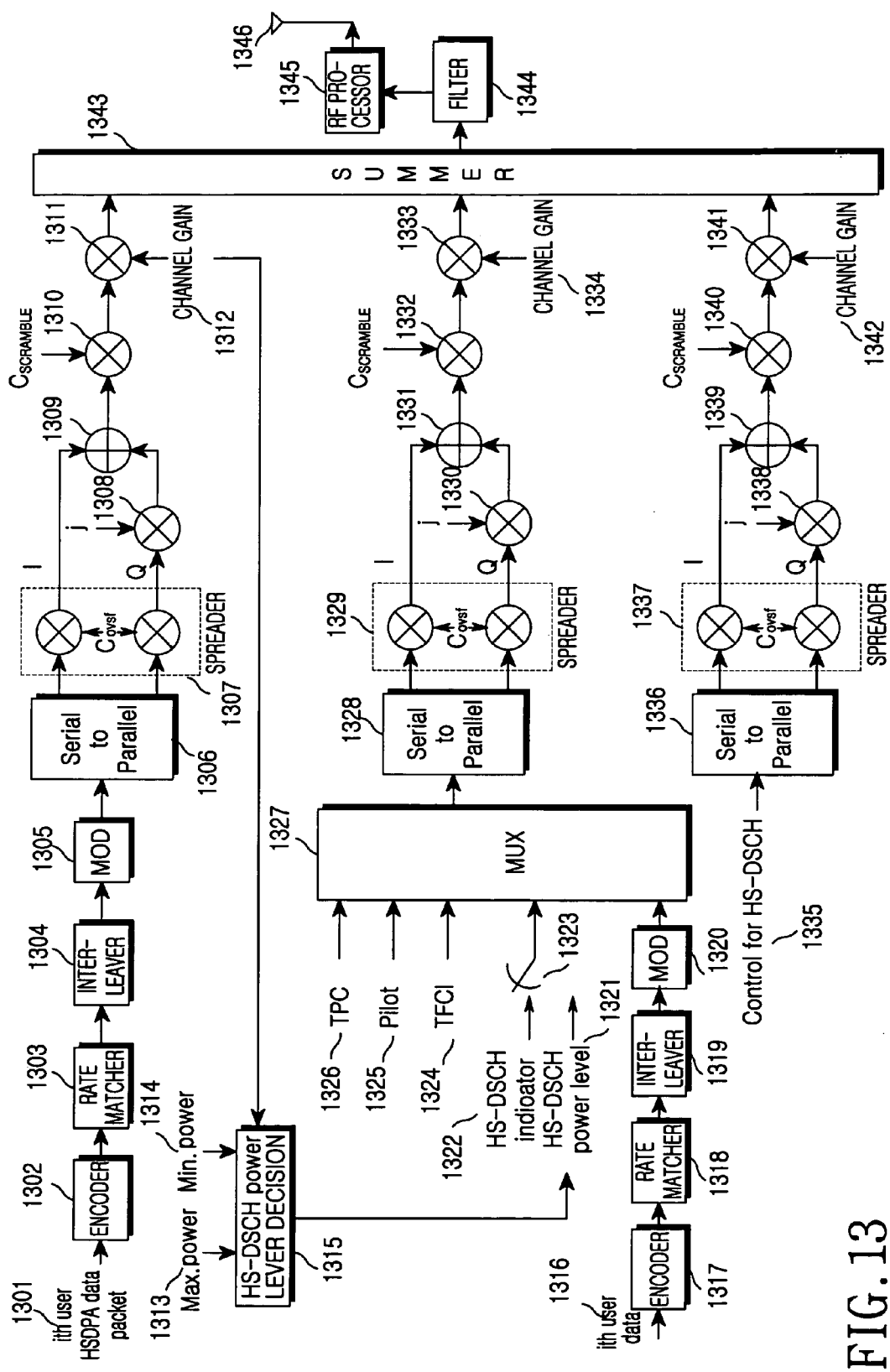
FIG. 13 is a block diagram illustrating a transmission apparatus structure of a Node B corresponding to the downlink channel structure of FIG. 9.

FIG. 13 is a block diagram illustrating a transmission apparatus structure of a Node B in a communication system employing HSDPA according to an embodiment of the present invention, in which an HS-DSCH indicator and an HS-DSCH power level are transmitted using one DPCH.

Referring to FIG. 13, HS-DSCH data packet (or HSDPA data packet) 1301 is applied to an encoder 1302. The encoder 1302 encodes the HS-DSCH data packet 1301 by preset coding, e.g., turbo coding, generates coded symbols, and provides the generated coded symbols to a rate matcher 1303. The rate matcher 1303 performs rate matching on a signal output from the encoder 1302 through symbol repetition and puncturing in order to transmit the signal for TTI, and provides the rate-matched signal to an interleaver 1304. The interleaver 1304 interleaves a signal output from the rate matcher 1303, and provides the interleaved signal to a modulator 1305. The modulator 1305 modulates a signal output from the interleaver 1304 by preset modulation, e.g., QPSK, 8PSK or M-ary QAM, and provides the modulated signal in the form of a bit stream to a serial-to-parallel converter 1306. The serial-to-parallel converter 1306 parallel converts the received bit stream into two bit streams, i.e., a bit stream I and a bit stream Q and provides the bit streams I and Q to a spreader 1307. The spreader 1307 spreads the two bit streams output from the serial-to-parallel converter 1306 using the same channelization code $C_{OVSF}$ so that they have an orthogonal property with other signals using other channelization codes, and provides the spreaded bit stream I to an adder 1309 and the spreaded bit stream Q to a multiplier 1308, respectively. The multiplier 1308 multiplies the bit stream Q by j and provides its output to the adder 1309. The adder 1309 adds a signal output from the multiplier 1308 to the bit stream I, thus generating one complex bit stream, and provides the generated complex bit stream to a multiplier 1310. The multiplier 1310 multiplies a signal output from the adder 1309 by a preset scrambling code $C_{SCRAMBLE}$, for scrambling, and provides its output to a multiplier 1311. Here, the multiplier 1310 serves as a scrambler. The multiplier 1311 multiplies a signal output from the multiplier 1310 by a channel gain 1312, and provides its output to a summer 1343. Generally, the channel gain 1312, a parameter for determining a power level of HS-DSCH, has a large value for a small SF and is variable according to the type of the user data transmitted. If the HS-DSCH data packet is modulated by QAM in the modulator 1305, the Node B informs a UE of an HS-DSCH power level for the channelization code so that the UE can efficiently perform QAM demodulation. In addition, an HS-DSCH power level determiner 1315 determines an HS-DSCH power level using the HS-DSCH power from the channel gain 1312, and a maximum level 1313 and a minimum level 1314 of HS-DSCH power for one channelization code, and generates bits 1321 corresponding to the determined HS-DSCH power level.

User data 1316 to be transmitted over DPCH is applied to an encoder 1317. The encoder 1317 encodes the user data 1316 by preset coding, and provides its output to a rate matcher 1318. The rate matcher 1318 performs rate matching on a signal output from the encoder 1317 through symbol repetition and puncturing so that the number of output bits is matched to the number of bits to be transmitted over an actual physical channel, and provides the rate-matched signal to an interleaver 1319. The interleaver 1319 interleaves a signal output from the rate matcher 1318 in a preset manner, and provides the interleaved signal to a modulator 1320. The modulator 1320 modulates a signal output from the interleaver 1319 by preset modulation, and provides the modulated signal to a multiplexer 1327. The multiplexer 1327 multiplexes HS-DSCH indicator 1322 and HS-DSCH power level 1321, transmission points of which are distinguished by a switch 1323, TFCI 1324, Pilot 1325 for estimating a downlink channel condition, and TPC 1326 for uplink transmission power control, thus generating one bit stream, and provides the generated bit stream to a serial-to-parallel converter 1328. Here, the switch 1323 is connected to the HS-DSCH indicator 1322 at a point where the HS-DSCH indicator 1322 must be transmitted, and to the HS-DSCH power level 1321 at a point where the HS-DSCH power level 1321 must be transmitted, thereby to control the transmission points of the HS-DSCH indicator 1322 and the HS-DSCH power level 1321.

The serial-to-parallel converter 1328 parallel converts the one bit stream output from the multiplexer 1327 into two bit streams, i.e., a bit stream I and a bit stream Q, and provides the bit streams I and Q to a spreader 1329. The spreader 1329 is comprised of two multipliers, and the two bit streams output from the serial-to-parallel converter 1328 are provided to the two multipliers, respectively, where they are multiplied by a channelization code $C_{OVSF}$ so that they have an orthogonal property with other signals using other channelization codes, thus generating a spread bit stream I and a spread bit stream Q. Here, the spreader 1329 provides the spread bit stream Q to a multiplier 1330 and the spread bit stream I to an adder 1331, respectively. The multiplier 1330 multiplies the bit stream Q output from the spreader 1329 by j and provides its output to the adder 1331. The adder 1331 adds a signal output from the multiplier 1330 to the bit stream I, thus generating one complex bit stream, and provides the generated complex bit stream to a multiplier 1332. The multiplier 1332 multiplies the complex bit stream output from the adder 1331 by a scrambling code $C_{SCRAMBLE}$ in a chip unit (or chip by chip), for scrambling, and provides its output to a multiplier 1333. Here, the multiplier 1332 serves as a scrambler. The multiplier 1333 multiplies a signal output from the multiplier 1332 by a channel gain 1334, and provides its output to the summer 1343.

Meanwhile, HS-DSCH control information 1335 is applied to a serial-to-parallel converter 1336. The serial-to-parallel converter 1336 converts the HS-DSCH control information 1335 into two bit streams, and provides the two bit streams to a spreader 1337. The spreader 1337 is comprised of two multipliers, and the two bit streams are provided to the two multipliers respectively, where they are multiplied by a channelization code $C_{OVSF}$, thus generating a spreaded bit stream I and a spreaded bit stream Q. Here, the spreader 1337 provides the spreaded bit stream Q to a multiplier 1338 and the spreaded bit stream I to an adder 1339, respectively. The multiplier 1338 multiplies the bit stream Q output from the spreader 1337 by j and provides its output to the adder 1339. The adder 1339 adds a signal output from the multiplier 1338 to the bit stream I, thus generating one complex bit stream, and provides the generated complex bit stream to a multiplier 1340. The multiplier 1340 multiplies the complex bit stream output from the adder 1339 by a scrambling code $C_{SCRAMBLE}$ in a chip unit, for scrambling, and provides its output to a multiplier 1341. Here, the multiplier 1340 serves as a scrambler. The multiplier 1341 multiplies a signal output from the multiplier 1340 by a channel gain 1342, and provides its output to the summer 1343. The summer 1343 sums up the generated DPCH signal (or the signal output from the multiplier 1333), the generated SHCCH signal (or the signal output from the multiplier 1341), and the generated HS-DSCH signal (or the signal output from the multiplier 1311), and provides the summed signal to a filter 1344. The filter 1344 filters a signal output from the summer 1343, and provides the filtered signal to an RF (Radio Frequency) processor 1345. The RF processor 1345 converts a signal output from the filter 1344 into an RF band signal, and transmits the RF band signal on the air through an antenna 1346.

If the HS-DSCH indicator and the HS-DSCH power level are transmitted over a separate DPCH, or S-DPCH as described in conjunction with FIG. 11, the Node B of FIG. 13 should be modified such that a channelization code distinguishable from a channelization code used for a general DPCH, or P-DPCH is allocated to the S-DPCH.

Up to the present, the transmission apparatus structure of the Node B which transmits the HS-DSCH indicator and the HS-DSCH power level over DPCH has been described with reference to FIG. 13. Next, a transmission apparatus structure of a Node B that transmits the HS-DSCH indicator and the HS-DSCH power level over SHCCH will be described with reference to FIG. 14.

Figure 14:
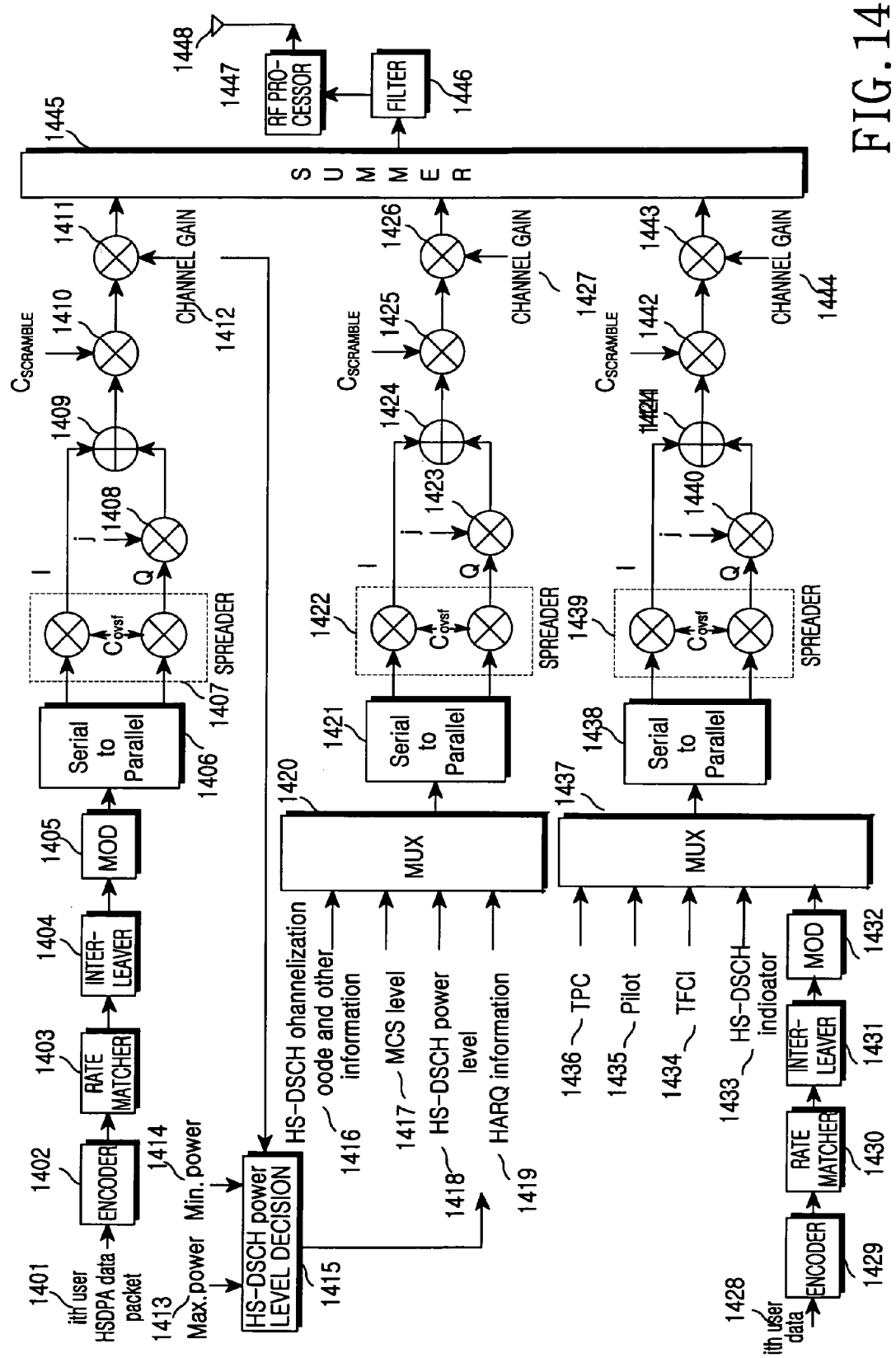
FIG. 14 is a block diagram illustrating a transmission apparatus structure of a Node B corresponding to the downlink channel structure of FIG. 12.

FIG. 14 is a block diagram illustrating a transmission apparatus structure of a Node B in a communication system employing HSDPA according to another embodiment of the present invention. Elements represented by reference numeral 1401 to 1415 of FIG. 14 are identical in structure and operation to elements represented by 1301 to 1315 of FIG. 13, so a detailed description will not be provided.

HS-DSCH power level 1418 determined by an HS-DSCH power level determiner 1415 is provided to a multiplexer 1420 along with HS-DSCH channelization code and other information 1416, MCS level 1417 and HARQ control information 1419. The multiplexer 1420 multiplexes the HS-DSCH power level 1418, the HS-DSCH channelization code and other information 1416, the MCS level 1417 and the HARQ control information 1419 to be suitable to a slot format of the SHCCH, and provides its output to a serial-to-parallel converter 1421. The serial-to-parallel converter 1421 parallel converts one bit stream output from the multiplexer 1420 into two bit streams, i.e., a bit stream I and a bit stream Q, and provides the bit streams I and Q to a spreader 1422. The spreader 1422 is comprised of two multipliers, and the two bit streams output from the serial-to-parallel converter 1421 are provided to the two multipliers, respectively, where they are multiplied by a channelization code $C_{OVSF}$ so that they have an orthogonal property with other signals using other channelization codes, thus generating a spreaded bit stream I and a spreaded bit stream Q. Here, the spreader 1422 provides the spreaded bit stream Q to a multiplier 1423 and the spreaded bit stream I to an adder 1424, respectively. The multiplier 1423 multiplies the bit stream Q output from the spreader 1422 by j and provides its output to the adder 1424. The adder 1424 adds a signal output from the multiplier 1423 to the bit stream I, thus generating one complex bit stream, and provides the generated complex bit stream to a multiplier 1425. The multiplier 1425 multiplies the complex bit stream output from the adder 1424 by a scrambling code $C_{SCRAMBLE}$ in a chip unit, for scrambling, and provides its output to a multiplier 1426. Here, the multiplier 1425 serves as a scrambler. The multiplier 1426 multiplies a signal output from the multiplier 1425 by a channel gain 1427, and provides its output to a summer 1445.

User data 1428 to be transmitted over DPCH is applied to an encoder 1429. The encoder 1429 encodes the user data 1428 by preset coding, and provides its output to a rate matcher 1430. The rate matcher 1430 performs rate matching on a signal output from the encoder 1429 through symbol repetition and puncturing so that the number of output bits is matched to the number of bits to be transmitted over an actual physical channel, and provides the rate-matched signal to an interleaver 1431. The interleaver 1431 interleaves a signal output from the rate matcher 1430 in a preset manner, and provides the interleaved signal to a modulator 1432. The modulator 1432 modulates a signal output from the interleaver 1431 by preset modulation, and provides the modulated signal to a multiplexer 1437. The multiplexer 1437 multiplexes HS-DSCH indicator 1433, TFCI 1434, Pilot 1435 for estimating a downlink channel condition, and TPC 1436 for uplink transmission power control, thus generating one bit stream, and provides the generated bit stream to a serial-to-parallel converter 1438.

The serial-to-parallel converter 1438 parallel converts the one bit stream output from the multiplexer 1437 into two bit streams, i.e., a bit stream I and a bit stream Q, and provides the bit streams I and Q to a spreader 1439. The spreader 1439 is comprised of two multipliers, and the two bit streams output from the serial-to-parallel converter 1438 are provided to the two multipliers, respectively, where they are multiplied by a channelization code $C_{OVSF}$ so that they have an orthogonal property with other signals using other channelization codes, thus generating a spreaded bit stream I and a spreaded bit stream Q. Here, the spreader 1439 provides the spreaded bit stream Q to a multiplier 1440 and the spreaded bit stream I to an adder 1441, respectively. The multiplier 1440 multiplies the bit stream Q output from the spreader 1439 by j and provides its output to the adder 1441. The adder 1441 adds a signal output from the multiplier 1440 to the bit stream I, thus generating one complex bit stream, and provides the generated complex bit stream to a multiplier 1442. The multiplier 1442 multiplies the complex bit stream output from the adder 1441 by a scrambling code $C_{SCRAMBLE}$ in a chip unit, for scrambling, and provides its output to a multiplier 1443. Here, the multiplier 1442 serves as a scrambler. The multiplier 1443 multiplies a signal output from the multiplier 1442 by a channel gain 1444, and provides its output to the summer 1445.

The summer 1445 sums up the generated DPCH signal (or the signal output from the multiplier 1443), the generated SHCCH signal (or the signal output from the multiplier 1426), and the generated HS-DSCH signal (or the signal output from the multiplier 1411), and provides the summed signal to a filter 1446. The filter 1446 filters a signal output from the summer 1445, and provides the filtered signal to an RF processor 1447. The RF processor 1447 converts a signal output from the filter 1446 into an RF band signal, and transmits the RF band signal on the air through an antenna 1448.

Meanwhile, in the case where the HS-DSCH indicator is transmitted over a separate channel using a channelization code different from that of DPCH as described in conjunction with FIG. 12, the present invention may provide a transmission apparatus that transmits the HS-DSCH power level over SHCCH.

Figure 15:
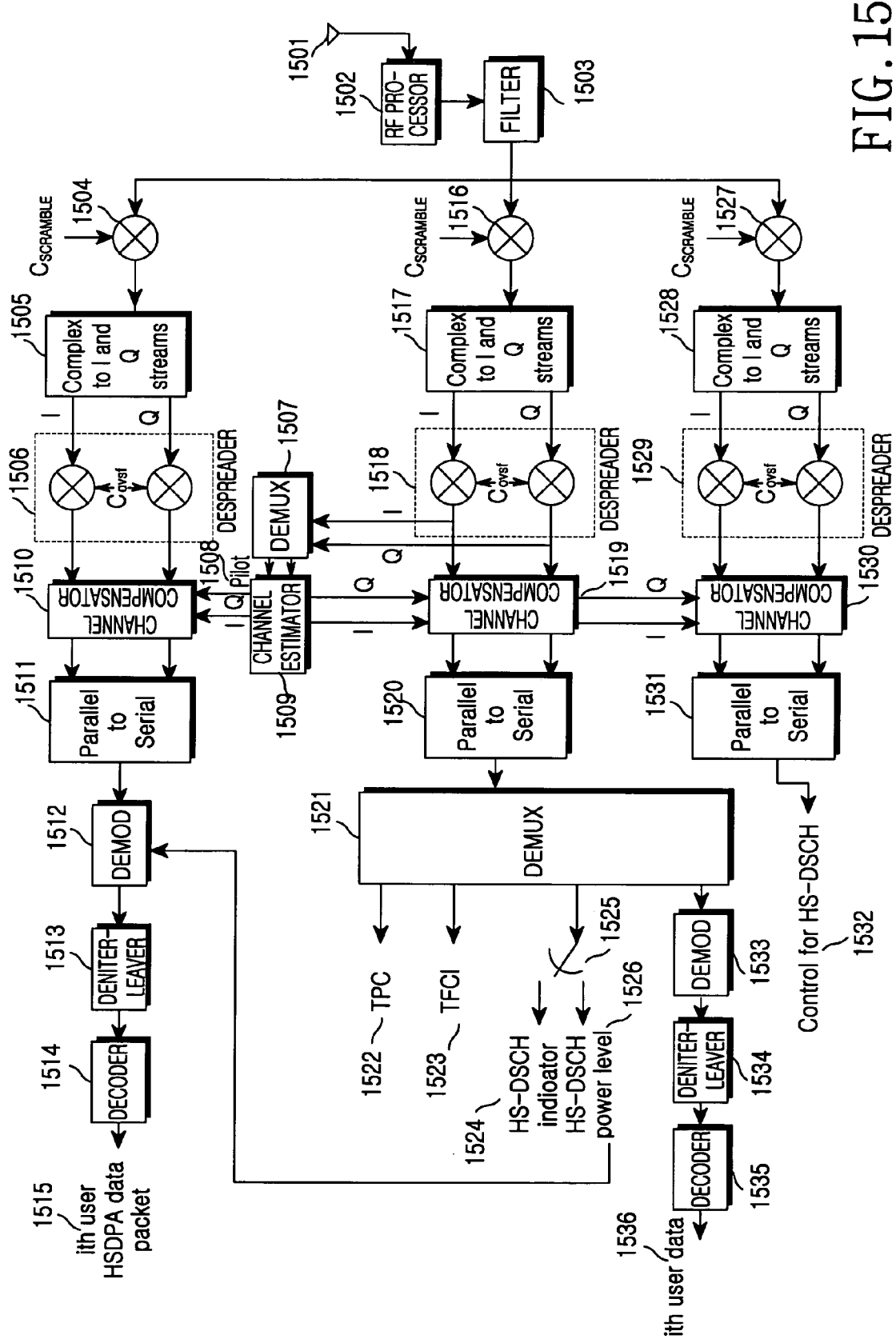
FIG. 15 is a block diagram illustrating a reception apparatus structure of a UE corresponding to the transmission apparatus of the Node B shown in FIG. 13.

FIG. 15 is a block diagram illustrating a receiver apparatus structure of a UE corresponding to the transmitter apparatus of the Node B shown in FIG. 13. Referring to FIG. 15, an RF band signal received through an antenna 1501 is applied to an RF processor 1502. The RF processor 1502 converts the received RF band signal into a base band signal and provides the base band signal to a filter 1503. The filter 1503 filters a signal output from the RF processor 1502, and provides its output in common to multipliers 1504, 1516 and 1527. Here, the multipliers 1504, 1516 and 1527, each serving as a descrambler, multiply their input signals by a descrambling code $C_{DESCRAMBLE}$ for the channels transmitted by the transmission apparatus of the Node B. As a result, the multiplier 1504 outputs an HS-DSCH signal (or a downlink data channel), the multiplier 1516 outputs a downlink DPCH signal, and the multiplier 1527 outputs an SHCCH signal.

A complex signal output from the multiplier 1504 is applied to a complex to I and Q streams part 1505. The complex to I and Q streams part 1505 separates a signal output from the multiplier 1504 into a real signal I and an imaginary signal Q, and provides them to a despreader 1506. The despreader 1506 multiplies the real signal I and the imaginary signal Q from the complex to I and Q streams part 1505 by a channelization code $C_{OVSF}$ used in the transmission apparatus of the Node B, for despreading, and provides its outputs to a channel compensator 1510. Likewise, a complex signal output from the multiplier 1516 is applied to a complex to I and Q streams part 1517. The complex to I and Q streams part 1517 separates a signal output from the multiplier 1516 into a real signal I and an imaginary signal Q, and provides them to a despreader 1518. The despreader 1518 multiplies the real signal I and the imaginary signal Q from the complex to I and Q streams part 1517 by a channelization code $C_{OVSF}$ used in the transmission apparatus of the Node B, for despreading, and provides its outputs to a channel compensator 1519 and a demultiplexer 1507. Further, a complex signal output from the multiplier 1527 is applied to a complex to I and Q streams part 1528. The complex to I and Q streams part 1528 separates a signal output from the multiplier 1527 into a real signal I and an imaginary signal Q, and provides them to a despreader 1529. The despreader 1529 multiplies the real signal I and the imaginary signal Q from the complex to I and Q streams part 1528 by a channelization code $C_{OVSF}$ used in the transmission apparatus of the Node B, for despreading, and provides its outputs to a channel compensator 1530. The output signals I and Q of the despreader 1518 are provided to the demultiplexer 1507. The demultiplexer 1507 demultiplexes the output signals I and Q of the despreader 1518, and outputs Pilot 1508. The Pilot 1508 output is applied to a channel estimator 1509. The channel estimator 1509 detects a channel estimated value through distortion estimation on a radio channel, and provides the channel estimated value to the channel compensators 1510, 1519 and 1530.

The channel compensators 1510, 1519 and 1530 compensate for distortion of signals output from the despreaders 1506, 1518 and 1529, respectively, using the channel estimated value. That is, the channel estimator 1510 outputs HS-DSCH data into two bit streams, the channel compensator 1519 outputs DPCH data into two bit streams, and the channel compensator 1531 outputs SHCCH data into two bit streams. Signals output from the channel compensators 1510, 1519 and 1530 are applied to parallel-to-serial converters 1511, 1520 and 1531, respectively. The parallel-to-serial converters 1511, 1520 and 1531 each serial convert the signals output from the channel compensators 1510, 1519 and 1530 into one bit stream, respectively.

A signal output from the parallel-to-serial converter 1531 is finally output as HS-DSCH control information, and a signal output from the parallel-to-serial converter 1520 is demultiplexed by a demultiplexer 1521 into TPC 1522, TFCI 1523, and HS-DSCH indicator 1524 and HS-DSCH power level 1526 distinguished by a switch 1525. The demultiplexer 1521 further outputs a downlink data signal, and the downlink data signal undergoes channel decoding by a demodulator 1533, a deinterleaver 1534 and a decoder 1535, and is output as downlink user data 1536. Further, a signal output from the parallel-to-serial converter 1511 is subject to channel decoding by a demodulator 1512, a deinterleaver 1513 and a decoder 1514, and is finally output as a downlink data packet 1515. Here, if the downlink data packet 1515 was QAM-modulated, the decoder 1514 QAM-modulates the downlink data packet 1515 using the received HS-DSCH power level 1526.

Figure 16:
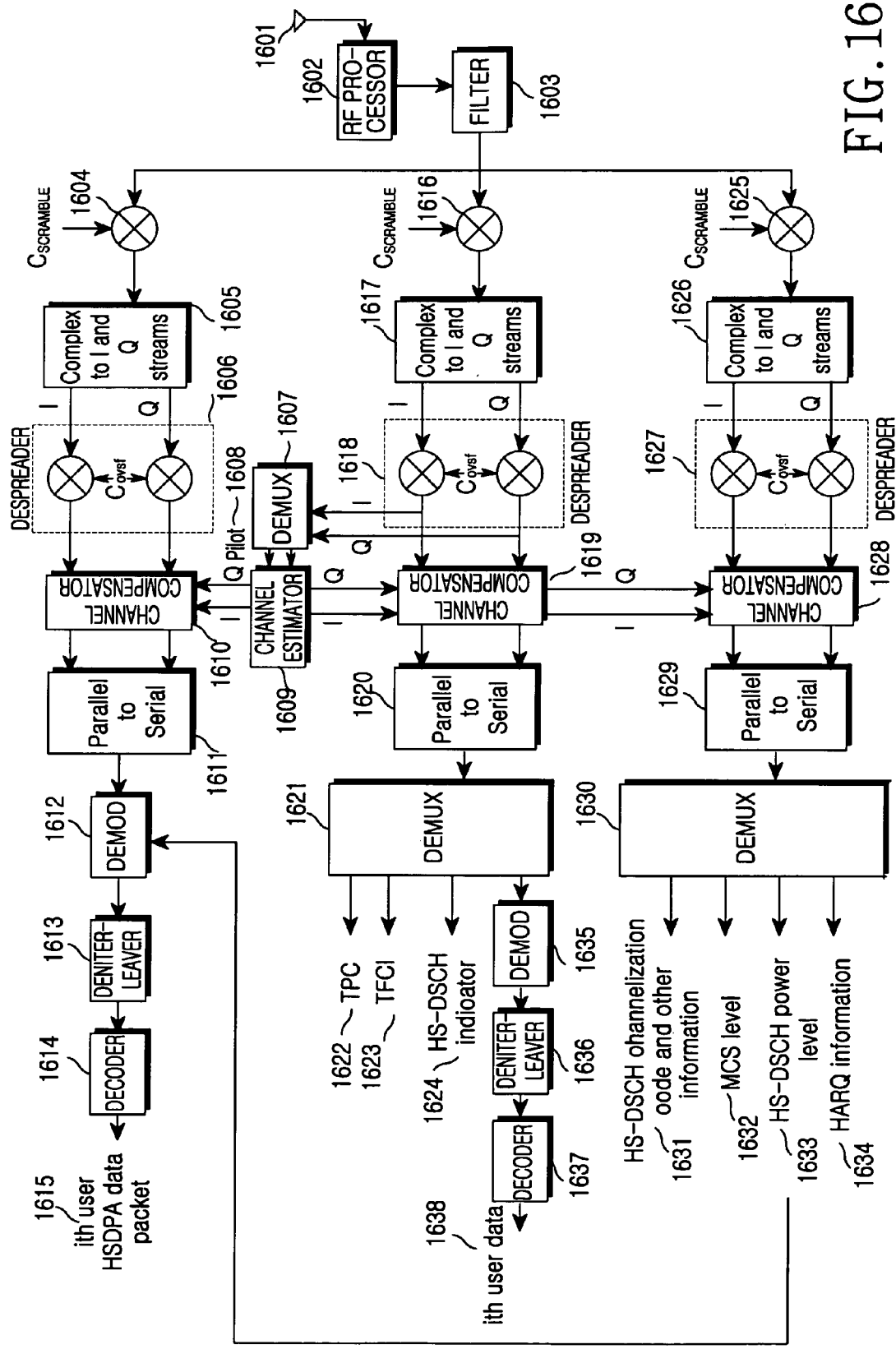
FIG. 16 is a block diagram illustrating a reception apparatus of a UE corresponding to the transmission apparatus of the Node B shown in FIG. 14.

FIG. 16 is a block diagram illustrating a receiver apparatus of a UE in a communication system employing HSDPA according to another embodiment of the present invention. In particular, FIG. 16 illustrates a structure corresponding to the transmitter apparatus of the Node B described in conjunction with FIG. 14.

Referring to FIG. 16, an RF band signal received through an antenna 1601 is applied to an RF processor 1602. The RF processor 1602 converts the received RF band signal into a base band signal and provides the base band signal to a filter 1603. The filter 1603 filters a signal output from the RF processor 1602, and provides its output in common to multipliers 1604, 1616 and 1625. Here, the multipliers 1604, 1616 and 1625, each serving as a descrambler, multiply their input signals by a descrambling code $C_{DESRAMBLE}$ for the channels transmitted by the transmission apparatus of the Node B. As a result, the multiplier 1604 outputs an HS-DSCH signal (or a downlink data channel), the multiplier 1616 outputs a downlink DPCH signal, and the multiplier 1625 outputs an SHCCH signal.

A complex signal output from the multiplier 1604 is applied to a complex to I and Q streams part 1605. The complex to I and Q streams part 1605 separates a signal output from the multiplier 1604 into a real signal I and an imaginary signal Q, and provides them to a despreader 1606. The despreader 1606 multiplies the real signal I and the imaginary signal Q from the complex to I and Q streams part 1605 by a channelization code $C_{OVSF}$ used in the transmission apparatus of the Node B, for despreading, and provides its outputs to a channel compensator 1610. Likewise, a complex signal output from the multiplier 1616 is applied to a complex to I and Q streams part 1617. The complex to I and Q streams part 1617 separates a signal output from the multiplier 1616 into a real signal I and an imaginary signal Q, and provides them to a despreader 1618. The despreader 1618 multiplies the real signal I and the imaginary signal Q from the complex to I and Q streams part 1617 by a channelization code $C_{OVSF}$ used in the transmission apparatus of the Node B, for despreading, and provides its outputs to a channel compensator 1619 and a demultiplexer 1607. Further, a complex signal output from the multiplier 1625 is applied to a complex to I and Q streams part 1626. The complex to I and Q streams part 1626 separates a signal output from the multiplier 1625 into a real signal I and an imaginary signal Q, and provides them to a despreader 1627. The despreader 1627 multiplies the real signal I and the imaginary signal Q from the complex to I and Q streams part 1626 by a channelization code $C_{OVSF}$ used in the transmission apparatus of the Node B, for despreading, and provides its outputs to a channel compensator 1628. The output signals I and Q of the despreader 1618 are provided to the demultiplexer 1607. The demultiplexer 1607 demultiplexes the output signals I and Q of the despreader 1618, and outputs Pilot 1608. The Pilot output is applied to a channel estimator 1609. The channel estimator 1609 detects a channel estimated value through distortion estimation on a radio channel, and provides the channel estimated value to the channel compensators 1610, 1619 and 1628.

The channel compensators 1610, 1619 and 1628 compensate for distortion of signals output from the despreaders 1606, 1618 and 1627, respectively, using the channel estimated value. That is, the channel estimator 1610 outputs HS-DSCH data into two bit streams, the channel compensator 1619 outputs DPCH data into two bit streams, and the channel compensator 1628 outputs SHCCH data into two bit streams. Signals output from the channel compensators 1610, 1619 and 1628 are applied to parallel-to-serial converters 1611, 1620 and 1629, respectively. The parallel-to-serial converters 1611, 1620 and 1629 each serial convert the signals output from the channel compensators 1610, 1619 and 1628 into one bit stream, respectively.

A signal output from the parallel-to-serial converter 1629 is applied to a demultiplexer 1630. The demultiplexer 1630 demultiplexes a signal output from the parallel-to-serial converter 1629 into HS-DSCH channelization code and other information 1631, MCS level 1632, HS-DSCH power level 1633 and HARQ information 1634. A signal output from the parallel-to-serial converter 1620 is demultiplexed by a demultiplexer 1621 into TPC 1622, TFCI 1623 and HS-DSCH indicator 1624. The demultiplexer 1621 further outputs a downlink data signal, and the downlink data signal undergoes channel decoding by a demodulator 1636, a deinterleaver 1636 and a decoder 1637, and is finally output as downlink user data 1638. Further, a signal output from the parallel-to-serial converter 1611 is subject to channel decoding by a demodulator 1612, a deinterleaver 1613 and a decoder 1614, and is finally output as a downlink data packet 1615. Here, if the downlink data packet 1615 was QAM-modulated, the decoder 1614 QAM-modulates the downlink data packet 1615 using the received HS-DSCH power level 1633.

Figure 17:
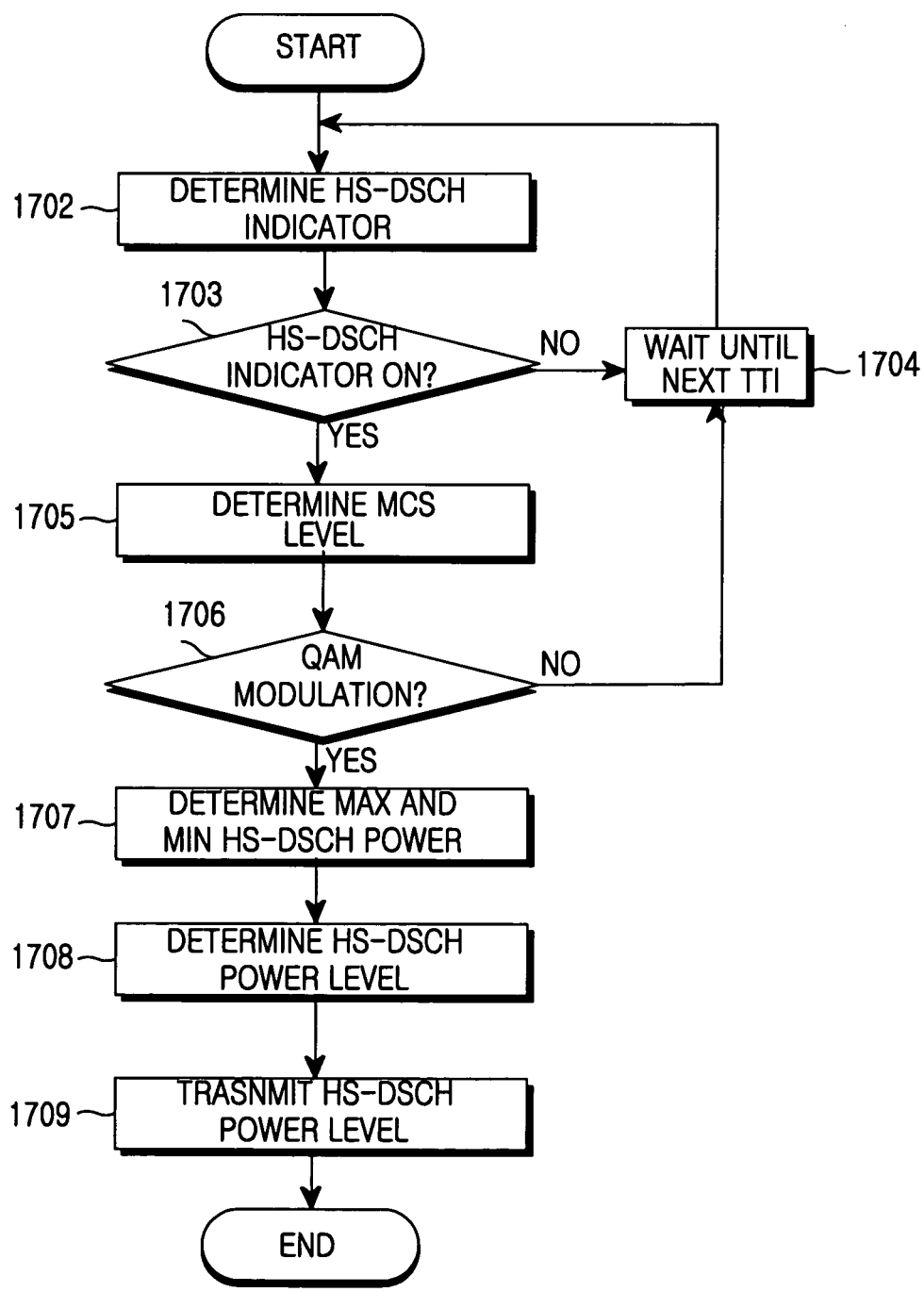
FIG. 17 is a flow diagram illustrating an operating procedure of a Node B in an HSDPA system according to an embodiment of the present invention.

FIG. 17 is a flow diagram illustrating an operating procedure of a Node B in an HSDPA system according to an embodiment of the present invention. In particular, FIG. 17 illustrates a procedure for determining and transmitting an HS-DSCH power level by a Node B.

Referring to FIG. 17, a Node B determines an HS-DSCH indicator indicating presence/absence of an HSDPA data packet in step 1702, and then proceeds to step 1703. Here, the HS-DSCH indicator, as described in conjunction with FIG. 9, is information needed only when a UE receives an HSDPA service, and the Node B determines and transmits an HS-DSCH power level only when the HS-DSCH indicator exists. In particular, "determining an HS-DSCH indicator" means determining whether to turn on or off the HS-DSCH indicator. If there is HSDPA data to transmit over the HS-DSCH, the HS-DSCH indicator is turned on. If there is no HSDPA data to transmit over the HS-DSCH, the HS-DSCH indicator is turned off. In step 1703, the Node B determines whether the HS-DSCH indicator is on. As a result of the determination, if the HS-DSCH indicator is not on, i.e., the HS-DSCH indicator is off, the Node B proceeds to step 1704 where it waits until the next TI, and then returns to step 1702.

If it is determined in step 1703 that the HS-DSCH indicator is on, the Node B proceeds to step 1705. In step 1705, the Node B determines an MCS level that determines a modulation technique and a channel coding technique for the HSDPA data to be transmitted over the HS-DSCH. In step 1706, the Node B determines whether a modulation technique for the HS-DSCH is QAM modulation, by consulting the determined MCS level. As a result of the determination, if the HS-DSCH modulation technique is not the QAM modulation, the Node B returns to step 1704. Otherwise, if the HS-DSCH modulation technique is the QAM modulation, the Node B proceeds to step 1707. In step 1707, since the Node B modulates the HS-DSCH by QAM modulation, it determines the maximum level and the minimum level of HS-DSCH power that can be allocated to one channelization code by the Node B, and then proceeds to step 1708. In step 1708, the Node B determines an HS-DSCH power level based on the maximum level and the minimum level of the HS-DSCH power, and then proceeds to step 1709. In step 1709, the Node B transmits the determined HS-DSCH power level over DPCH or SHCCH, and then ends the procedure.

Figure 18:
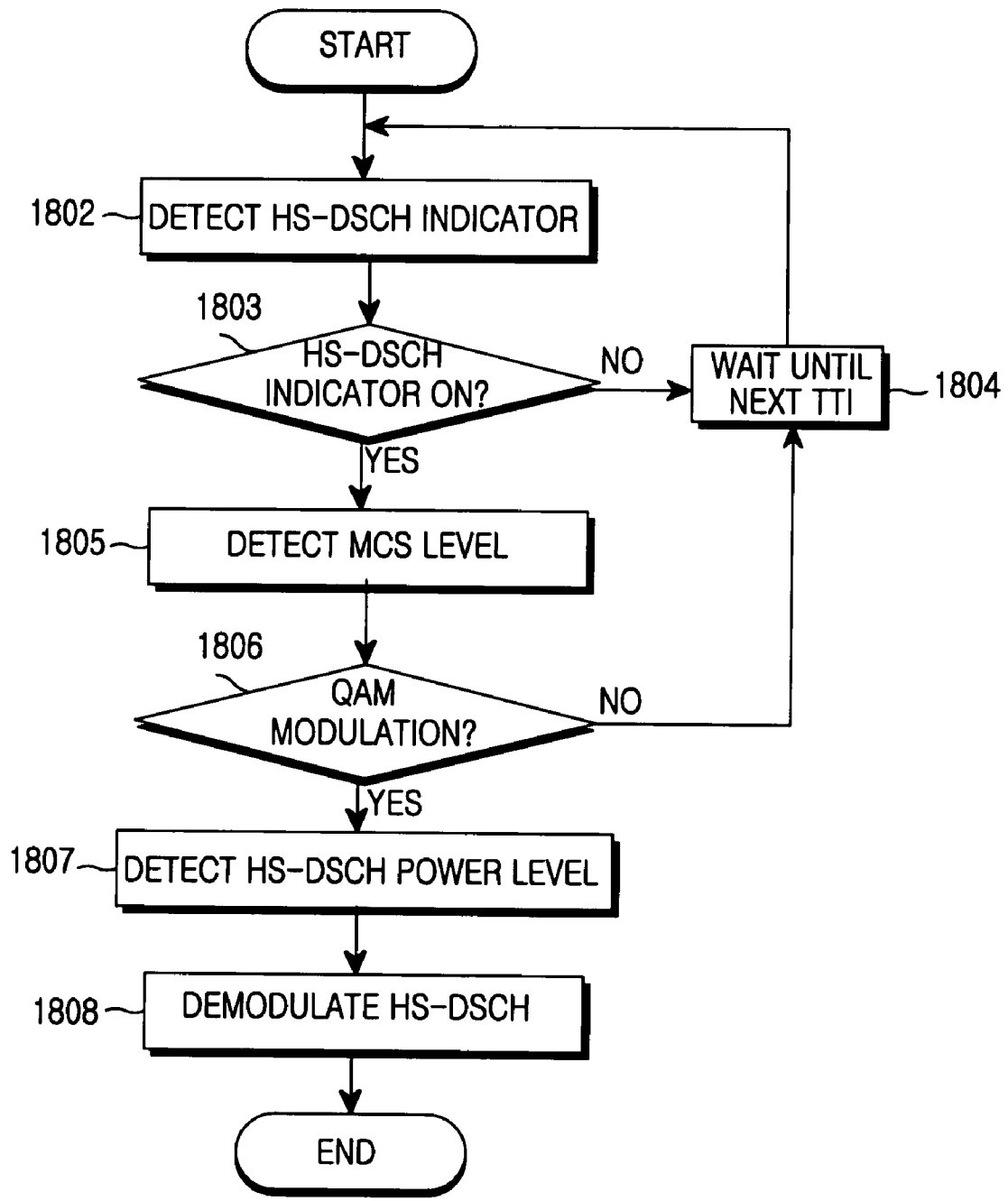
FIG. 18 is a flow diagram illustrating an operating procedure of a UE in an HSDPA system according to an embodiment of the present invention.

FIG. 18 is a flow diagram illustrating an operating procedure of a UE in an HSDPA system according to an embodiment of the present invention. In particular, FIG. 18 illustrates a procedure for receiving an HS-DSCH power level and decoding data based on the received HS-DSCH power level by a UE.

Referring to FIG. 18, a UE detects an HS-DSCH indicator from a received DPCH signal in step 1802, and then proceeds to step 1803. In step 1803, the UE determines whether the detected HS-DSCH indicator is on. As a result of the determination, if the HS-DSCH indicator is not on, i.e., the HS-DSCH indicator is off, the UE proceeds to step 1804. In step 1804, the UE waits until the next TTI, and then returns to step 1802.

If the HS-DSCH indicator is on in step 1803, the UE proceeds to step 1805. In step 1805, the UE detects an MCS level transmitted over SHCCH for the next slots in TTI where the HS-DSCH indicator is turned on, and then proceeds to step 1806. In step 1806, the UE determines whether the detected MCS level indicates QAM modulation. As a result of the determination, if the MCS level does not indicate the QAM modulation, the UE returns to step 1804. However, if the MCS level indicates the QAM modulation, the UE proceeds to step 1807. In step 1807, since the MCS level indicates QAM modulation, the UE detects an HS-DSCH power level from SHCCH, if it has the channel structure described in conjunction with FIG. 10. In step 1808, the UE demodulates the HS-DSCH depending on the detected HS-DSCH power level, and then ends the procedure.

So far, the procedure for determining an HS-DSCH power level for reliable demodulation of HS-DSCH and transmitting/receiving the determined HS-DSCH power level has been described. Next, a description will be made of a procedure for determining an uplink power offset for controlling a transmission power level of an uplink HS-DPCCH (High Speed-Dedicated Physical Control Channel), and transmitting/receiving the determined uplink power offset.

Figure 7:
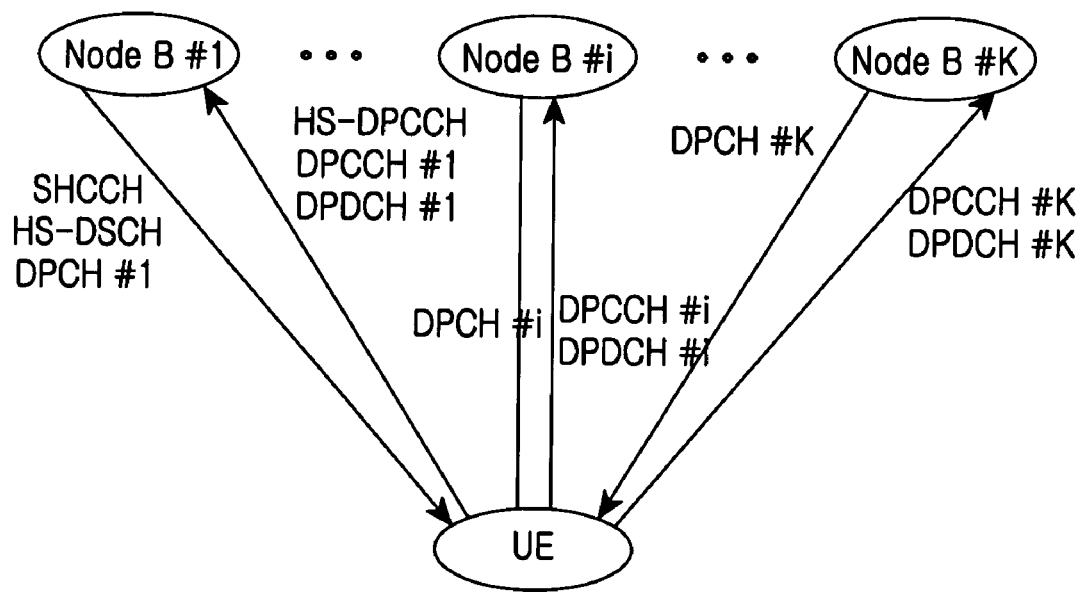
FIG. 7 schematically illustrates a channel allocation scheme for a UE located in a soft handover region in a general communication system employing HSDPA.
Figure 19:
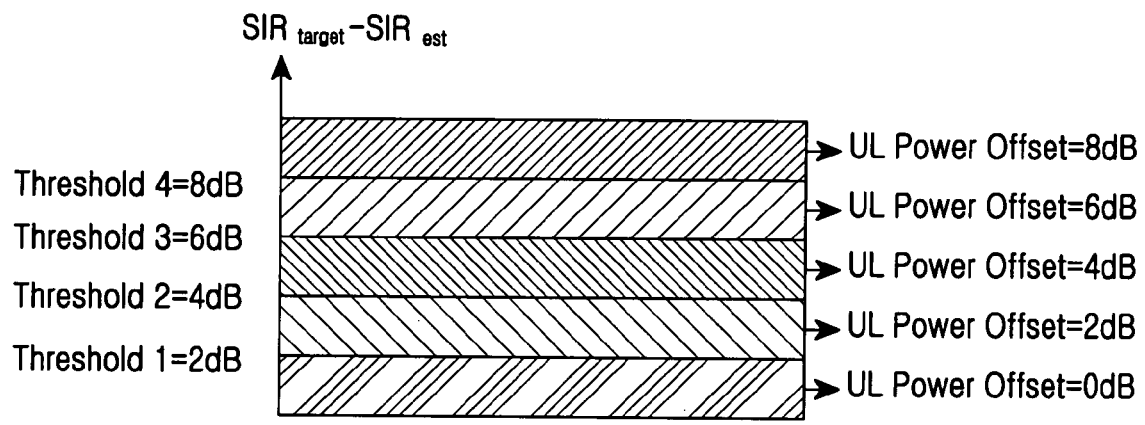
FIG. 19 illustrates a method of determining an uplink power offset according to an embodiment of the present invention.

FIG. 19 illustrates a method of determining an uplink power offset according to an embodiment of the present invention. As described in conjunction with FIG. 7, in a communication system employing HSDPA, if a UE is located in a soft handover region, uplink transmission power of HS-DPCCH may be reduced. However, it is difficult for a Node B to continuously monitor whether the UE is located in the soft handover region. Therefore, if a difference between a target SIR (Signal-to-Interference Ratio) $SIR_{target}$ previously set in the Node B and an estimation SIR $SIR_{est}$ estimated based on pilot bits received over DPCCH (Dedicated Physical Control Channel) from a UE is greater than a preset threshold #1, the present invention determines that a corresponding channel is in a bad condition. Thereafter, the invention compares the SIR difference with thresholds to determine a power offset according to an uplink channel condition. That is, the invention compensates uplink transmission power not only when the UE is simply located in the soft handover region, but also when the uplink channel condition is bad. FIG. 19 shows how the Node B determines an uplink power offset using a difference between $SIR_{target}$ and $SIR_{est}$. Although the thresholds can be arbitrarily determined by the Node B, it will be assumed in FIG. 19 that the thresholds are set to multiples of 2 dB. That is, if a difference between $SIR_{target}$ and $SIR_{est}$ for a threshold 2 dB is equal to or greater than 2 dB and equal to or less than 4 dB, an uplink power offset is set to 2 dB, and the Node B transmits the determined uplink power offset to the UE. Upon receiving the uplink power offset from the Node B, the UE increases uplink transmission power by the received uplink power offset 2 dB.

Meanwhile, the present invention defines a difference between $SIR_{target}$ and $SIR_{est}$ of an uplink DPCCH as an uplink power offset and increases transmission power of only the uplink HS-DPCCH by the uplink power offset, and applies the existing power control method to the other channels DPCCH and DPDCH. Transmission power of the HS-DPCCH is increased by the uplink power offset only when a channel condition is determined to be bad based on the power determined by a ratio to transmission power of the existing DPCCH each time.

FIG. 20 illustrates a table representing bit values for transmitting an uplink power offset according to an embodiment of the present invention. FIG. 20 shows bits with which the Node B transmits to the UE the uplink power offset determined as described in conjunction with FIG. 19. If it is not necessary to transmit an uplink power offset over a downlink for a good uplink channel condition i.e., if the uplink power offset is 0 dB, the Node B performs DTX process. This means that the Node B transmits the uplink power offset over the downlink only when the uplink channel condition is bad, and however, performs DTX process when the uplink channel condition is good, thereby adaptively transmitting the uplink power offset according to the channel condition. Here, that the uplink power offset is 0 dB means that since reliability of an uplink HS-DSPCCH is guaranteed due to its good channel condition, it is possible to control uplink transmission power only with a downlink TPC command while maintaining a constant power ratio to the existing DPCCH. As described above, only when the channel condition is bad, the Node B transmits an uplink power offset thus to perform uplink power control according to the uplink power offset. In order to transmit the uplink power offset to the UE, if the number of uplink power offsets except the uplink power offset 0 dB is $2^K$ as illustrated in FIG. 20, the number of downlink transmission bits for transmitting the uplink power offsets can be set to K. In FIG. 20, since uplink power offsets except the uplink power offset 0 dB have 2 dB, 4 dB, 6 dB and 8 dB, they can be expressed with 2 bits. For example, the uplink power offsets can be expressed with downlink transmission bits 00, 01, 10, and 11.

Figure 21:
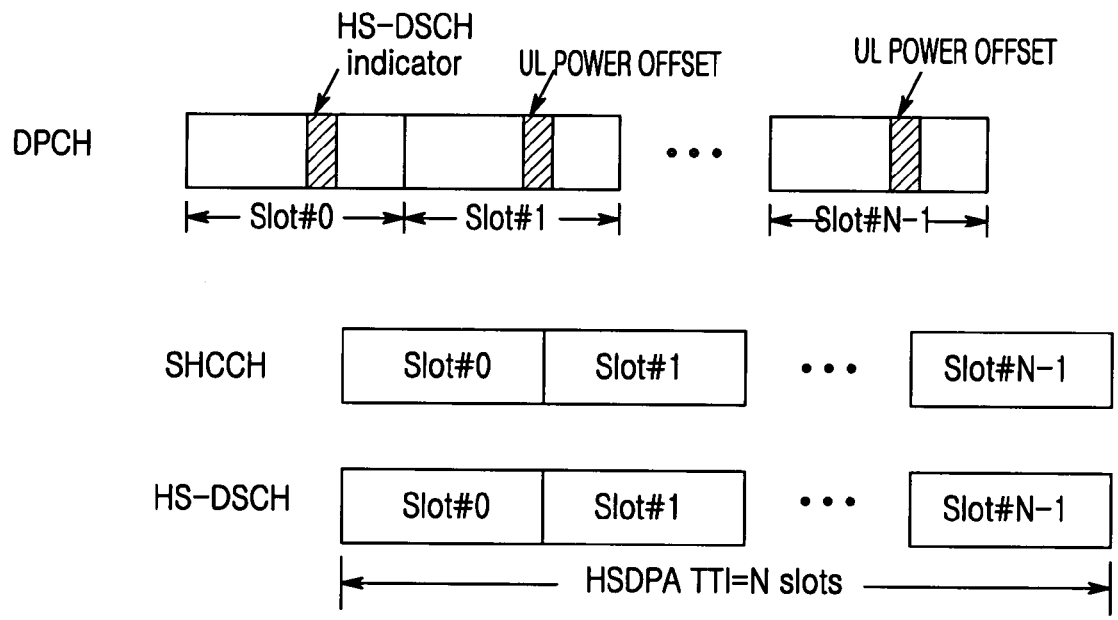
FIG. 21 schematically illustrates a downlink channel structure of a communication system employing HSDPA according to another embodiment of the present invention.

FIG. 21 schematically illustrates a downlink channel structure of a communication system employing HSDPA according to another embodiment of the present invention. Referring to FIG. 21, the channels that can transmit an uplink power offset include a downlink DPCH, and an SHCCH for controlling HS-DSCH, as described in conjunction with FIG. 1. However, since the SHCCH already transmits such control information as MCS level for the HSDPA service, HS-DSCH channelization code, HARQ processor number and HARQ packet number, it has no room to transmit other control information.

However, if one TTI (Transmission Time Interval) has N (=$N_1+N_2$) slots as also illustrated in FIG. 1, an HS-DSCH indicator is separately transmitted for $N_1$ slots and a section transmitting the HS-DSCH indicator for the remaining $N_2$ slots is subject to DTX. Therefore, the uplink power offset can be separately transmitted over an HS-DSCH indicator part on a slot in the DPCH, the slot not transmitting the HS-DSCH indicator. Since a position of the slot transmitting the HS-DSCH indicator is variable, a position of a slot transmitting the uplink power offset is also variable. In addition, the uplink power offset can be transmitted from a Node B to a UE for a period of TTI. Alternatively, the uplink power offset can be transmitted for a period of slots or a frame, if there are many bits indicating the uplink power offset to be transmitted. In FIG. 21, an HS-DSCH indictor is transmitted only for a first slot Slot#0 in TTI, and an uplink power offset is transmitted over the HS-DSCH indicator parts in a second slot Slot#1 and an $N^{th}$ slot Slot#(N−1) among the remaining (N−1) slots. The other downlink channels, i.e., the SHCCH and the HS-DSCH have the same structure as that described in conjunction with FIG. 1. Meanwhile, the uplink power offset, as it is a value for controlling uplink transmission power of HS-DSCH for HSDPA, is a value needed only when a UE is receiving the HSDPA service. Therefore, the uplink power offset is transmitted only when there exists HSDPA service data, i.e., when there exists an HS-DSCH indicator, so the Node B must determine the uplink power offset by always monitoring the channel condition. Alternatively, it is possible to allow the UE never to read the uplink power offset. In addition, as described in conjunction with FIG. 20, the Node B performs DTX if the uplink power offset is 0 dB, and transmits the uplink power offset only when necessary according to the channel condition. If the number of bits indicating the uplink power offset determined by FIG. 20 is K and the number of bits that can be transmitted over (N−1) sots is n as illustrated in FIG. 21, the uplink power offset can be transmitted using an error correction code such as an (n,k) block code.

Figure 22:
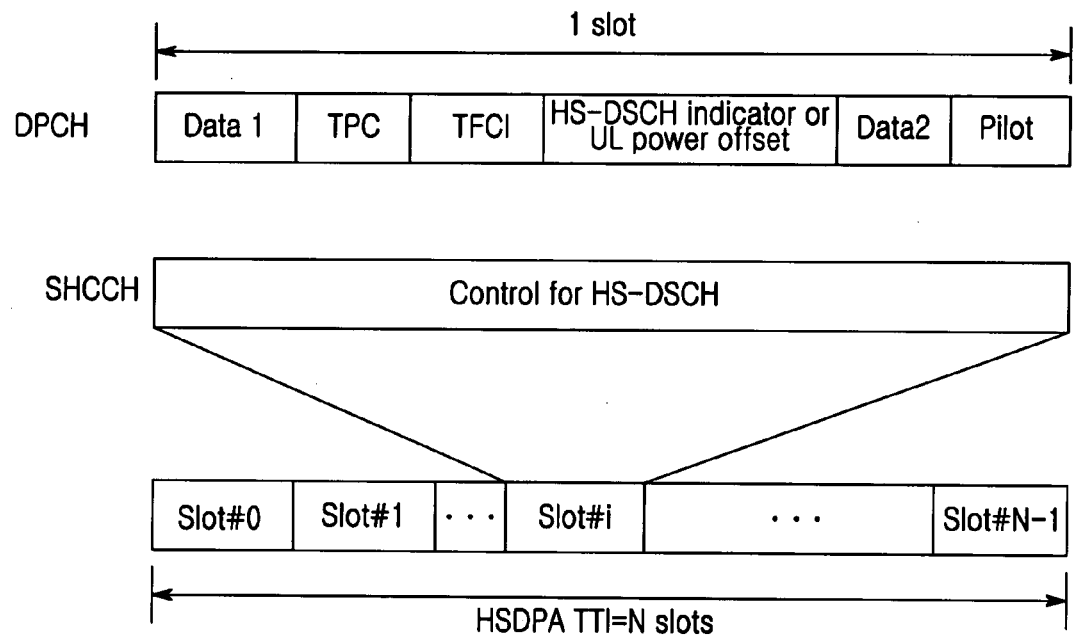
FIG. 22 illustrates a downlink DPCH structure for a communication system employing HSDPA according to another embodiment of the present invention.

FIG. 22 illustrates a downlink DPCH structure for a communication system employing HSDPA according to another embodiment of the present invention. Referring to FIG. 22, DPCH includes a downlink DPCH structure defined in an existing CDMA communication system not supporting the HSDPA service, e.g., defined in the Release-99, and the structure has the following fields. A Data1 field and a Data2 field transmit data for supporting an operation of an upper layer, or data for supporting a voice-only service. A TPC field transmits a downlink TPC command for controlling uplink transmission power, and a TFCI field transmits TFC information of the Data1 and Data2 fields. A Pilot field is a field for transmitting a pilot symbol stream previously defined by the system, and is used by a UE to estimate a downlink channel condition. The HS-DSCH indicator for the HSDPA service and the uplink power offset, as illustrated in FIG. 9, are transmitted to the UE through a newly defined field in an existing Release-99 downlink DPCH. FIG. 22 shows a case where the HS-DSCH indicator and the uplink power offset are transmitted over a newly defined field in the existing downlink DPCH. Meanwhile, with reference to FIG. 23, a description will be made of a case where the HS-DSCH indicator and the uplink power offset are transmitted over a new downlink DPCH instead of a specific field in the existing downlink DPCH.

Figure 23:
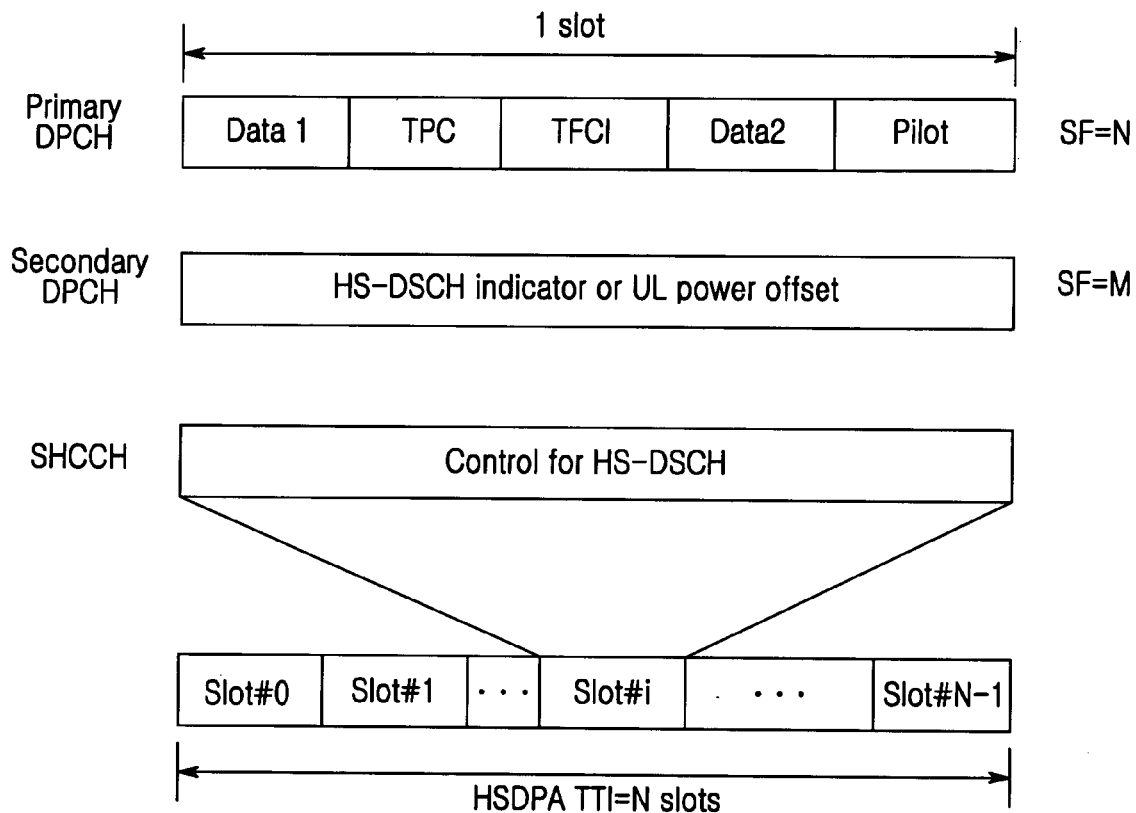
FIG. 23 illustrates a downlink DPCH structure for a communication system employing HSDPA according to another embodiment of the present invention.

FIG. 23 illustrates a downlink DPCH structure for a communication system employing HSDPA according to another embodiment of the present invention. Referring to FIG. 23, the HS-DSCH indicator or the uplink power offset are transmitted over a new downlink DPCH allocated a separate channelization code, instead of a specific field in the existing downlink DPCH. Two downlink DPCHs, i.e., P-DPCH and S-DPCH, are allocated. Since the S-DPCH for transmitting the HS-DSCH indicator or the uplink power offset is different from the P-DPCH in an amount of transmission data, the P-DPCH is allocated an SF N and the S-DPCH is allocated an SF M. If the HS-DSCH indicator and the uplink power offset to be transmitted have a small data amount, the SF value M of the S-DPCH is set to a relatively large value, e.g., M=512, thus to increase utilization efficiency of a downlink channelization code.

Figure 24:
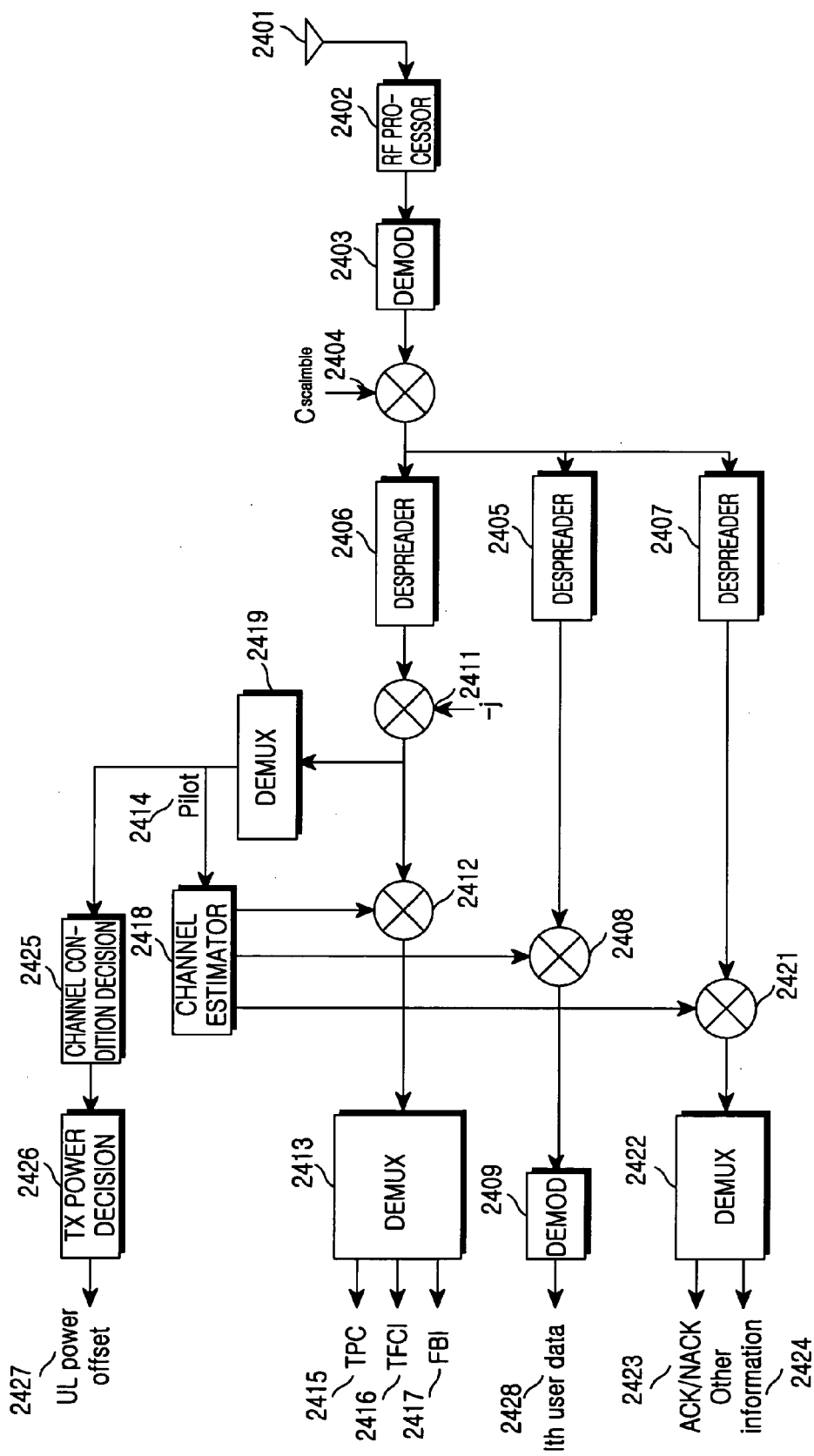
FIG. 24 is a block diagram illustrating a reception apparatus structure for a Node B corresponding to the downlink channel structure of FIG. 21.

FIG. 24 is a block diagram illustrating an internal structure of a reception apparatus for a Node B in an HSDPA system according to an embodiment of the present invention. Referring to FIG. 24, a signal received from a UE through an antenna 2401 is applied to an RF processor 2402. The RF processor 2402 converts a signal received from the antenna 2401 into a base band signal and provides the base band signal to a demodulator 2403. The demodulator 2403 demodulates a signal output from the RF processor 2402 by preset demodulation, and provides the demodulated signal to a multiplier 2404. The multiplier 2404 multiplies a signal output from the demodulator 2403 by a scrambling code $C_{scramble}$, for descrambling. Here, the scrambling code, a code prescribed by mutual agreement between the Node B and the UE, enables the Node B to identify a specific UE among a plurality of UEs. A signal output from the multiplier 2404 is applied in common to despreaders 2405, 2406 and 2407. The despreader 2405 performs despreading on an uplink DPDCH signal, the despreader 2406 performs despreading on an uplink DPCCH signal, and the despreader 2407 performs despreading on an HS-DPCCH signal. Here, "perform despreading" means multiplying input signals by preset channelization codes. Of course, the channelization codes should be prescribed by mutual agreement between the Node B and the UEs.

A DPCCH signal output from the despreader 2406 is applied to a multiplier 2411, where it is multiplied by −j and restored to a real signal. Here, the reason for multiplying the input signal by −j is that a UE multiplied the DPCCH signal by j and transmitted it as an imaginary signal. A signal output from the multiplier 2411 is applied in common to a demultiplexer 2419 and a multiplier 2412. The demultiplexer 2419 extracts only Pilot 2414 from the DPCCH signal, and provides it to a channel estimator 2418 and a channel condition determiner 2425. In order to determine whether to transmit an uplink power offset to the UE, the channel condition determiner 2425 calculates a difference between $SIR_{est}$ and $SIR_{target}$, compares the difference with preset thresholds, and provides the comparison result to an uplink power offset determiner 2426. Then the uplink power offset determiner 2426 determines an uplink power offset 2427 according to the comparison result output from the channel condition determiner 2425 as described in conjunction with FIG. 19. During this process, if the Node B has no HSDPA data packet to transmit, i.e., if the HS-DSCH indictor is off as described in conjunction with FIG. 21, the uplink power offset determiner 2426 does not transmit the uplink power offset.

Meanwhile, the channel estimator 2418 estimates a channel condition between the UE and the Node B using Pilot 2414. After channel estimation based on Pilot 2414, the channel estimator 2418 provides a channel estimation value for the estimated channel condition to multipliers 2412, 2408 and 2421. The multiplier 2412 multiplies a signal output from the multiplier 2411 by a signal output from the channel estimator 2418, and provides its output to a demultiplexer 2413. The demultiplexer 2413 demultiplexes a signal output from the multiplier 2412 into TPC 2415, TFCI 2416, and FBI (FeedBack Information) 2417, except Pilot 2414. The TPC 2415 is used to control downlink transmission power, the TFCI 2416 is used to analyze uplink DPDCH, and the FBI 2417 is used to control a gain of a closed-loop transmission antenna. Further, the multiplier 2408 multiplies a signal output from the despreader 2405 by a signal output from the channel estimator 2418, and provides its output to a decoder 2409. The decoder 2409 decodes a signal output from the multiplier 2408 by a decoding technique corresponding to the coding technique used by the UE, e.g., convolutional coding or turbo coding, thus generating user data or upper layer signaling signal 2428, and provides the generated user data or upper layer signaling signal 2428 to an upper layer. In addition, the multiplier 2421 multiplies a signal output from the despreader 2407 by a signal output from the channel estimator 2418, and provides its output to a demultiplexer 2422. The demultiplexer 2422 demultiplexes a signal output from the multiplier 2421 into ACK/NACK 2423 and other information 2424.

Up to date, a reception apparatus for a Node B in an HSDPA system has been described with reference to FIG. 24. Next, a transmission apparatus for a Node B will be described with reference to FIG. 25.

Figure 25:
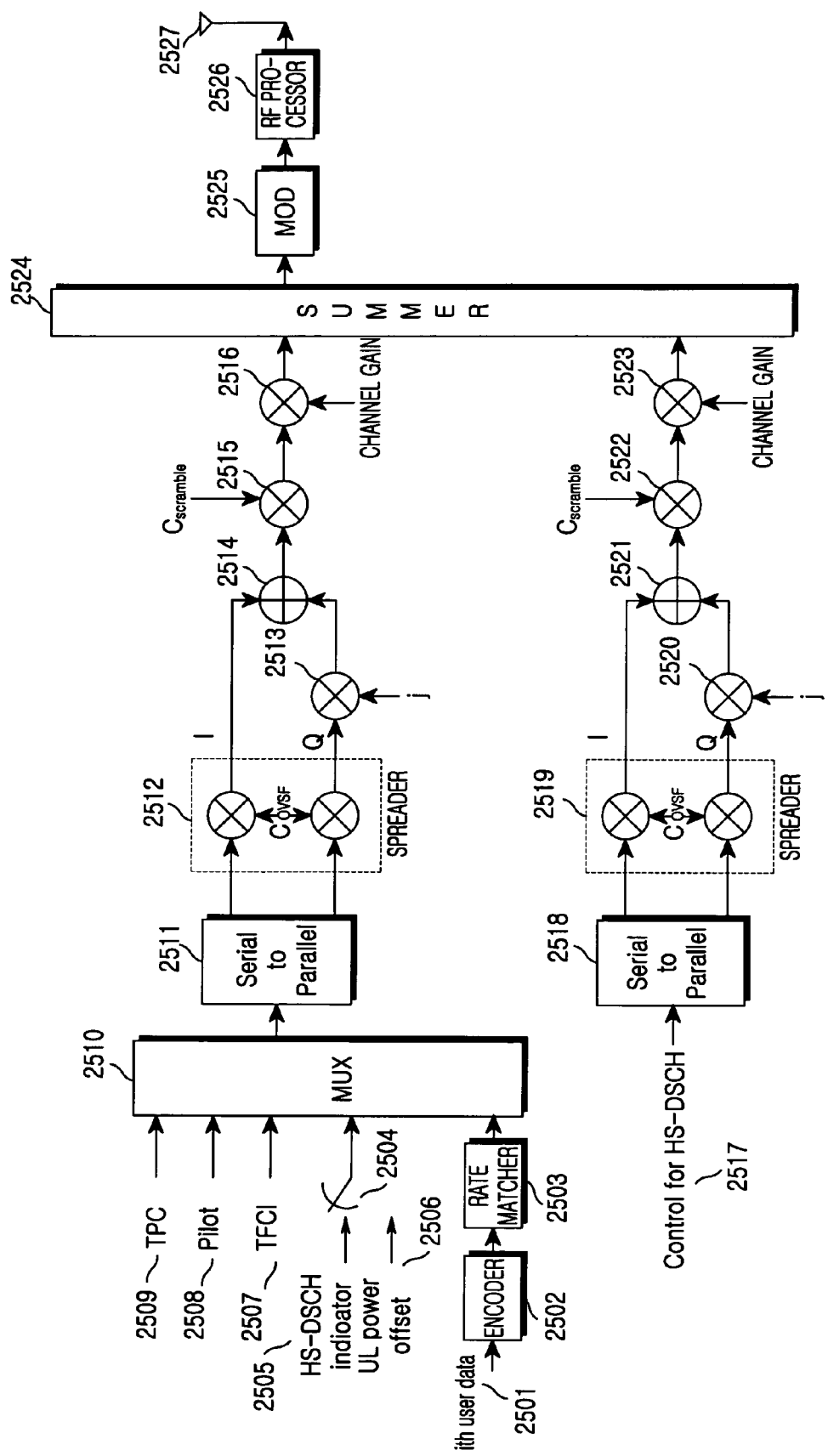
FIG. 25 is a block diagram illustrating a transmission apparatus structure for a Node B corresponding to the downlink channel structure of FIG. 22.

FIG. 25 is a block diagram illustrating an internal structure of a transmission apparatus for a Node B in an HSDPA system according to an embodiment of the present invention. In FIG. 25, the transmission apparatus for a Node B transmits an HS-DSCH indicator or an uplink power offset over one downlink DPCH, in the case where the Node B supports an HSDPA service, and Data1, TPC, TFCI, Data2 and Pilot defined in a communication system not employing HSDPA, e.g., Release-99.

Referring to FIG. 25, user data 2501 to be transmitted over DPCH is applied to an encoder 2502. The encoder 2502 channel encodes the user data 2501, and provides its output to a rate matcher 2503. The rate matcher 2503 performs rate matching on a signal output from the encoder 2502 so that the number of output bits is matched to the number of bits to be transmitted over an actual physical channel, and provides the rate-matched signal to a multiplexer 2510. An HS-DSCH indicator 2505 is generated when there is data to be transmitted to a UE through the HSDPA service, and an uplink power offset 2506 is generated when it must be transmitted according to the channel condition for a period where the HS-DSCH indicator is not transmitted. The generated HS-DSCH indicator 2505 and uplink power offset 2506 are provided to a swich 2504. The switch 2504 switches the HS-DSCH indicator 2505 and the uplink power offset 2506, and provides its output to the multiplexer 2510. Further, TFCI 2507, Pilot 2508 and TPC 2509 generated in the system are also applied to the multiplexer 2510.

The multiplexer 2510 multiplexes a signal output from the rate matcher 2503, a signal output from the switch2504, TFCI 2507, Pilot 2508 and TPC 2509, thus generating one bit stream, and provides the generated bit stream to a serial-to-parallel converter 2511. The serial-to-parallel converter 2511 parallel converts a signal output from the multiplexer 25 10 into two bit streams, i.e., a bit stream I and a bit stream Q, and provides the bit streams I and Q to a spreader 2512. The spreader 2512 is comprised of two multipliers, and the two bit streams output from the serial-to-parallel converter 2511 are provided to the two multipliers, respectively, where they are multiplied by a channelization code $C_{OVSF}$ so that they have an orthogonal property with other signals using other channelization codes, thus generating a spreaded bit stream I and a spreaded bit stream Q. Here, the spreader 2512 provides the spreaded bit stream Q to a multiplier 2513 and the spreaded bit stream I to an adder 2514, respectively. The multiplier 2513 multiplies the bit stream Q output from the spreader 2512 by j and provides its output to the adder 2514. The adder 2514 adds a signal output from the multiplier 2513 to the bit stream I, thus generating one complex bit stream, and provides the generated complex bit stream to a multiplier 2515. The multiplier 2515 multiplies the complex bit stream output from the adder 2514 by a scrambling code $C_{SCRAMBLE}$ in a chip unit (or chip by chip), for scrambling, and provides its output to a multiplier 2516. Here, the multiplier 2515 serves as a scrambler. The multiplier 2516 multiplies a signal output from the multiplier 2515 by a channel gain, and provides its output to the summer 2524. Here, the channel gain, a parameter for determining transmission power of the DPCH, has a large value for a small spreading factor and is variable according to the type of the user data transmitted. So far, the process of generating the DPCH has been described. Next, a process of generating SHCCH will be described.

HS-DSCH control information 2517 is applied to a serial-to-parallel converter 2518. The serial-to-parallel converter 2518 converts the HS-DSCH control information 2517 into two bit streams, i.e., a bit stream I and a bit stream Q, and provides them to a spreader 2519. The spreader 2519 is comprised of two multipliers, and the two bit streams are provided to the two multipliers, respectively, where they are multiplied by a channelization code $C_{OVSF}$, thus generating a spreaded bit stream I and a spreaded bit stream Q. Here, the spreader 2519 provides the spreaded bit stream Q to a multiplier 2520 and the spreaded bit stream I to an adder 2521, respectively. The multiplier 2520 multiplies the bit stream Q output from the spreader 2519 by j and provides its output to the adder 2521. The adder 2521 adds a signal output from the multiplier 2520 to the bit stream I, thus generating one complex bit stream, and provides the generated complex bit stream to a multiplier 2522. The multiplier 2522 multiplies the complex bit stream output from the adder 2521 by a scrambling code $C_{SCRAMBLE}$ in a chip unit, for scrambling, and provides its output to a multiplier 2523. Here, the multiplier 2522 serves as a scrambler. The multiplier 2523 multiplies a signal output from the multiplier 2522 by a channel gain, and provides its output to the summer 2524. The summer 2524 sums up the generated DPCH signal (or the signal output from the multiplier 2516) and the generated SHCCH signal (or the signal output from the multiplier 2523), and provides the summed signal to a modulator 2525. The modulator 2525 modulates a signal output from the summer 2524, and provides the modulated signal to an RF processor 2526. The RF processor 2526 converts a signal output from the modulator 2525 into an RF band signal, and transmits the RF band signal on the air through an antenna 2527.

Figure 26:
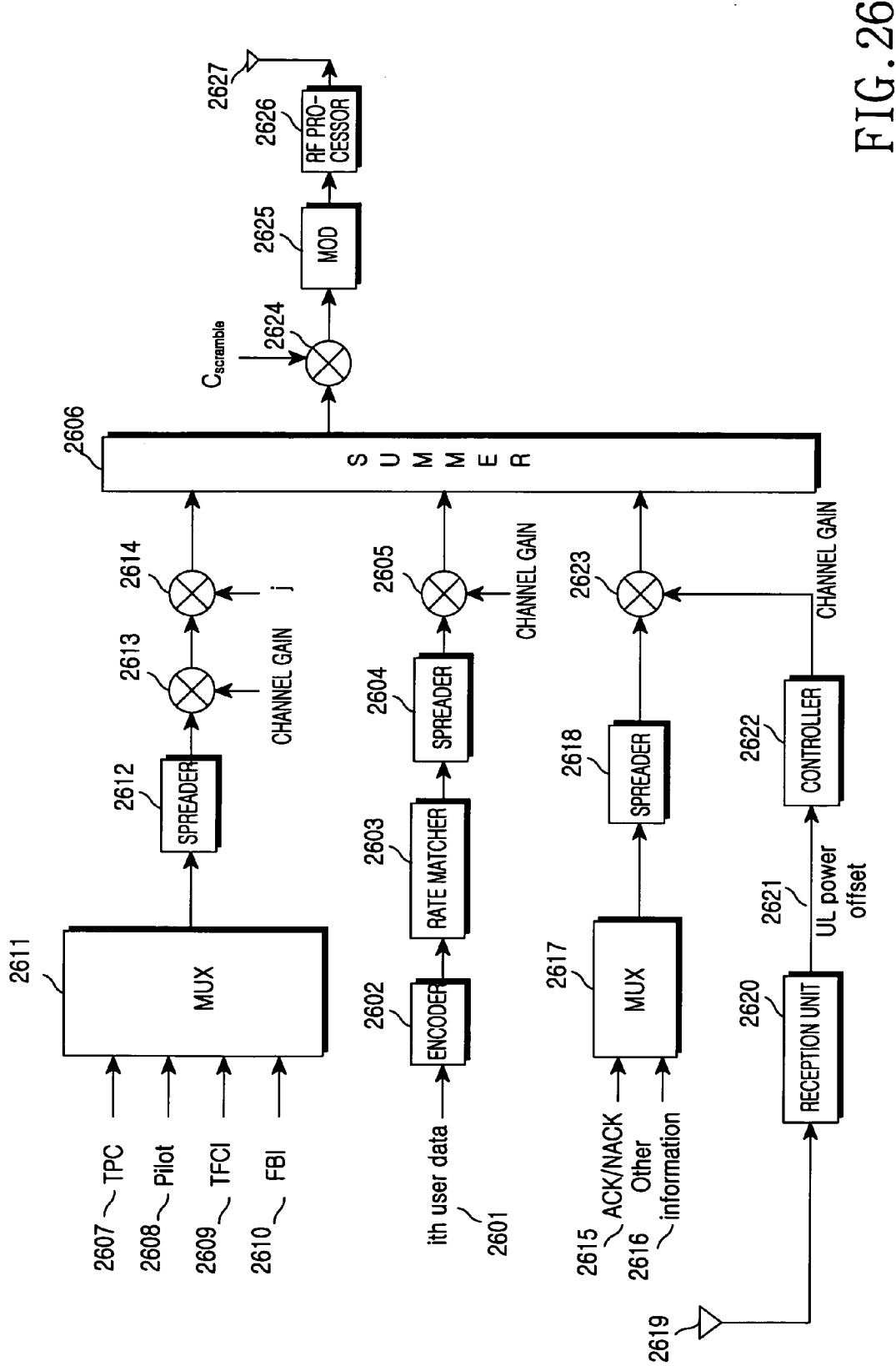
FIG. 26 is a block diagram illustrating a structure of a transceiver apparatus for a UE corresponding to the transmission apparatus of the Node B shown in FIG. 25.

FIG. 26 is a block diagram illustrating an internal structure of a transceiver apparatus for a UE in an HSDPA system according to an embodiment of the present invention. Referring to FIG. 26, user data and upper layer signaling information 2601 is applied to an encoder 2602. The encoder 2602 encodes the user data and upper layer signaling information 2601 by preset coding, e.g., convolutional coding or turbo coding, and provides its output to a rate matcher 2603. The rate matcher 2603 performs rate matching on a signal output from the encoder 2602 through symbol repetition or puncturing, and provides the rate-matched signal to a spreader 2604. The spreader 2604 multiplies a signal output from the rate matcher 2603 by a channelization code, for spreading, and provides the spread signal to a multiplier 2605. The multiplier 2605 multiplies a signal output from the spreader 2604 by a channel gain, and provides its output to a summer 2606. Further, TPC 2607, Pilot 2608, TFCI

2609 and FBI 2610 are applied to a multiplexer 2611. The multiplexer 2611 multiplexes TPC 2607, Pilot 2608, TFCI 2609 and FBI 2610, thus generating DPCCH, and provides the generated DPCCH to a spreader 2612. The spreader 2612 spreads a DPCCH signal output from the multiplexer 2611 by a channelization code preset in the DPCCH, for spreading, and provides its output to a multiplier 2613. The multiplier 2613 multiplies a signal output from the spreader 2612 by a channel gain, and provides its output to a multiplier 2614. The multiplier 2614 multiplies a signal output from the multiplier 2613 by −j, and provides its output to the summer 2606. Here, the reason for multiplying an input signal by −j is because by separating a DPCCH signal and a DPDCH signal into a real part and an imaginary part to decrease frequency of zero crossings occurring in a constellation on a radio frequency, it is possible to reduce a peak-to-average ratio (PAR) at a transmission apparatus of a UE. Generally, the zero crossing occurring in a constellation on a radio frequency increases the PAR, affecting the transmission apparatus of the UE.

In addition, ACK/NACK 2615 and other information 2616 are applied to a multiplexer 2617. The multiplexer 2617 multiplexes ACK/NACK 2615 and other information 2616, and provides its output to a spreader 2618. The spreader 2618 spreads a signal output from the multiplexer 2617 by a channelization code preset in HS-DPCCH, for spreading, and provides its output to a multiplier 2623. Meanwhile, the UE provides a signal received through a reception antenna 2619 to a reception unit 2620. The reception unit 2620 demodulates the received signal to detect an uplink power offset 2621, and provides the detected uplink power offset 2621 to a controller 2622. Here, the reception unit 2620 performs the demodulation through a reverse process to the process of transmitting the uplink power offset in the transmission apparatus for the Node B illustrated in FIGS. 21 and 25. In order to transmit an HS-DPCCH signal at uplink transmission power determined by increasing current uplink transmission power of HS-DPCCH transmitted in a specific power ratio to DPCCH, by the detected uplink power offset, the controller 2622 controls a channel gain and provides the controlled channel gain to the multiplier 2623. The multiplier 2623 multiplies a signal output from the spreader 2618 by the controlled channel gain, and provides its output to the summer 2606. In conclusion, the UE applies the exiting power control method to the channel gains for DPDCH and DPCCH, but controls the channel gain for HS-DPCCH using the uplink power offset. The summer 2606 sums up a DPDCH signal output from the multiplier 2605, a DPCCH signal output from the multiplier 2614 and an HS-DPCCH signal output from the multiplier 2623, and provides the summed signal to a multiplier 2624. Here, as described above, since a DPCCH signal is an imaginary signal generated by multiplying the DPCCH signal by j, the DPCCH signal, though summed with the HS-DPCCH, does not lose a unique feature of each DPCCH. In addition, since the DPDCH and the HS-DPCCH were spread with different channelization codes, they do not interfere with each other during despreading at a receiver. The reason that unlike the DPCCH, HS-DPCCH is added to DPDCH and transmitted over an I channel and DPCCH is transmitted over a Q channel is because the HS-DPCCH is not transmitted when no user data or no upper layer signaling exists on DPDCH transmitted over a real channel (or I channel). In the case where the DPDCH is not transmitted, if both the two DPCCHs are transmitted over an imaginary channel (or Q channel), frequency of zero crossings is increased leading to an increase in PAR of a UE transmitter. Therefore, the HS-DPCCH is transmitted in a real number in order to minimize PAR of the UE transmission apparatus.

The multiplier 2624 multiplies a signal output from the summer 2606 by a preset scrambling code $C_{SCRAMBLE}$, for scrambling, and provides the scrambled signal to a modulator 2625. Here, the scrambling code is a code used to identify each UE in UMTS, and for example, a complex code generated from a Gold code is a typical channelization code. The modulator 2625 modulates a signal output from the multiplier 2624, and provides the modulated signal to an RF processor 2626. The RF processor 2626 converts a signal output from the modulator 2625 into an RF band signal, and transmits the RF band signal on the air through an antenna 2627.

Figure 27:
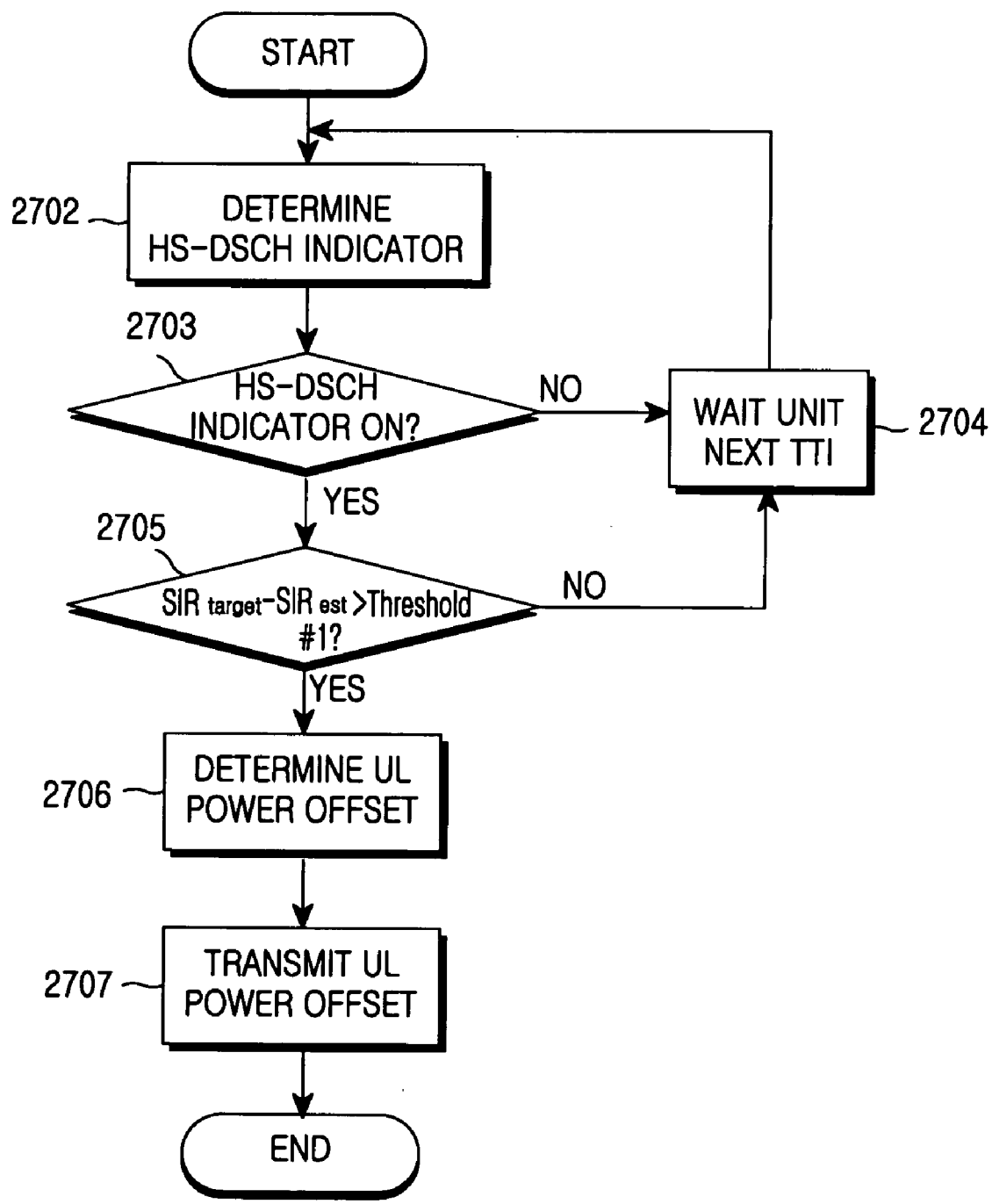
FIG. 27 illustrates an operating procedure of a Node B in an HSDPA system according to another embodiment of the present invention.

FIG. 27 illustrates an operating procedure of a Node B in an HSDPA system according to another embodiment of the present invention. Referring to FIG. 27, in step 2702, the Node B determines whether there is HSDPA packet data to be transmitted to a corresponding UE, and based on the result, determines an HS-DSCH indicator indicating the presence/absence of HSDPA packet data to be transmitted to the UE, and then proceeds to step 2703. Here, "determining an HS-DSCH indicator" means determining whether to transmit the HS-DSCH indicator, and as descried in conjunction with FIG. 21, an uplink power offset needed only when a UE receives the HSDPA service is generated only when the HS-DSCH indicator exists. In step 2703, the Node B determines whether the determined HS-DSCH indicator is on. As a result of the determination, if the HS-DSCH indicator is not on, i.e., the HS-DSCH indicator is off, the Node B proceeds to step 2704. In step 2704, as the HS-DSCH indicator is off, the Node B waits until the next TTI, and then returns to step 2702.

If it is determined in step 2703 that the HS-DSCH indicator is on, the Node B proceeds to step 2705. In step 2705, the Node B determines whether a difference between $SIR_{est}$ and $SIR_{target}$ for the UE exceeds a first threshold among preset thresholds. As a result of the determination, if the difference between $SIR_{est}$ and $SIR_{target}$ exceeds the first threshold, the Node B proceeds to step 2706. However, if the difference between $SIR_{est}$ and $SIR_{target}$ is equal to or less than the first threshold, the Node B returns to step 2704. In step 2706, the Node B determines an uplink power offset for the UE, and then proceeds to step 2707. Here, the uplink power offset is determined using the difference between $SIR_{est}$ and $SIR_{target}$ and the preset thresholds as described in conjunction with FIG. 24, so a detailed description thereof will not be provided. In step 2707, the Node B determines the determined uplink power offset over DPCH or S-DPCH, and then ends the procedure. Here, when one DPCH is used, the uplink power offset is transmitted for another slot where the HS-DSCH indicator is not transmitted. However, when two DPCHs, i.e., P-DPCH and S-DPCH are used, the uplink power offset is transmitted over the S-DPCH.

Up to date, the procedure for transmitting an uplink power offset by a Node B according to an embodiment of the present invention has been described with reference to FIG. 27. Next, a procedure for receiving the uplink power offset and actually controlling uplink power of HS-DPCCH by a UE will be described with reference to FIG. 28.

Figure 28:
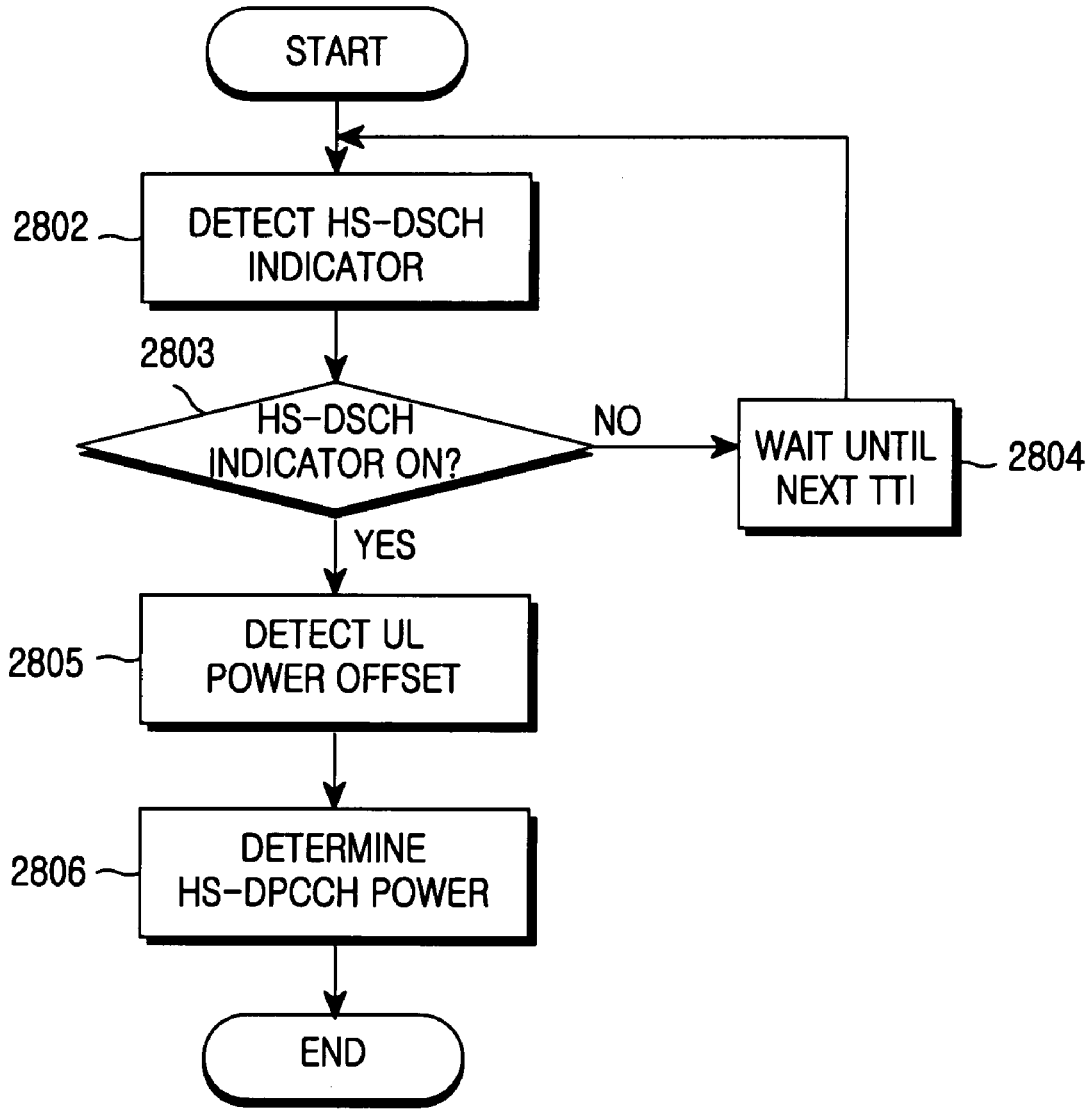
FIG. 28 illustrates an operating procedure of a UE in an HSDPA system according to another embodiment of the present invention.

FIG. 28 illustrates an operating procedure of a UE in an HSDPA system according to another embodiment of the present invention. Referring to FIG. 28, the UE detects an HS-DSCH indicator from received DPCH signal or S-DPCH signal in step 2802, and then proceeds to step 2803. Here, the UE detects the HS-DSCH indicator from the DPCH signal, when the Node B transmits one DPCH. However, the UE detects the HS-DSCH indicator from the S-DPCH signal, when the Node B transmits two DPCHs, i.e., P-DPCH and S-DPCH. In step 2803, the UE determines whether the detected HS-DSCH indicator is on. As a result of the determination, if the HS-DSCH indicator is not on, the UE proceeds to step 2804. In step 2804, the UE waits until the next TTI, and then returns to step 2802.

As a result of the determination in step 2803, if the HS-DSCH indicator is on, the UE proceeds to step 2805. In step 2805, the UE reads again the DPCH or S-DPCH to detect an uplink power offset, under the judgment that the uplink power offset will exist in a slot other than the slot where the HS-DSCH indicator is on. Of course, the uplink power offset is not transmitted, when it is not necessary to control uplink transmission power for HS-DPCCH since the system has a good channel condition. It is assumed in step 2805 that when the UE is located in a soft handover region or has a bad channel condition, the Node B transmits an uplink power offset in order to control uplink transmission power for the HS-DPCCH. In step 2806, the UE controls uplink transmission power for the HS-DPCCH depending on the detected uplink power offset, and then ends the procedure.

Figure 5A:
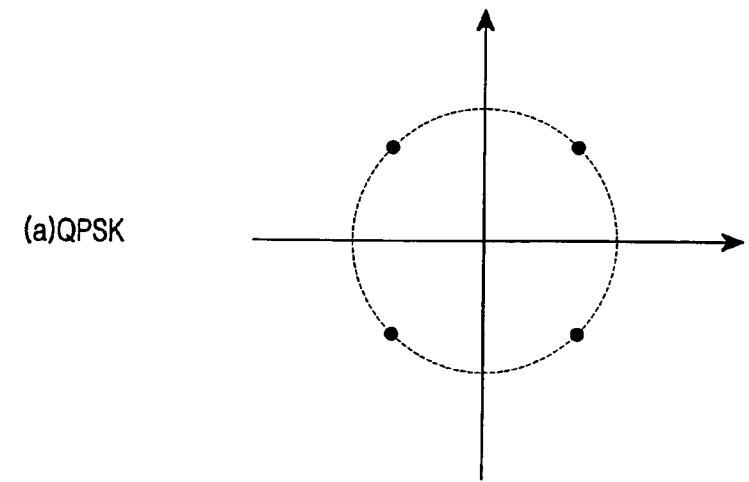
FIGS. 5A to 5C illustrate an AMC technique for HS-DSCH in a general communication system employing HSDPA.
Figure 5B:
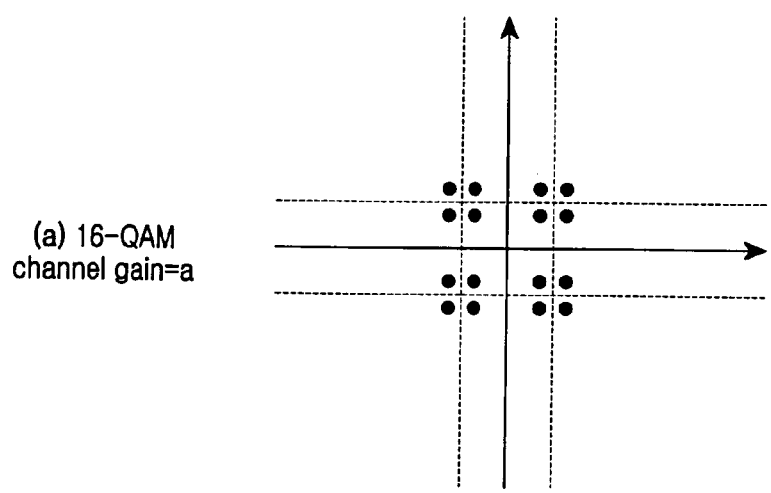
Figure 5C:
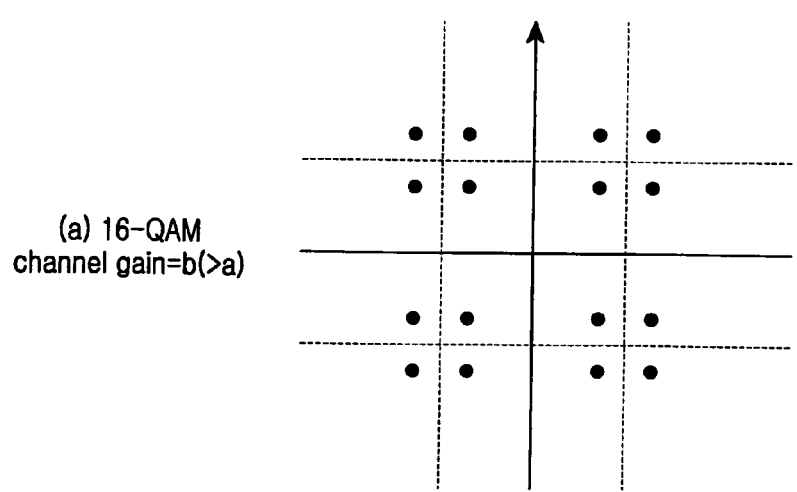

Now, a description will be made of a method and apparatus for determining by a Node B an HS-DSCH power level as described in conjunction with FIG. 8, determining an uplink power offset as described in conjunction with FIG. 19, and then constructing a downlink DPCCH for transmitting the HS-DSCH power level information and the uplink power offset information over a downlink. As described in conjunction with FIGS. 5A to 5C, the QAM modulation is for a relatively good channel environment, and the QPSK modulation is used for a bad channel environment. Here, reference will be made to the HS-DSCH power level information and the uplink power offset information. The HS-DSCH power level is information needed by a UE for QAM demodulation, as the HS-DSCH was QAM-modulated due to a good downlink channel environment. In contrast, the uplink power offset is information for compensating uplink transmission power of the HS-DPCCH that is used when an uplink channel has a bad environment. That the uplink channel has a bad environment hints that a downlink channel also has a bad environment to some extent. Therefore, the two kinds of the control information are information needed by the UE in different channel environments. That is, in a good downlink channel environment, since the HS-DSCH is QAM-modulated, the UE needs an HS-DSCH power level. However, in a bad downlink channel environment, since the Node B modulates the HS-DSCH by QPSK or 8PSK modulation, the UE does not require the HS-DSCH power level and, instead, needs an uplink power offset for compensating transmission power of the HS-DPCCH. In conclusion, the Node B selects one of the HS-DSCH power level and the uplink power offset according to the channel environment, and transmits the selected control information to the UE. Here, a criterion for discriminating the channel environment is an MCS level. That is, in a good channel environment, the Node B uses QAM modulation and transmits an HS-DSCH power level to the UE, and in a bad channel environment, the Node B does not use QAM modulation and transmits an uplink power offset to the UE.

Figure 29:
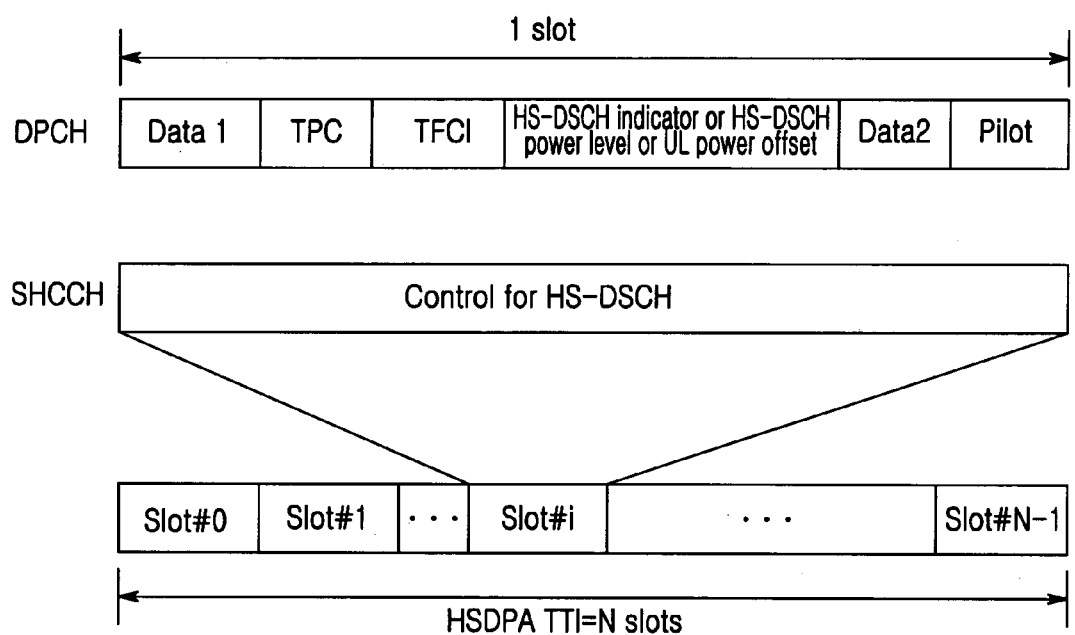
FIG. 29 illustrates a downlink channel structure for transmitting an HS-DSCH power level and an uplink power offset over DPCH in a communication system employing HSDPA according to another embodiment of the present invention.

In an embodiment of the present invention, an exemplary method of transmitting the HS-DSCH power level and the uplink power offset over a downlink DPCH will be described with reference to FIG. 29. FIG. 29 illustrates a channel stricture for transmitting an HS-DSCH power level and an uplink power offset in a communication system employing HSDPA according to another embodiment of the present invention. Unlike the channel structure of FIG. 9 where the Node B transmits only the HS-DSCH power level and the channel structure of FIG. 21 where the Node B transmits only the uplink power offset, the channel structure of FIG. 29 alternately transmits the HS-DSCH power level and the uplink power offset according to the channel condition for a period where the HS-DSCH indicator is not transmitted. Also, even when the HS-DSCH indicator is transmitted using a channelization code different from that of DPCH over a separate channel, the HS-DSCH power level and the uplink power offset can be transmitted for the period where the HS-DSCH indicator is not transmitted as illustrated in FIGS. 11 and 23.

Since a reception apparatus of a Node B for determining the uplink power offset has the same structure as the reception apparatus of FIG. 24, a detailed description thereof will not be provided. A structure of a transmission apparatus for a Node B will be descried herein below with reference to FIG. 31.

Figure 31:
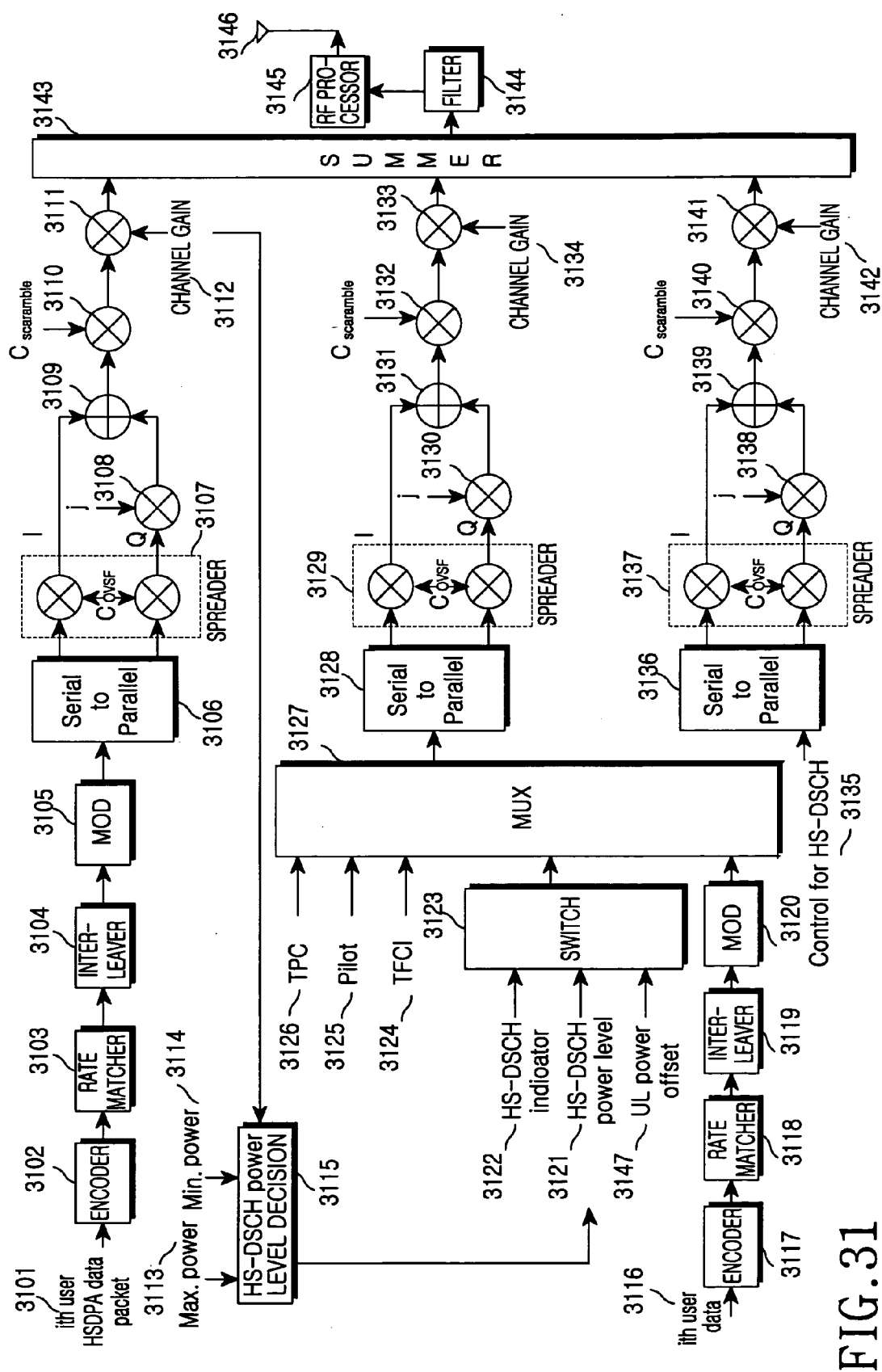
FIG. 31 illustrates a structure of a transmission apparatus for a Node B corresponding to the downlink channel structure of FIG. 29.

FIG. 31 illustrates a structure of a transmission apparatus for a Node B corresponding to the downlink channel structure of FIG. 29. Referring to FIG. 31, downlink HS-DSCH data packet 3101 is applied to an encoder 3102. The encoder 3102 encodes the HS-DSCH data packet 3101 by preset coding, e.g., turbo coding, thus generating coded symbols, and provides the generated coded symbols to a rate matcher 3103. The rate matcher 3103 performs rate matching on a signal output from the encoder 3102 through symbol repetition and puncturing in order to transmit the signal for TTI in an actual physical channel, and provides the rate-matched signal to an interleaver 3104. The interleaver 3104 interleaves a signal output from the rate matcher 3103, and provides the interleaved signal to a modulator 3105. The modulator 3105 modulates a signal output from the interleaver 3104 by preset modulation, e.g., QPSK, 8PSK or M-ary QAM, and provides the modulated signal to a serial-to-parallel converter 3106. The serial-to-parallel converter 3106 parallel converts a signal output from the modulator 3105 into two bit streams, i.e., a bit stream I and a bit stream Q, and provides the bit streams I and Q to a spreader 3107. The spreader 3107 spreads the two bit streams using the same channelization code $C_{OVSF}$ so that they have an orthogonal property with other signals using other channelization codes, and provides the spreaded bit stream I to an adder 3109 and the spreaded bit stream Q to a multiplier 3108, respectively. The multiplier 3108 multiplies the bit stream Q by j and provides its output to the adder 3109. The adder 3109 adds a signal output from the multiplier 3108 to a signal output from the spreader 3107, and provides its output to a multiplier 3110. The multiplier 3110 multiplies a signal output from the adder 3109 by a preset scrambling code $C_{SCRAMBLE}$, for scrambling, and provides its output to a multiplier 3111. Here, the multiplier 3110 serves as a scrambler. The multiplier 3111 multiplies a signal output from the multiplier 3110 by a channel gain 3112, and provides its output to a summer 3143. Generally, the channel gain 3112, a parameter for determining transmission power of HS-DSCH, has a large value for a small SF and is variable according to the type of the user data transmitted. If the HS-DSCH data packet is modulated by QAM in the modulator 3105, transmission apparatus of the Node B informs a UE of an HS-DSCH power level for one channelization code so that the UE can QAM-demodulate a received signal. To this end, in the transmission apparatus of the Node B, an HS-DSCH power level determiner 3115 determines an HS-DSCH power level from the channel gain 3112, using the HS-DSCH power and a maximum level and a minimum level of HS-DSCH power for one channelization code, generates bits 3121 corresponding to the determined HS-DSCH power level, and provides the bits 3121 to a switch 3123.

User data 3116 to be transmitted over DPCH is applied to an encoder 3117. The encoder 3117 encodes the user data 3116 by preset coding, and provides the coded symbols to a rate matcher 3118. The rate matcher 3118 performs rate matching on a signal output from the encoder 3117 through symbol repetition and puncturing so that the number of output bits is matched to the number of bits to be transmitted over an actual physical channel, and provides the rate-matched signal to an interleaver 3119. The interleaver 3119 interleaves a signal output from the rate matcher 3118 in a preset interleaving method, and provides the interleaved signal to a modulator 3120. The modulator 3120 modulates a signal output from the interleaver 3119 by preset modulation, and provides the modulated signal to a multiplexer 3127. The switch 3123 controls its connection to provide the HS-DSCH power level 3121, an HS-DSCH indicator 3122 and an uplink power offset 3147 to the multiplexer 3127 according to corresponding transmission points. Here, the switch 3123 provides the HS-DSCH power level 3121 to the multiplexer 3127 when the HS-DSCH is modulated by QAM, and provides the uplink power offset 3147 to the multiplexer 3127 when the HSD-DSCH is not modulated by QAM. The multiplexer 3127 multiplexes information output from the switch 3123, transmission points of which are distinguished by the switch 3123, TPC 3126, Pilot 3125, TFCI 3124 and a signal output from the modulator 3120, and provides it output to a serial-to-parallel converter 3128.

The serial-to-parallel converter 3128 converts a signal output from the multiplexer 3127 into two bit streams, i.e., a bit stream I and a bit stream Q, and provides the bit streams I and Q to a spreader 3129. The spreader 3129 multiplies the bit stream I and the bit stream Q output from the serial-to-parallel converter 3128 by a preset channelization code $C_{OVSF}$, for spreading, so that they have an orthogonal property with other signals using other channelization codes. The spreader 3129 provides the spreaded bit stream Q to a multiplier 3130 and the spreaded bit stream I to an adder 3131, respectively. The multiplier 3130 multiplies the spreaded bit stream Q output from the spreader 3129 by j and provides its output to the adder 3131. The adder 3131 adds a signal output from the multiplier 3130 to the spread bit stream I output from the spreader 3129, and provides its output to a multiplier 3132. The multiplier 3132 multiplies a signal output from the adder 3131 by a scrambling code $C_{SCRAMBLE}$ in a chip unit, for scrambling, and provides its output to a multiplier 3133. Here, the multiplier 3132 serves as a scrambler. The multiplier 3133 multiplies a signal output from the multiplier 3132 by a channel gain 3134, and provides its output to the summer 3143.

Meanwhile, the transmission apparatus for a Node B shown in FIG. 31 further includes a transmitter for SHCCH. HS-DSCH control information 3135 is applied to a serial-to-parallel converter 3136. The serial-to-parallel converter 3136 converts the HS-DSCH control information 3135 into two bit streams, i.e., an I bit stream and a Q bit stream, and provides the two bit streams to a spreader 3137. The spreader 3137 multiplies a signal output from the serial-to-parallel converter 3136 by a channelization code $C_{OVSF}$, for spreading, and provides a spreaded bit stream I to an adder 3139 and a spreaded bit stream Q to a multiplier 3138. The multiplier 3138 multiplies the spreaded bit stream Q output from the spreader 3137 by j and provides its output to the adder 3139. The adder 3139 adds a signal output from the multiplier 3138 to the spreaded bit stream I output from the spreader 3137, and provides its output to a multiplier 3140. The multiplier 3140 multiplies a signal output from the adder 3139 by a preset scrambling code $C_{SCRAMBLE}$, for scrambling, and provides its output to a multiplier 3141. Here, the multiplier 3140 serves as a scrambler. The multiplier 3141 multiplies a signal output from the multiplier 3140 by a channel gain 3142, and provides its output to the summer 3143. The summer 3143 sums up the generated DPCH signal (or the signal output from the multiplier 3133), the generated SHCCH signal (or the signal output from the multiplier 3141), and the generated HS-DSCH signal (or the signal output from the multiplier 3111), and provides the summed signal to a filter 3144. The filter 3144 filters a signal output from the summer 3143, and provides the filtered signal to an RF processor 3145. The RF processor 3145 converts a signal output from the filter 3144 into an RF band signal, and transmits the RF band signal on the air through an antenna 3146.

The transmission apparatus for a Node B shown in FIG. 31 can be applied even to a method of transmitting the HS-DSCH power level over an HS-DSCH indicator channel when an HS-DSCH indicator is transmitted over a separate channel using a channelization code different from that of DPCH as described in conjunction with FIG. 29. However, the transmission apparatus for a Node B should be modified such that it can identify the HS-DSCH indicator channel and the DPCH channel with separate channelization codes.

Figure 30:
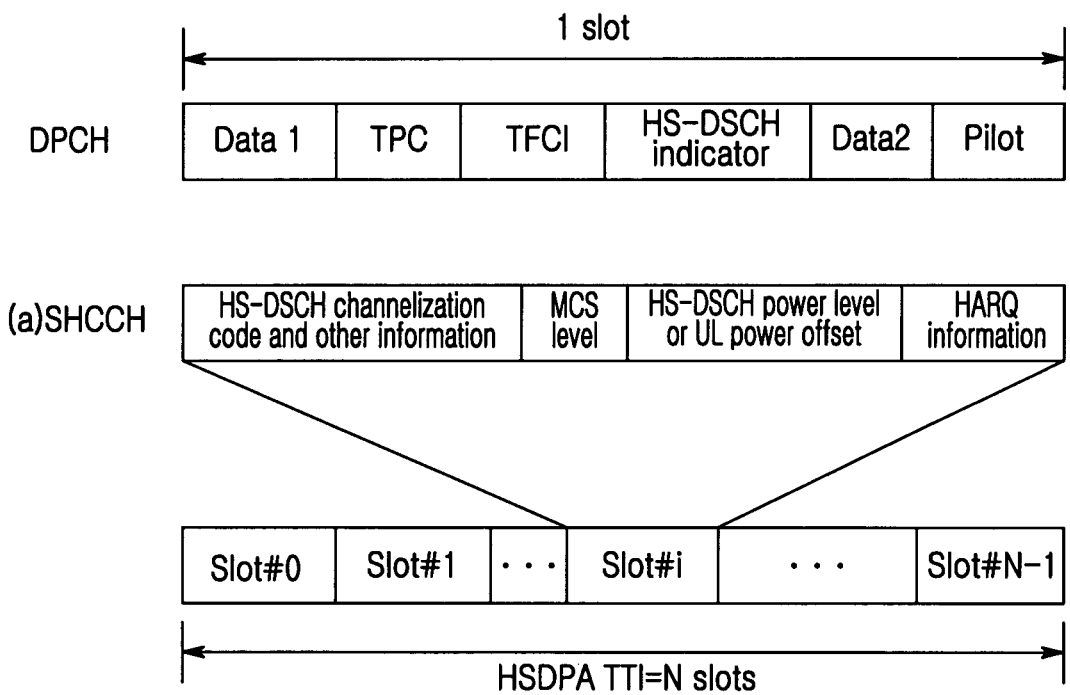
FIG. 30 illustrates a downlink channel structure for transmitting an HS-DSCH power level and an uplink power offset over SHCCH in an HSDPA communication system according to another embodiment of the present invention.

In addition, an SHCCH slot format and a Node B transmission apparatus for transmitting an HS-DSCH power level and an uplink power offset over a downlink will be described with reference to FIGS. 30 and 32, respectively. FIG. 30 illustrates a downlink channel structure for transmitting an HS-DSCH power level and an uplink power offset over SHCCH in an HSDPA communication system according to another embodiment of the present invention. Referring to FIG. 30, the SHCCH for controlling HS-DSCH, as described in conjunction with FIG. 1, transmits HS-DSCH channelization code, MCS level indicating a modulation technique and a channel coding technique to be used in the HS-DSCH, and HARQ information, i.e., HARQ processor number and an HARQ packet number. Of course, the SHCCH can transmit other control information as well as the above control information. In the embodiment of the present invention, an HS-DSCH power level and an uplink power offset are transmitted over a specific field of the SHCCH along with the above control information, as illustrated in FIG. 30. If the MCS level indicates HS-DSCH was modulated by QAM, an HS-DSCH power level is transmitted over the HSCCH. In contrast, if the MCS level indicates that HS-DSCH was not modulated by QAM, an uplink power offset is transmitted over a field where the HS-DSCH power level is to be transmitted. Although an HS-DSCH indicator field exists in the downlink DPCH in the slot format of FIG. 30, the HS-DSCH indicator may be transmitted over a separate channel, using a channelization code different from that of the DPCH.

Next, a transmission apparatus for a Node B corresponding to the downlink channel structure of FIG. 30 will be described with reference to FIG. 32. FIG. 32 illustrates an internal structure of a transmission apparatus for a Node B corresponding to the downlink channel structure of FIG. 30.

Figure 32:
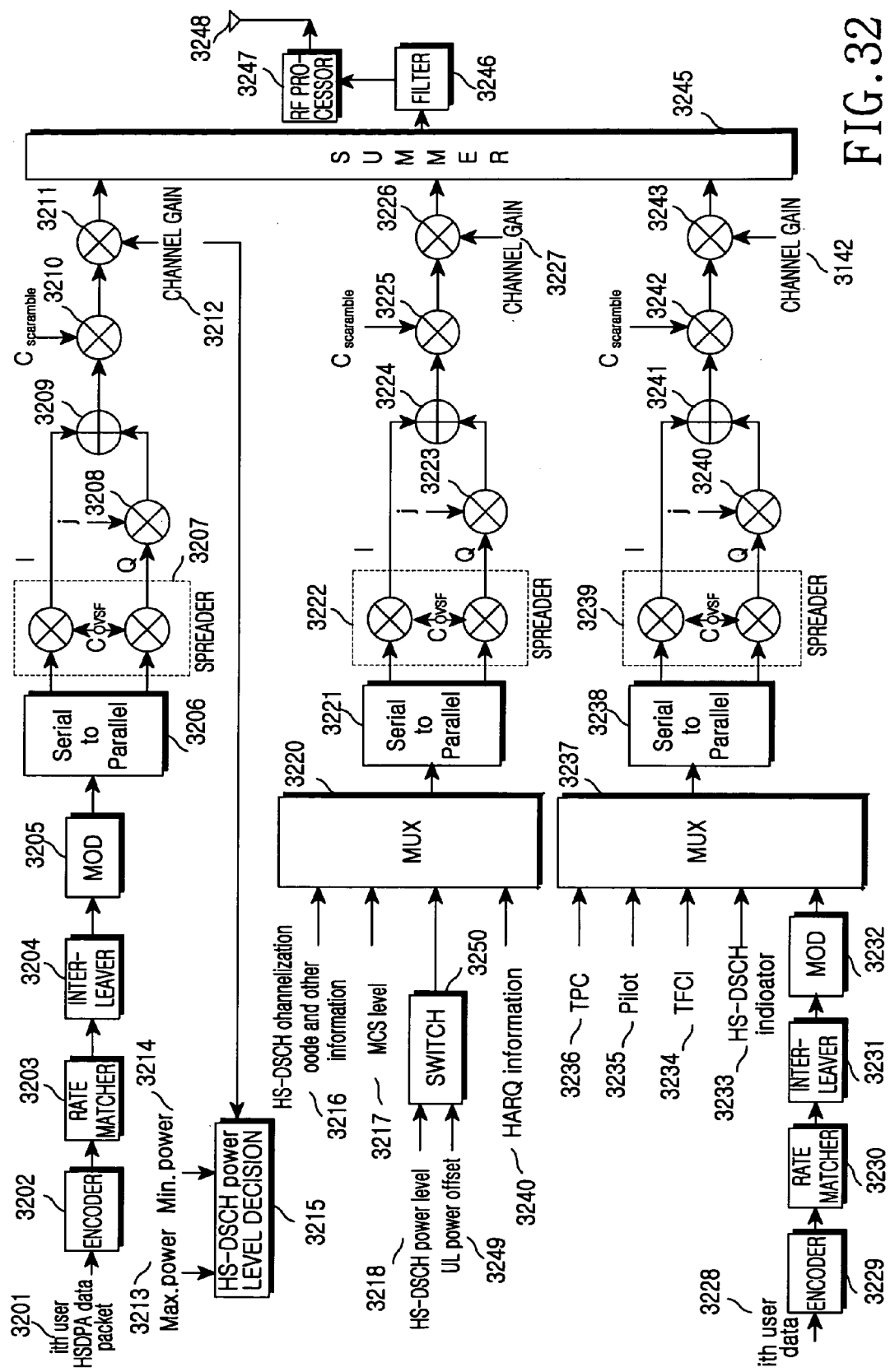
FIG. 32 illustrates an internal structure of a transmission apparatus for a Node B corresponding to the downlink channel structure of FIG. 30.

Referring to FIG. 32, downlink HS-DSCH data packet 3201 is applied to an encoder 3202. The encoder 3202 encodes the HS-DSCH data packet 3201 by preset coding, e.g., turbo coding, thus generating coded symbols, and provides the generated coded symbols to a rate matcher 3203. The rate matcher 3203 performs rate matching on a signal output from the encoder 3202 through symbol repetition and puncturing in order to transmit the signal for TTI on an actual physical channel, and provides the rate-matched signal to an interleaver 3204. The interleaver 3204 interleaves a signal output from the rate matcher 3203 in a preset interleaving method, and provides the interleaved signal to a modulator 3205. The modulator 3205 modulates a signal output from the interleaver 3204 by preset modulation, e.g., QPSK, 8PSK or M-ary QAM, and provides the modulated signal to a serial-to-parallel converter 3206. The serial-to-parallel converter 3206 parallel converts a signal output from the modulator 3205 into two bit streams, i.e., a bit stream I and a bit stream Q, and provides the bit streams I and Q to a spreader 3207. The spreader 3207 spreads the two bit streams using the same channelization code $C_{OVSF}$ so that they have an orthogonal property with other signals using other channelization codes, and provides the spreaded bit stream I to an adder 3209 and the spreaded bit stream Q to a multiplier 3208, respectively. The multiplier 3208 multiplies the spreaded bit stream Q output from the spreader 3207 by j and provides its output to the adder 3209. The adder 3209 adds a signal output from the multiplier 3208 to a signal output from the spreader 3207, and provides its output to a multiplier 3210. The multiplier 3210 multiplies a signal output from the adder 3209 by a scrambling code $C_{SCRAMBLE}$ in a chip unit, for scrambling, and provides its output to a multiplier 3211. Here, the multiplier 3210 serves as a scrambler. The multiplier 3211 multiplies a signal output from the multiplier 3210 by a channel gain 3212, and provides its output to a summer 3245.

Meanwhile, if the modulator 3205 modulates the HS-DSCH data by QAM, the Node B transmission apparatus informs a UE of HS-DSCH power for one code so that the UE can QAM-demodulate a received signal. To this end, in the Node B transmission apparatus, an HS-DSCH power level determiner 3215, as described in conjunction with FIG. 8, determines bits 3218 corresponding to an HS-DSCH power level, using HS-DSCH power from the channel gain 3212 and a maximum level 3213 and a minimum level 3214 of the HS-DSCH power for one code, and provides the determined HS-DSCH power level 3218 to a switch 3250. If the HS-DSCH modulation is not QAM modulation, the HS-DSCH power level determiner 3215 generates an uplink power offset 3249 illustrated in conjunction with FIG. 24, instead of the HS-DSCH power level 3218. The switch 3250 provides the HS-DSCH power level 3218 to a multiplexer 3220 when the HS-DSCH modulation is QAM modulation, and provides the uplink power offset 3249 to the multiplexer 3220 when the HS-DSCH modulation is not the QAM modulation. The multiplexer 3220 multiplexes HS-DSCH power level 3218, uplink power offset 3249, HS-DSCH channelization code and other control information 3216, MCS level 3217 and HARQ information 3219, and provides its output to a serial-to-parallel converter 3221. The serial-to-parallel converter 3221 converts a signal output from the multiplexer 3220 into two bit streams, i.e., a bit stream I and a bit stream Q, and provides the bit streams I and Q to a spreader 3222. The spreader 3222 multiplies a signal output from the serial-to-parallel converter 3221 by a corresponding channelization code $C_{OVSF}$, for spreading, and provides the spreaded bit stream I to an adder 3224 and the spreaded bit stream Q to a multiplier 3223. The multiplier 3223 multiplies the spreaded bit stream Q output from the spreader 3222 by j and provides its output to the adder 3224. The adder 3224 adds a signal output from the multiplier 3223 to the spreaded bit stream I output from the spreader 3222, and provides its output to a multiplier 3225. The multiplier 3225 multiplies a signal output from the adder 3224 by a preset scrambling code $C_{SCRAMBLE}$, for scrambling, and provides its output to a multiplier 3226. Here, the multiplier 3225 serves as a scrambler. The multiplier 3226 multiplies a signal output from the multiplier 3225 by a channel gain 3227, and provides its output to the summer 3245.

User data 3228 to be transmitted over DPCH is applied to an encoder 3229. The encoder 3229 encodes the user data 3228 by preset coding, and provides the coded symbols to a rate matcher 3230. The rate matcher 3230 performs rate matching on a signal output from the encoder 3229 through symbol repetition and puncturing so that the number of output bits is matched to the number of bits to be transmitted over an actual physical channel, and provides the rate-matched signal to an interleaver 3231. The interleaver 3231 interleaves a signal output from the rate matcher 3230 in a preset interleaving method, and provides the interleaved signal to a modulator 3232. The modulator 3232 modulates a signal output from the interleaver 3231 by preset modulation, and provides the modulated signal to a multiplexer 3237. The multiplexer 3237 multiplexes HS-DSCH indicator 3233, TFCI 3234, Pilot 3235 and TPC 3236, and provides its output to a serial-to-parallel converter 3238. The serial-to-parallel converter 3238 converts a signal output from the multiplexer 3237 into two bit streams, i.e., a bit stream I and a bit stream Q, and provides the bit streams I and Q to a spreader 3239. The spreader 3239 multiplies a signal output from the serial-to-parallel converter 3238 by a preset channelization code $C_{OVSF}$, for spreading, so that they have an orthogonal property with other signals using other channelization codes. The spreader 3239 provides the spreaded bit stream Q to a multiplier 3240 and the spreaded bit stream I to an adder 3241, respectively. The multiplier 3240 multiplies the spreaded bit stream Q output from the spreader 3239 by j and provides its output to the adder 3241. The adder 3241 adds a signal output from the multiplier 3240 to a signal output from the spreader 3239, and provides its output to a multiplier 3242. The multiplier 3242 multiplies a signal output from the adder 3241 by a scrambling code $C_{SCRAMBLE}$, for scrambling, and provides its output to a multiplier 3243. Here, the multiplier 3242 serves as a scrambler. The multiplier 3243 multiplies a signal output from the multiplier 3242 by a channel gain 3244, and provides its output to the summer 3245. The summer 3245 sums up the generated DPCH signal (or the signal output from the multiplier 3243), the generated SHCCH signal (or the signal output from the multiplier 3226), and the generated HS-DSCH signal (or the signal output from the multiplier 3211), and provides the summed signal to a filter 3246. The filter 3246 filters a signal output from the summer 3245, and provides the filtered signal to an RF processor 3247. The RF processor 3247 converts a signal output from the filter 3246 into an RF band signal, and transmits the RF band signal on the air through an antenna 3248. Of course, the Node B transmission apparatus for transmitting an HS-DSCH power level over SHCCH can also be applied to a channel structure in which an HS-DSCH indicator is transmitted over a separate channel using a channelization code different from that of DPCH as described in conjunction with FIG. 29.

Next, a UE reception apparatus corresponding to the Node B transmission apparatus of FIG. 31 will be described with reference to FIG. 33.

Figure 33:
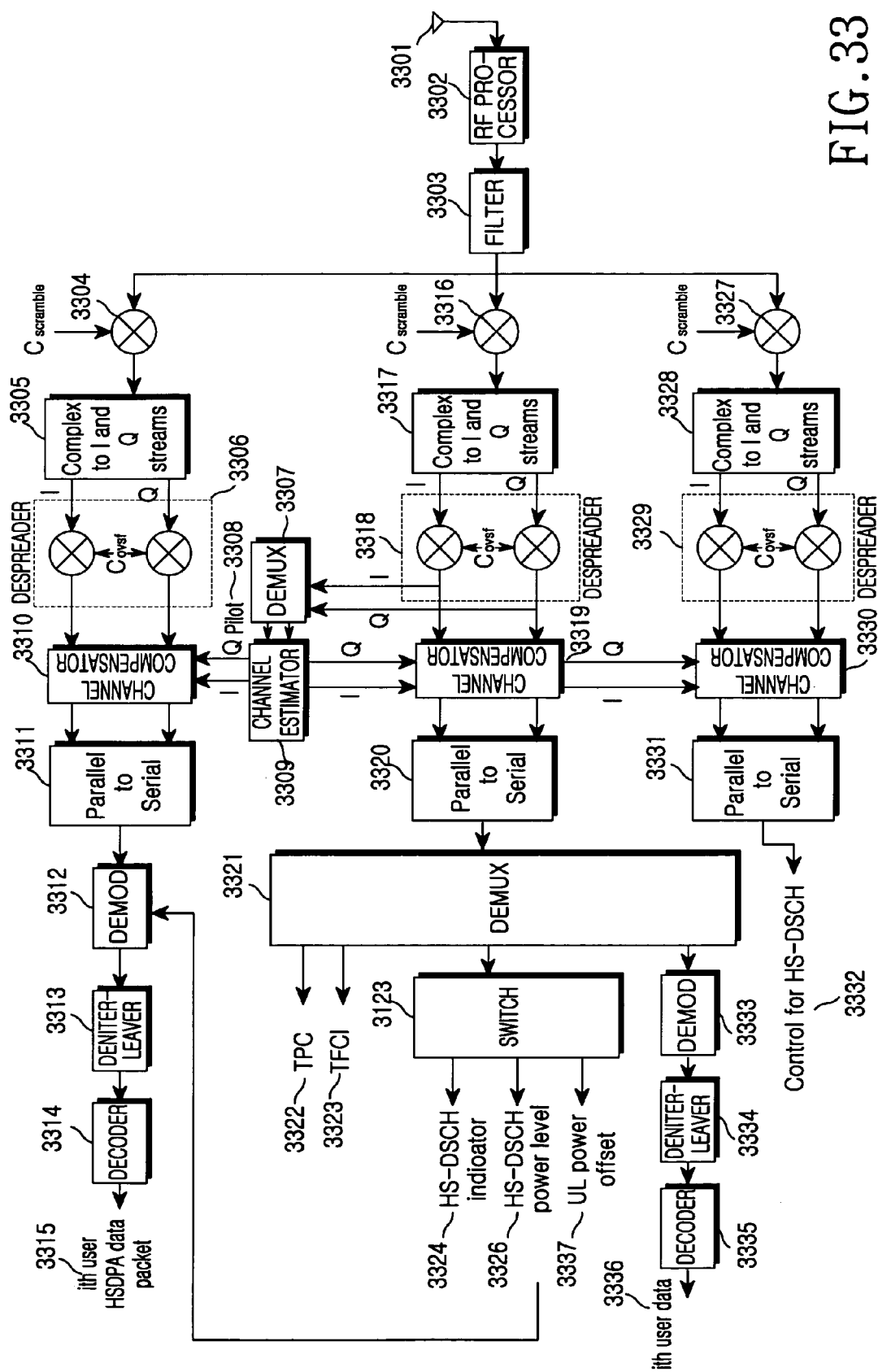
FIG. 33 is a block diagram illustrating a reception apparatus structure of a UE corresponding to the transmission apparatus of the Node B shown in FIG. 31.

FIG. 33 is a block diagram illustrating a reception apparatus structure of a UE corresponding to the transmission apparatus of the Node B shown in FIG. 31. Referring to FIG. 33, an RF band signal received through an antenna 3301 is applied to an RF processor 3302. The RF processor 3302 converts the received RF band signal into a base band signal and provides the base band signal to a filter 3303. The filter 3303 filters a signal output from the RF processor 3302, and provides its output in common to multipliers 3304, 3316 and 3327. Here, the multipliers 3304, 3316 and 3327, each serving as a descrambler, multiply their input signals by a scrambling code $C_{SCRAMBLE}$ for the channels transmitted by the transmission apparatus of the Node B. As a result, the multiplier 3304 outputs an HS-DSCH signal (or a downlink data channel), the multiplier 3316 outputs a downlink DPCH signal, and the multiplier 3327 outputs an SHCCH signal. A complex signal output from the multiplier 3304 is applied to a complex to I and Q streams part 3305. The complex to I and Q streams part 3305 separates a signal output from the multiplier 3304 into a real signal I and an imaginary signal Q, and provides them to a despreader 3306. The despreader 3306 multiplies the real signal I and the imaginary signal Q from the complex to I and Q streams part 3305 by a channelization code $C_{OVSF}$ used in the transmission apparatus of the Node B, for despreading, and provides its outputs to a channel compensator 3310. Likewise, a complex signal output from the multiplier 3316 is applied to a complex to I and Q streams part 3317. The complex to I and Q streams part 3317 separates a signal output from the multiplier 3316 into a real signal I and an imaginary signal Q, and provides them to a despreader 3318. The despreader 3318 multiplies the real signal I and the imaginary signal Q from the complex to I and Q streams part 3317 by a channelization code $C_{OVSF}$ used in the transmission apparatus of the Node B, for despreading, and provides its outputs to a channel compensator 3319 and a demultiplexer 3307. Further, a complex signal output from the multiplier 3327 is applied to a complex to I and Q streams part 3328. The complex to I and Q streams part 3328 separates a signal output from the multiplier 3327 into a real signal I and an imaginary signal Q, and provides them to a despreader 3329. The despreader 3329 multiplies the real signal I and the imaginary signal Q from the complex to I and Q streams part 3328 by a channelization code $C_{OVSF}$ used in the transmission apparatus of the Node B, for despreading, and provides its outputs to a channel compensator 3330. The output signals I and Q of the despreader 3318 are provided to the demultiplexer 3307. The demultiplexer 3307 demultiplexes the output signals I and Q of the despreader 3318, and outputs Pilot 3308. The Pilot output is applied to a channel estimator 3309. The channel estimator 3309 detects a channel estimated value through distortion estimation on a radio channel, and provides the channel estimated value to the channel compensators 3310, 3319 and 3330.

The channel compensators 3310, 3319 and 3330 compensate for distortion caused by a radio channel using the channel estimated value. That is, the channel estimator 3310 channel-estimates a signal output from the despreader 3306, and provides its output to a parallel-to-serial converter 3311. The channel estimator 3319 channel-estimates a signal output from the despreader 3318, and provides its output to a parallel-to-serial converter 3320. The channel estimator 3330 channel-estimates a signal output from the despreader 3329, and provides its output to a parallel-to-serial converter 3331.

The parallel-to-serial converters 3311, 3320 and 3331 each serial convert the signals output from the channel compensators 3310, 3319 and 3330 into one bit stream, respectively. A signal output from the parallel-to-serial converter 3331 is finally output as HS-DSCH control information 3332, and a signal output from the parallel-to-serial converter 3320 is demultiplexed by a demultiplexer 3321 into TPC 3322, TFCI 3323, and HS-DSCH indicator 3324, HS-DSCH power level 3326 and uplink power offset 3337, which are distinguished by a switch 3325. The demultiplexer 3321 further outputs a downlink data signal, and the downlink data signal undergoes channel decoding by a demodulator 3333, a deinterleaver 3334 and a decoder 3335, and is finally output as downlink user data 3336. Further, a signal output from the parallel-to-serial converter 3311 is subject to channel decoding by a demodulator 3312, a deinterleaver 3313 and a decoder 3314, and is finally output as a downlink data packet 3315. Here, if the downlink data packet 3315 was QAM-modulated, the decoder 3314 QAM-modulates the downlink data packet 3315 using the received HS-DSCH power level 3326.

Next, a UE reception apparatus corresponding to the Node B transmission apparatus of FIG. 32 will be described with reference to FIG. 34.

Figure 34:
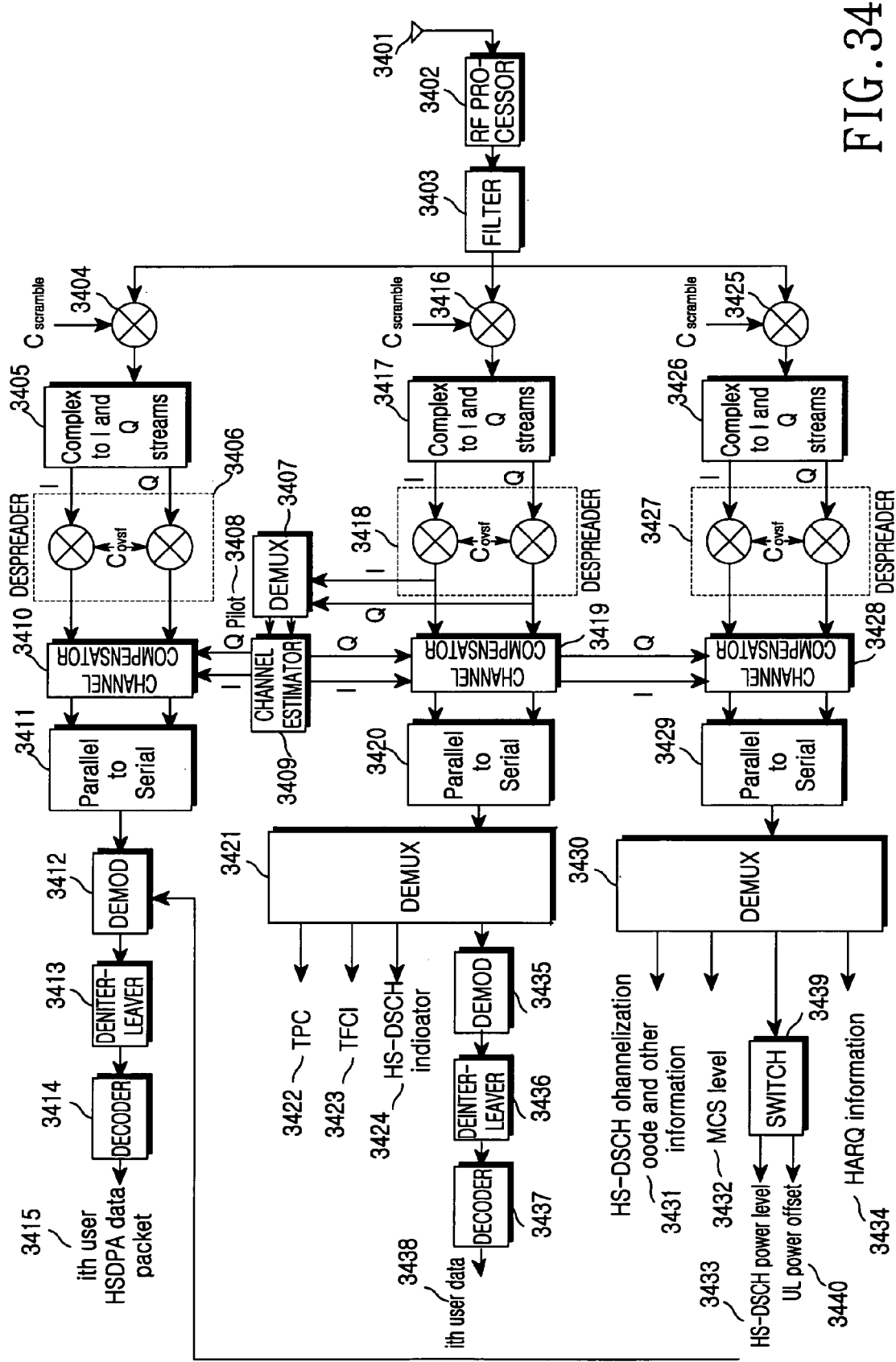
FIG. 34 is a block diagram illustrating an internal structure of a UE reception apparatus corresponding to the Node B transmission apparatus of FIG. 32.

FIG. 34 is a block diagram illustrating an internal structure of a UE reception apparatus corresponding to the Node B transmission apparatus of FIG. 32. Referring to FIG. 34, an RF band signal received through an antenna 3401 is applied to an RF processor 3402. The RF processor 3402 converts the received RF band signal into a base band signal and provides the base band signal to a filter 3403. The filter 3403 filters a signal output from the RF processor 3402, and provides its output in common to multipliers 3404, 3416 and 3425. Here, the multipliers 3404, 3416 and 3425, each serving as a descrambler, multiply their input signals by a channelization code for the channels transmitted by the transmission apparatus of the Node B. As a result, the multiplier 3404 outputs an HS-DSCH signal (or a downlink data channel), the multiplier 3416 outputs a downlink DPCH signal, and the multiplier 3425 outputs an SHCCH signal. A complex signal output from the multiplier 3404 is applied to a complex to I and Q streams part 3405. The complex to I and Q streams part 3405 separates a signal output from the multiplier 3404 into a real signal I and an imaginary signal Q, and provides them to a despreader 3406. The despreader 3406 multiplies the real signal I and the imaginary signal Q from the complex to I and Q streams part 3405 by a preset channelization code $C_{OVSF}$, for despreading, and provides its outputs to a channel compensator 3410. Likewise, a complex signal output from the multiplier 3416 is applied to a complex to I and Q streams part 3417. The complex to I and Q streams part 3417 separates a signal output from the multiplier 3416 into a real signal I and an imaginary signal Q, and provides them to a despreader 3418. The despreader 3418 multiplies the real signal I and the imaginary signal Q from the complex to I and Q streams part 3417 by a preset channelization code $C_{OVSF}$, for despreading, and provides its outputs to a channel compensator 3419 and a demultiplexer 3407. Further, a complex signal output from the multiplier 3425 is applied to a complex to I and Q streams part 3426. The complex to I and Q streams part 3426 separates a signal output from the multiplier 3425 into a real signal I and an imaginary signal Q, and provides them to a despreader 3427. The despreader 3427 multiplies the real signal I and the imaginary signal Q from the complex to I and Q streams part 3426 by a preset channelization code $C_{OVSF}$, for despreading, and provides its outputs to a channel compensator 3428.

The demultiplexer 3407 demultiplexes the output signals I and Q of the despreader 3418, and outputs Pilot 3408. The Pilot output is applied to a channel estimator 3409. The channel estimator 3409 detects a channel estimated value through distortion estimation on a radio channel, using the Pilot 3408, and provides the detected channel estimated value to the channel compensators 3410, 3419 and 3428. The channel compensators 3410, 3419 and 3428 compensate for distortion of signals output from the despreaders 3406, 3418 and 3427, respectively, using the channel estimated value output from the channel estimator 3409. That is, the channel estimator 3410 channel-estimates a signal output from the despreader 3406, and provides its output to a parallel-to-serial converter 3411. The channel estimator 3419 channel-estimates a signal output from the despreader 3418, and provides its output to a parallel-to-serial converter 3420. The channel estimator 3428 channel-estimates a signal output from the despreader 3427, and provides its output to a parallel-to-serial converter 3429.

The parallel-to-serial converters 3411, 3420 and 3429 each serial convert the signals output from the channel compensators 3410, 3419 and 3428, and provide their outputs to a demodulator 3412, a demultiplexer 3421 and a demultiplexer 3430, respectively. The demodulator 3412 demodulates a signal output from the parallel-to-serial converter 3411 by a demodulation technique corresponding to the modulation technique used in the Node B transmission apparatus, and provides its output to a deinterleaver 3413. The deinterleaver 3413 deinterleaves a signal output from the demodulator 3412 in a deinterleaving method corresponding to the interleaving method used in the Node B transmission apparatus, and provides its output to a decoder 3414. The decoder 3414 decodes a signal output from the deinterleaver 3413 by a decoding technique corresponding to the coding technique used in the Node B transmission apparatus, and outputs HS-DSCH data 3415. Here, if downlink data was QAM-modulated, the demodulator 3412 performs demodulation using a received HS-DSCH power level 3433.

The demultiplexer 3421 demultiplexes a signal output from the parallel-to-serial converter 3420 into TPC 3422, TFCI 3423 and HS-DSCH indicator 3424. The demultiplexer 3421 further outputs a downlink data signal, and the downlink data signal undergoes channel decoding by a demodulator 3435, a deinterleaver 3436 and a decoder 3437, and is finally output as downlink user data 3438. Further, the demultiplexer 3430 demultiplexes a signal output from the parallel-to-serial converter 3429 into HS-DSCH channelization code and other information 3431, MCS level 3423, an input to a switch 3439, and HARQ information. If the MCS level indicates that the modulation used is QAM modulation, the switch 3439 outputs the HS-DSCH power level 3433. If the MCS level indicates that the modulation used is not QAM modulation, the switch 3439 outputs an uplink power offset 3440.

Figure 35:
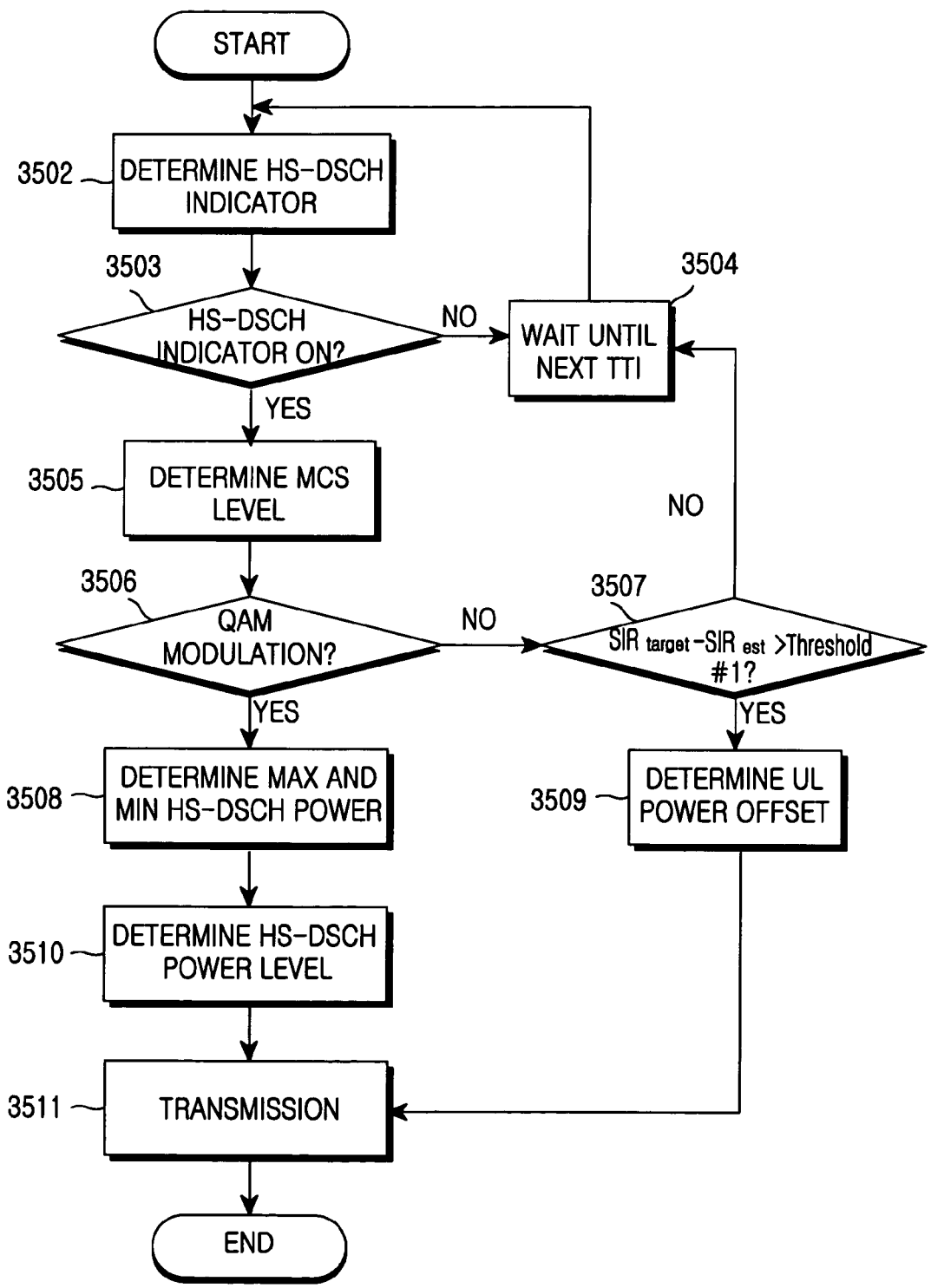
FIG. 35 illustrates an operating procedure of a Node B according to another embodiment of the present invention.

FIG. 35 illustrates an operating procedure of a Node B according to another embodiment of the present invention. Referring to FIG. 35, in step 3502, the Node B determines an HS-DSCH indicator indicating the presence/absence of HSDPA data packet, and then proceeds to step 3502. As described in conjunction with FIGS. 9 and 21, an HS-DSCH power level and an uplink power offset, needed during the HSDPA service, are generated only when HS-DSCH indicator exists. In step 3503, the Node B determines whether the HS-DSCH indicator is on. As a result of the determination, if the HS-DSCH indicator is off, the Node B proceeds to step 3504. In step 3504, the Node B waits until the next TTI, and then returns to step 3502. However, as a result of the determination in step 3503, if the HS-DSCH indicator is on, the Node B proceeds to step 3505. In step 3505, the Node B determines an MCS level that determines a modulation technique and a channel coding technique of a data packet transmitted over HS-DSCH, and then proceeds to step 3506. In step 3506, the Node B determines whether a modulation technique of HS-DSCH is QAM modulation. Here, the reason for determining whether the HS-DSCH modulation technique is QAM modulation is that an HS-DSCH power level must be transmitted when the HS-DSCH modulation is QAM modulation, and an uplink power offset must be transmitted when the HS-DSCH modulation technique is not QAM modulation. As a result of the determination in step 3506, if the HS-DSCH modulation technique is QAM modulation, the Node B proceeds to step 3508. In step 3508, the Node B determines a maximum level and a minimum level of HS-DSCH power that can be allocated to one code, and then proceeds to step 3510. In step 3510, the Node B determines an HS-DSCH power level, and then proceeds to step 3511. Meanwhile, as a result of the determination in step 3506, if the HS-DSCH modulation technique is not QAM modulation, the Node B proceeds to step 3507. In step 3507, the Node B determines whether a difference between $SIR_{est}$ and $SIR_{target}$ exceeds a first threshold. As a result of the determination, if the difference between $SIR_{est}$ and $SIR_{target}$ does not exceed the first threshold, the Node B returns to step 3504. Otherwise, if the difference between $SIR_{est}$ and $SIR_{target}$ exceeds the first threshold, the Node B proceeds to step 3509. In step 3509, the Node B determines an uplink power offset as described in conjunction with FIG. 19, under the judgment that a channel condition between the Node B and the UE is bad since the difference between $SIR_{est}$ and $SIR_{target}$ exceeds the first threshold. In step 3511, the Node B transmits the HS-DSCH power level or the uplink power offset over an uplink channel corresponding to a downlink channel set between the Node B and the UE, i.e., over DPCH, S-DPCH or SHCCH, and then ends the procedure.

Figure 36:
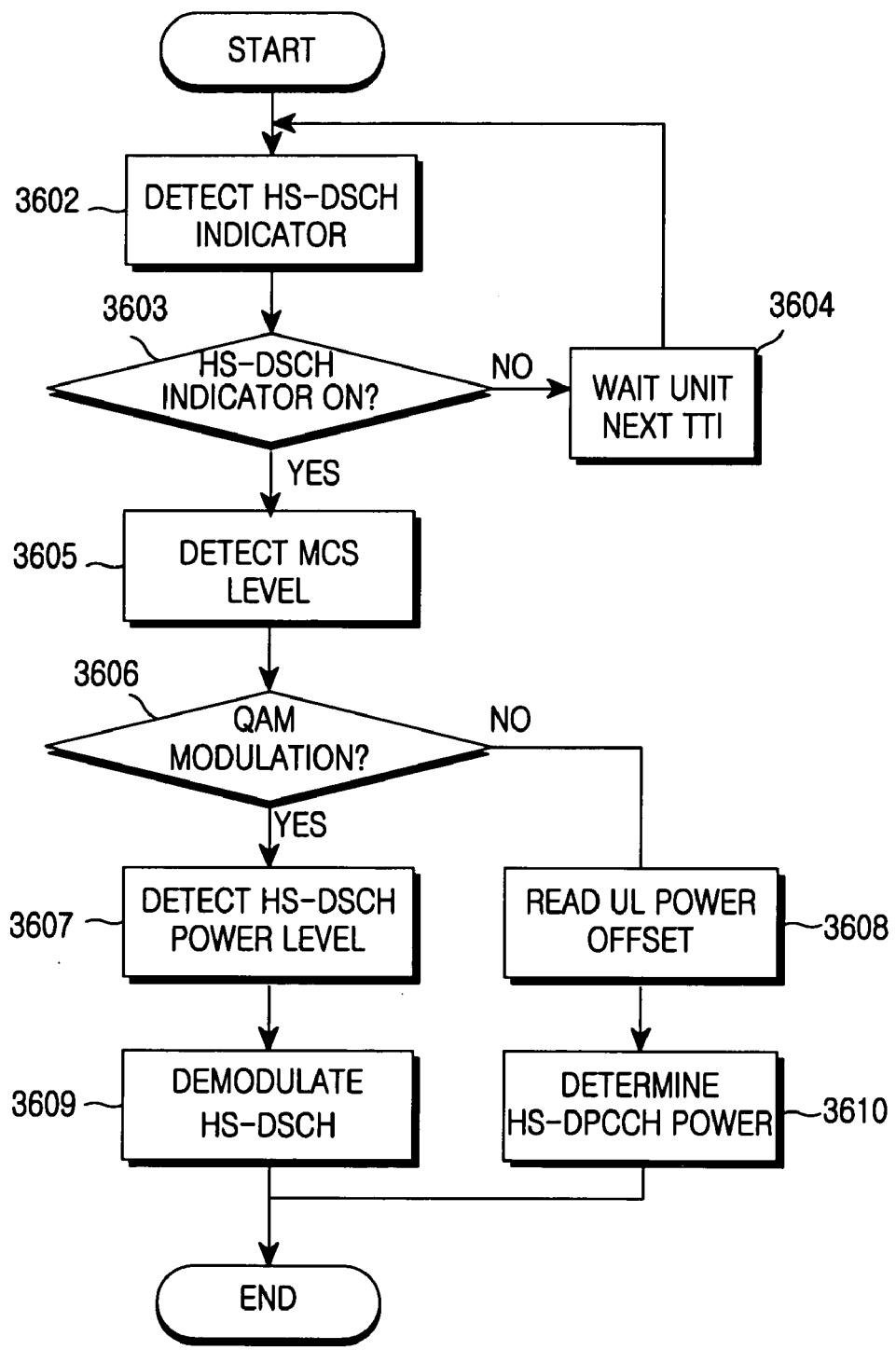
FIG. 36 illustrates an operating procedure of a UE according to a further embodiment of the present invention.

FIG. 36 illustrates an operating procedure of a UE according to another embodiment of the present invention. Referring to FIG. 36, the UE detects an HS-DSCH indicator from received DPCH signal in step 3602, and then proceeds to step 3603. In step 3603, the UE determines whether the detected HS-DSCH indicator is on. As a result of the determination, if the HS-DSCH indicator is not on, i.e., the HS-DSCH indicator is off, the UE proceeds to step 3604. In step 3604, the UE waits until the next TTI, and then returns to step 3602. As a result of the determination in step 3603, if the HS-DSCH indicator is on, the UE proceeds to step 3605. In step 3605, the UE receives an SHCCH signal and detects an MCS level from the received SHCCH signal. In step 3606, the UE determines whether an HS-DSCH modulation technique is QAM modulation. As a result of the determination, if the HS-DSCH modulation technique is not QAM modulation, the UE proceeds to step 3608. In step 3608, the UE the UE detects uplink power offset, and then proceeds to step 3610, In step 3610, the UE determines transmission power of HS-DPCCH using the detected uplink power offset, and then ends the procedure. As a result of the determination in step 3606, if the HS-DSCH modulation technique is QAM modulation, the UE proceeds to step 3607. In step 3607, the UE detects HS-DSCH power level, and then proceeds to step 3609. Here, if a downlink channel between the Node B and the UE has the structure illustrated in FIG. 29, the UE receives a DPCH signal and detects the HS-DSCH power level from the received DPCH signal. Otherwise, the downlink channel has the structure illustrated in FIG. 30, the UE receives an SHCCH signal and detects the HS-DSCH power level from the received SHCCH signal. In step 3609, the UE performs HS-DSCH demodulation using the detected HS-DSCH power level, and then ends the procedure.

As described above, the present invention enables uplink transmission power control on an HS-DPCCH signal transmitting information needed to service HSDPA in a communication system employing the HSDPA. Therefore, in the communication system employing the HSDPA, uplink transmission power of the HS-DPCCH can be controlled according to a channel condition of a UE, contributing to an improvement in the quality of an HSDPA service. In addition, when HSDPA service data is modulated by QAM modulation, a Node B informs a UE of a power level of HS-DSCH transmitting the HSDPA data, so the UE can reliably demodulate the HSDPA data.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A Node B apparatus for transmitting an uplink power offset and a downlink data channel power level in a high-speed packet data communication system, comprising:
    an uplink power offset determiner for measuring a signal-to-interference ratio (SIR) of a first uplink dedicated channel signal received from a UE (User Equipment), comparing a difference between the measured SIR and a preset target SIR with preset thresholds, and determining an uplink power offset to be applied to a second uplink dedicated channel transmitting control information for packet data received at the UE according to a result of the comparison;
    a downlink data channel power level determiner for determining a modulation technique to be applied to a downlink data channel for transmitting the packet data according to a channel condition with the UE, and determining a downlink data channel power level which is channel gain-related control information of the downlink data channel, when the determined modulation technique is a high-order modulation technique; and
    a transmitter for transmitting over a downlink the uplink power offset or the downlink data channel power level to the UE.

2. The Node B apparatus of claim 1, wherein the uplink power offset determiner comprises:
    a channel condition determiner for measuring SIR using the first uplink dedicated channel signal, and calculating a difference between the measured SIR and a preset target SIR; and
    a transmission power determiner for comparing the difference with preset thresholds and determining an uplink power offset to be applied to the second uplink dedicated channel according to a result of the comparison.

3. The Node B apparatus of claim 1, wherein the uplink power offset is transmission power to be added to transmission power of the second uplink dedicated channel currently transmitted by the UE.

4. The Node B apparatus of claim 1, wherein the transmitter does not transmit the uplink power offset if the difference is less than a specific threshold among the preset thresholds.

5. The Node B apparatus of claim 1, wherein the downlink data channel power level determiner determines the downlink data channel power level considering maximum power and minimum power that can be allocated to the downlink data channel.

6. The Node B apparatus of claim 1, wherein the downlink data channel power level determiner does not generate the downlink data channel power level if the modulation technique is not a high-order modulation technique.

7. An apparatus for transmitting/receiving an uplink power offset and a downlink data channel power level in a high-speed packet data communication system, comprising:
    a Node B for measuring a signal-to-interference ratio (SIR) of a first uplink dedicated channel signal received from a UE (User Equipment), comparing a difference between the measured SIR and a preset target SIR with preset thresholds, determining an uplink power offset to be applied to a second uplink dedicated channel transmitting control information for packet data received at the UE according to a result of the comparison, determining a modulation technique to be applied to a downlink data channel for transmitting the packet data according to a channel condition with the UE, determining a downlink data channel power level which is channel gain-related control information of the downlink data channel when the determined modulation technique is a high-order modulation technique, and transmitting the uplink power offset or the downlink data channel power level to the UE over a downlink; and
    the UE for receiving an uplink power offset transmitted over the downlink, controlling transmission power of the currently transmitted second uplink dedicated channel according to the uplink power offset, receiving the downlink data channel power level over the downlink, and demodulating the packet data according to the received downlink data channel power level.

8. The apparatus of claim 7, wherein the Node B comprises:
    an uplink power offset determiner for measuring SIR of the first uplink dedicated channel signal received from the UE, comparing a difference between the measured SIR and the target SIR with the thresholds, and determining an uplink power offset to be applied to the second uplink dedicated channel;
    a downlink data channel power level determiner for determining a modulation technique to be applied to the downlink data channel according to a channel condition with the UE, and determining the downlink data channel power level when the determined modulation technique is a high-order modulation technique; and
    a transmitter for transmitting over a downlink the uplink power offset or the downlink data channel power level to the UE.

9. The apparatus of claim 7, wherein the downlink data channel power level is determined considering maximum power and minimum power that can be allocated to the downlink data channel.

10. The apparatus of claim 7, wherein the uplink power offset is transmission power to be added to transmission power of the second uplink dedicated channel currently transmitted by the UE.

11. A method for controlling a Node B apparatus for transmitting an uplink power offset and a downlink data channel power level in a high-speed packet data communication system, comprising the steps of:
measuring a signal-to-interference ratio (SIR) of a first uplink dedicated channel signal received from a UE (User Equipment), comparing a difference between the measured SIR and a preset target SIR with preset thresholds, and determining an uplink power offset to be applied to a second uplink dedicated channel transmitting control information for packet data received at the UE according to a result of the comparison;
determining a modulation technique to be applied to a downlink data channel for transmitting the packet data according to a channel condition with the UE, and determining a downlink data channel power level which is channel gain-related control information of the downlink data channel, when the determined modulation technique is a high-order modulation technique; and
transmitting over a downlink the uplink power offset or the downlink data channel power level to the UE.

12. The method of claim 11, wherein the uplink power offset is transmission power to be added to transmission power of the second uplink dedicated channel currently transmitted by the UE.

13. The method of claim 11, wherein the uplink power offset is not transmitted if the difference is less than a specific threshold among the preset thresholds.

14. The method of claim 11, wherein the downlink data channel power level is determined considering maximum power and minimum power that can be allocated to the downlink data channel.

15. The method of claim 11, further comprising the step of not generating the downlink data channel power level if the modulation technique is not a high-order modulation technique.

16. A method for transmitting/receiving an uplink power offset and a downlink data channel power level in a high-speed packet data communication system, comprising the steps of:
measuring, by a Node B, a signal-to-interference ratio (SIR) of a first uplink dedicated channel signal received from a UE (User Equipment), comparing a difference between the measured SIR and a preset target SIR with preset thresholds, determining an uplink power offset to be applied to a second uplink dedicated channel transmitting control information for packet data received at the UE according to a result of the comparison, determining a modulation technique to be applied to a downlink data channel for transmitting the packet data according to a channel condition with the UE, determining a downlink data channel power level which is channel gain-related control information of the downlink data channel when the determined modulation technique is a high-order modulation technique, and transmitting the uplink power offset or the downlink data channel power level to the UE over a downlink; and
receiving, by the UE, an uplink power offset transmitted over the downlink, controlling transmission power of the currently transmitted second uplink dedicated channel considering the uplink power offset, receiving the downlink data channel power level over the downlink, and demodulating the packet data according to the received downlink data channel power level.

17. The method of claim 16, wherein the uplink power offset is transmission power to be added to transmission power of the second uplink dedicated channel currently transmitted by the UE.

18. The method of claim 16, wherein the downlink data channel power level is determined considering maximum power and minimum power that can be allocated to the downlink data channel.

19. A method for controlling uplink transmission power in a high-speed packet data communication system, comprising the steps of:
measuring a signal-to-interference ratio (SIR) of a first uplink dedicated channel signal received from a UE (User Equipment);
calculating a difference between the measured SIR and a preset target SIR, comparing the difference with preset thresholds, and determining an uplink power offset to be applied to a second uplink dedicated channel transmitting control information for packet data received at the UE according to a result of the comparison; and
transmitting over a downlink the determined uplink power offset to the UE.

20. The method of claim 19, wherein the uplink power offset is transmission power to be added to transmission power of the second uplink dedicated channel currently transmitted by the UE.

21. The method of claim 19, further comprising the step of not transmitting the uplink power offset to the UE if the difference is less than a specific threshold among the preset thresholds.

22. An apparatus for controlling uplink transmission power in a high-speed packet data communication system, comprising:
a channel condition determiner for measuring a signal-to-interference ratio (SIR) of a first uplink dedicated channel signal received from a UE (User Equipment), and calculating a difference between the measured SIR and a preset target SIR;
a transmission power determiner comparing the difference with preset thresholds, and determining an uplink power offset to be applied to a second uplink dedicated channel transmitting control information for packet data received at the UE according to a result of the comparison; and
a transmitter for transmitting over a downlink the determined uplink power offset to the UE.

23. The apparatus of claim 22, wherein the uplink power offset is transmission power to be added to transmission power of the second uplink dedicated channel currently transmitted by the UE.

24. A method for controlling uplink transmission power in a high-speed packet data communication system, comprising the steps of:
measuring, by a Node B, a signal-to-interference ratio (SIR) of a first uplink dedicated channel signal received from a UE (User Equipment);
calculating, by the Node B, a difference between the measured SIR and a preset target SIR, comparing the difference with preset thresholds, determining an uplink power offset to be applied to a second uplink dedicated channel transmitting control information for packet data received at the UE according to a result of the comparison, and transmitting over a downlink the determined uplink power offset to the UE; and
upon receiving the uplink power offset over the downlink, controlling, by the UE, transmission power of the currently transmitted second uplink dedicated channel according to the uplink power offset.

25. The method of claim 24, wherein the uplink power offset is transmission power to be added to transmission power of the second uplink dedicated channel currently transmitted by the UE.

26. The method of claim 24, further comprising the step of not transmitting the uplink power offset to the UE if the difference is less than a specific threshold among the preset thresholds.

27. An apparatus for controlling uplink transmission power in a high-speed packet data communication system, comprising:
 a Node B for measuring a signal-to-interference ratio (SIR) of a first uplink dedicated channel signal received from a UE (User Equipment), calculating a difference between the measured SIR and a preset target SIR, comparing the difference with preset thresholds, determining an uplink power offset to be applied to a second uplink dedicated channel transmitting control information for packet data received at the UE according to a result of the comparison, and transmitting over a downlink the determined uplink power offset to the UE; and
 the UE for receiving the uplink power offset over the downlink, and controlling transmission power of the currently transmitted second uplink dedicated channel according to the uplink power offset.

28. The method of claim 27, wherein the Node B comprises:
 a channel condition determiner for measuring SIR of the first uplink dedicated channel signal received from the UE, and calculating a difference between the measured SIR and the target SIR;
 a transmission power determiner for comparing the difference with the thresholds, and determining an uplink power offset to be applied to the second uplink dedicated channel transmitting control information for packet data received at the UE; and
 a transmitter for transmitting over a downlink the determined uplink power offset to the UE.

29. The method of claim 27, wherein the uplink power offset is transmission power to be added to transmission power of the second uplink dedicated channel currently transmitted by the UE.

30. A method for transmitting a downlink data channel power level in a high-speed packet data communication system, comprising the steps of:
 estimating a channel condition with a UE (User Equipment), and determining a modulation technique to be applied to a downlink data channel for transmitting the packet data according to the estimated channel condition;
 determining a downlink data channel power level which is channel gain-related control information of the downlink data channel, when the determined modulation technique is a high-order modulation technique; and
 transmitting over a downlink the determined downlink data channel power level to the UE so that the UE demodulates the packet data using the downlink data channel power level.

31. The method of claim 30, wherein the downlink data channel power level is determined considering maximum power and minimum power that can be allocated to the downlink data channel.

32. An apparatus for transmitting a downlink data channel power level in a high-speed packet data communication system, comprising:
 a modulation technique determiner for determining a modulation technique to be applied to a downlink data channel for transmitting the packet data according to a channel condition with a UE (User Equipment);
 a downlink data channel power level determiner for determining a downlink data channel power level which is channel gain-related control information of the downlink data channel, when the determined modulation technique is a high-order modulation technique; and
 a transmitter for transmitting over a downlink the determined downlink data channel power level to the UE so that the UE demodulates the packet data using the downlink data channel power level.

33. The apparatus of claim 32, wherein the downlink data channel power level determiner determines the downlink data channel power level considering maximum power and minimum power that can be allocated to the downlink data channel.

34. A method for transmitting/receiving a downlink data channel power level in a high-speed packet data communication system, comprising the steps of:
 estimating, by a Node B, a channel condition with a UE (User Equipment), and determining a modulation technique to be applied to a downlink data channel for transmitting the packet data according to the estimated channel condition,
 if the determined modulation technique is a high-order modulation technique, determining, by the Node B, a downlink data channel power level which is channel gain-related control information of the downlink data channel, and transmitting over a downlink the determined downlink data channel power level to the UE; and
 upon receiving the downlink data channel power level over the downlink, demodulating the packet data according to the downlink data channel power level by the UE.

35. The method of claim 34, wherein the downlink data channel power level is determined considering maximum power and minimum power that can be allocated to the downlink data channel.

36. An apparatus for transmitting/receiving a downlink data channel power level in a high-speed packet data communication system, comprising:
 a Node B for estimating a channel condition with a UE (User Equipment), determining a modulation technique to be applied to a downlink data channel for transmitting the packet data according to the estimated channel condition, determining a downlink data channel power level which is channel gain-related control information of the downlink data channel if the determined modulation technique is a high-order modulation technique, and transmitting over a downlink the determined downlink data channel power level to the UE; and
 the UE for receiving the downlink data channel power level over the downlink, and demodulating the packet data according to the received downlink data channel power level.

37. The apparatus of claim 36, wherein the Node B comprises:
- a modulation technique determiner for determining a modulation technique to be applied to the downlink data channel according to a channel condition with the UE;
- a downlink data channel power level determiner for determining the downlink data channel power level when the determined modulation technique is a high-order modulation technique; and
- a transmitter for transmitting the determined downlink data channel power level to the UE over a downlink so that the UE demodulates the packet data using the downlink data channel power level.

* * * * *